(12) United States Patent
Tao et al.

(10) Patent No.: US 9,014,258 B2
(45) Date of Patent: Apr. 21, 2015

(54) TRANSMISSION DEVICE AND METHOD OF DETERMINING TRANSMISSION DATE FORMAT

(75) Inventors: Akihiko Tao, Kanagawa (JP); Yasuhisa Nakajima, Kanagawa (JP)

(73) Assignee: Sony Corporation (JP)

( * ) Notice: Subject to any disclaimer, the term of this patent is extended or adjusted under 35 U.S.C. 154(b) by 496 days.

(21) Appl. No.: 13/130,011

(22) PCT Filed: Nov. 18, 2009

(86) PCT No.: PCT/JP2009/069569
§ 371 (c)(1),
(2), (4) Date: May 18, 2011

(87) PCT Pub. No.: WO2010/064540
PCT Pub. Date: Jun. 10, 2010

(65) Prior Publication Data
US 2012/0044985 A1    Feb. 23, 2012

(30) Foreign Application Priority Data
Dec. 1, 2008    (JP) ............................... P2008-306683

(51) Int. Cl.
*H04N 7/26*    (2006.01)
*H04N 7/00*    (2011.01)
*H04N 21/2343*    (2011.01)

(52) U.S. Cl.
CPC ................ *H04N 21/234363* (2013.01); *H04N 21/234381* (2013.01)

(58) Field of Classification Search
USPC .................................................. 375/240.01
See application file for complete search history.

(56) References Cited

U.S. PATENT DOCUMENTS 7,738,499 B2    6/2010    Kugumiya et al.
8,161,388 B2 *  4/2012    Rodriguez et al. ............ 715/722
(Continued)

FOREIGN PATENT DOCUMENTS

EP    1519263 A2    3/2005
EP    1804503 A1    7/2007
(Continued)

OTHER PUBLICATIONS

Office Action from Japanese Application No. 2008-306683, dated May 14, 2013.
(Continued)

*Primary Examiner* — Sath V Perungavoor
*Assistant Examiner* — Kehinde O Abimbola
(74) *Attorney, Agent, or Firm* — Lerner, David, Littenberg, Krumholz & Mentlik, LLP

(57) ABSTRACT

To allow a broadcast transmission to be preformed successfully.
A source device 10 reads out EDID from EDID ROMs 30a-1 to 30a-N of sink devices 30-1 to 30-N, respectively, by using information transmitting and receiving function. The source device 10 determines a transmission data format in an AV stream so as to be compatible with all of the sink devices 30-1 to 30-N, based on data format information in the EDID. The source device 10 broadcasts the AV stream based on the transmission data format determined as described above to the sink devices 30-1 to 30-N. The sink devices 30-1 to 30-N receive the AV stream broadcast from the source device 10. Since the transmission data format of the AV stream is compatible with all of the sink devices 30-1 to 30-N, all of the sink devices 30-1 to 30-N can successfully reproduce the received AV stream.

9 Claims, 57 Drawing Sheets

(56) References Cited

U.S. PATENT DOCUMENTS

| | | | |
|---|---|---|---|
| 2002/0194616 A1* | 12/2002 | Brodigan | 725/119 |
| 2004/0078812 A1* | 4/2004 | Calvert | 725/46 |
| 2005/0128349 A1 | 6/2005 | Takamori et al. | |
| 2005/0160468 A1* | 7/2005 | Rodriguez et al. | 725/109 |
| 2007/0280646 A1 | 12/2007 | Seita et al. | |
| 2008/0019675 A1* | 1/2008 | Hamasaka et al. | 386/124 |
| 2008/0293398 A1* | 11/2008 | Seyama et al. | 455/422.1 |
| 2009/0307076 A1* | 12/2009 | Muthugopalakrishnan et al. | 705/14.26 |
| 2010/0066906 A1 | 3/2010 | Nakajima | |

FOREIGN PATENT DOCUMENTS

| | | |
|---|---|---|
| JP | 07-074652 A | 3/1995 |
| JP | 11-261977 A | 9/1999 |
| JP | 2002330167 A | 11/2002 |
| JP | 2004-072147 A | 3/2004 |
| JP | 2005-073220 A | 3/2005 |
| JP | 2005-244289 A | 9/2005 |
| JP | 2006109000 A | 4/2006 |
| JP | 2007235370 A | 9/2007 |
| JP | 2007-288247 A | 11/2007 |
| JP | 2007324919 A | 12/2007 |
| JP | 2008113198 A | 5/2008 |

OTHER PUBLICATIONS

Office Action from Japanese Application No. 2008-223440, dated May 21, 2013.

European Search Report from EP Application No. 09830307, dated Jul. 4, 2013.

* cited by examiner

FIG.9

| VIDEO ID CODE | FORMATS | FIELD RATE | PICTURE ASPECT RATIO (H:V)[1] | PIXEL ASPECT RATIO (H:V) |
|---|---|---|---|---|
| 1 | 640x480p | 59.94Hz/60Hz | 4:3 | 1:1 |
| 2 | 720x480p | 59.94Hz/60Hz | 4:3 | 8:9 |
| 3 | 720x480p | 59.94Hz/60Hz | 16:9 | 32:27 |
| 4 | 1280x720p | 59.94Hz/60Hz | 16:9 | 1:1 |
| 5 | 1920x1080i | 59.94Hz/60Hz | 16:9 | 1:1 |
| 6 | 720(1440)x480i | 59.94Hz/60Hz | 4:3 | 8:9 |
| 7 | 720(1440)x480i | 59.94Hz/60Hz | 16:9 | 32:27 |
| 8 | 720(1440)x240p | 59.94Hz/60Hz | 4:3 | 4:9 |
| 9 | 720(1440)x240p | 59.94Hz/60Hz | 16:9 | 16:27 |
| 10 | 2880x480i | 59.94Hz/60Hz | 4:3 | 2:9 - 20:9[3] |
| 11 | 2880x480i | 59.94Hz/60Hz | 16:9 | 8:27 - 80:27 |
| 12 | 2880x240p | 59.94Hz/60Hz | 4:3 | 1:9 - 10:9 |
| 13 | 2880x240p | 59.94Hz/60Hz | 16:9 | 4:27 - 40:27 |
| 14 | 1440x480p | 59.94Hz/60Hz | 4:3 | 4:9 |
| 15 | 1440x480p | 59.94Hz/60Hz | 16:9 | 16:27 |
| 16 | 1920x1080p | 59.94Hz/60Hz | 16:9 | 1:1 |
| 17 | 720x576p | 50Hz | 4:3 | 16:15 |
| 18 | 720x576p | 50Hz | 16:9 | 64:45 |
| 19 | 1280x720p | 50Hz | 16:9 | 1:1 |
| ... | | | | |
| 55 | 720(1440)x576i | 200Hz | 16:9 | 64:45 |
| 56 | 720x480p | 239.76/240Hz | 4:3 | 8:9 |
| 57 | 720x480p | 239.76/240Hz | 16:9 | 32:27 |
| 58 | 720(1440)x480i | 239.76/240Hz | 4:3 | 8:9 |
| 59 | 720(1440)x480i | 239.76/240Hz | 16:9 | 32:27 |

| BYTE# | 7 | 6 | 5 | 4 | 3 | 2 | 1 | 0 |
|---|---|---|---|---|---|---|---|---|
| 1 | F17=0 | AUDIO FORMAT CODE=0001 | | | | MAX NUMBER OF CHANNELS-1 | | |
| 2 | F27=0 | 192kHz | 176.4kHz | 96kHz | 88.2kHz | 48kHz | 44.1kHz | 32kHz |
| 3 | F37=0 | F36=0 | F35=0 | F34=0 | F33=0 | 24 BIT | 20 BIT | 16 BIT |

CEA SHORT AUDIO DESCRIPTOR FOR AUDIO CODE=1(LPCM)

(b)

| BYTE# | 7 | 6 | 5 | 4 | 3 | 2 | 1 | 0 |
|---|---|---|---|---|---|---|---|---|
| 1 | F17=0 | AUDIO FORMAT CODE | | | | MAX NUMBER OF CHANNELS-1 | | |
| 2 | F27=0 | 192kHz | 176.4kHz | 96kHz | 88.2kHz | 48kHz | 44.1kHz | 32kHz |
| 3 | | MAXIMUM BIT RATE DIVIDED BY 8 kHz | | | | | | |

CEA SHORT AUDIO DESCRIPTOR FOR AUDIO CODES 2 TO 8

(c)

| BYTE# | 7 | 6 | 5 | 4 | 3 | 2 | 1 | 0 |
|---|---|---|---|---|---|---|---|---|
| 1 | F17=0 | AUDIO FORMAT CODE | | | | MAX NUMBER OF CHANNELS-1 | | |
| 2 | F27=0 | 192kHz | 176.4kHz | 96kHz | 88.2kHz | 48kHz | 44.1kHz | 32kHz |
| 3 | | [DEFAULT =0, UNLESS DEFINED BY AUDIO CODEC VENDOR] | | | | | | |

CEA SHORT AUDIO DESCRIPTOR FOR AUDIO CODES 9 TO 15

FIG.11

| CODES | AUDIO FORMAT DESCRIPTION |
|---|---|
| 0 | RESERVED |
| 1 | LINEAR PCM ( e,g,IEC 60958) |
| 2 | AC-3 |
| 3 | MPEG1(LAYERS 1&2) |
| 4 | MP3(MPEG1 LAYER3) |
| 5 | MPEG2(MULTICHANNEL) |
| 6 | AAC |
| 7 | DTS |
| 8 | ATRAC |
| 9 | ONE BIT AUDIO |
| 10 | DOLBY DIGITAL+ |
| 11 | DTS-HD |
| 12 | MAT(MLP) |
| 13 | DST |
| 14 | WMA PRO |
| 15 | RESERVED FOR AUDIO FORMAT 15 |

FIG.12

| BYTE# | | | | | | | |
|---|---|---|---|---|---|---|---|
| 0 | VENDER-SPECIFIC TAG CODE =3(4BIT) | | | | | LENGTH = N (4BIT) | |
| 1 | 24-BIT IEEE REGISTRATION IDENTIFIER = 0x000C03:HDMI LLC | | | | | | |
| 2 | | | | | | | |
| 3 | | | | | | | |
| 4 | A(4BIT) | | | | | B(4BIT) | |
| 5 | C(4BIT) | | | | | D(4BIT) | |
| 6 | SUPPORTS_AI | DC_48BIT | DC_36BIT | DC_30BIT | DC_Y444 | RESERVED (2BIT) | DVI_DUAL |
| 7 | MAX_TMDS_CLOCK | | | | | | |
| 8 | LATENCY_FIELDS_PRESENT | I_LATENCY_FIELDS_PRESENT | | | RESERVED (6BIT) | | |
| 9 | VIDEO_LATENCY | | | | | | |
| 10 | AUDIO_LATENCY | | | | | | |
| 11 | INTERLACED_VIDEO_LATENCY | | | | | | |
| 12 | INTERLACED_AUDIO_LATENCY | | | | | | |
| 13..N | RESERVED | | | | | | |

FIG.13

| BYTE# | BITS | | | | | | | |
|---|---|---|---|---|---|---|---|---|
| | 7 | 6 | 5 | 4 | 3 | 2 | 1 | 0 |
| 1 | TAG CODE (07h) | | | LENGTH OF FOLLOWING DATA BLOCK (IN BYTES) (03h) | | | | |
| 2 | EXTENDED TAG CODE (05h) | | | | | | | |
| 3 | F37=0 | F36=0 | F35=0 | F34=0 | F33=0 | F32=0 | xvYCC709 | xvYCC601 |
| 4 | F47=0 | F46=0 | F45=0 | F44=0 | F43=0 | MD2 | MD1 | MD0 |

FIG.14

| | SINK DEVICE 1 | SINK DEVICE 2 | SINK DEVICE 3 | COMMON LIST |
|---|---|---|---|---|
| COLOR FORMAT | (RGB:MANDATORY)<br>YCBCR4:4:4 ⎫<br>YCBCR4:2:2 ⎬ OPTION<br>xvYCC601 ⎪<br>xvYCC709 ⎭ | (RGB:MANDATORY)<br>YCBCR4:4:4 ⎫ OPTION<br>YCBCR4:2:2 ⎭ | (RGB:MANDATORY)<br>YCBCR4:4:4 ⎫ OPTION<br>YCBCR4:2:2 ⎭ | RGB<br>YCBCR4:4:4<br>YCBCR4:2:2 |
| VIDEO FORMAT | 01:640x480p@59.94/60Hz ⎫<br>02:720x480p@59.94/60Hz ⎬ MANDATORY<br>03:720x480p@59.94/60Hz ⎪<br>04:1280x720p@59.94/60Hz ⎪<br>05:1920x1080p@59.94/60Hz ⎭<br>16:1920x1080p@59.94/60Hz<br>31:1920x1080p@50Hz<br>32:1920x1080p@23.98/24Hz | 01:640x480p@59.94/60Hz ⎫<br>02:720x480p@59.94/60Hz ⎬ MANDATORY<br>03:720x480p@59.94/60Hz ⎪<br>04:1280x720p@59.94/60Hz ⎪<br>05:1920x1080p@59.94/60Hz ⎭<br>32:1920x1080p@23.98/24Hz | 01:640x480p@59.94/60Hz ⎫<br>02:720x480p@59.94/60Hz ⎬ MANDATORY<br>03:720x480p@59.94/60Hz ⎪<br>04:1280x720p@59.94/60Hz ⎪<br>05:1920x1080i@59.94/60Hz ⎭<br>16:1920x1080p@59.94/60Hz<br>31:1920x1080p@50Hz | 01:640x480p@59.94/60Hz<br>02:720x480p@59.94/60Hz<br>03:720x480p@59.94/60Hz<br>04:1280x720p@59.94/60Hz<br>05:1920x1080i@59.94/60Hz |
| DEEP COLOR | DC 48BIT<br>DC 36BIT<br>DC 30BIT<br>DC Y444 | DC 30BIT<br>DC Y444 | DC 36BIT<br>DC 30BIT<br>DC Y444 | DC 30BIT<br>DC Y444 |

FIG.18

| SINK DEVICE 1 | SINK DEVICE 2 | SINK DEVICE 3 | COMMON LIST |
|---|---|---|---|
| AUDIO FORMAT CODE=1(LINEAR-PCM) MAX NUMBER OF CHANNELS=7(8ch) 192/176.4/96/88.2/48/44.1/32kHz 24/20/16 BIT | AUDIO FORMAT CODE=1(LINEAR-PCM) MAX NUMBER OF CHANNELS=5(6ch) 96/88.2/48/44.1/32kHz 24/20/16 BIT | AUDIO FORMAT CODE=1(LINEAR-PCM) MAX NUMBER OF CHANNELS=3(4ch) 48/44.1/32kHz 24/20/16 BIT | AUDIO FORMAT CODE=1(LINEAR-PCM) MAX NUMBER OF CHANNELS=3(4ch) SAMPLING FREQUENCY:48/44.1/32kHz QUANTIZATION BIT NUMBER:24/20/16BIT |
| AUDIO FORMAT CODE=6(AAC) MAX NUMBER OF CHANNELS=7(8ch) 192/176.4/96/88.2/48/44.1/32kHz | | | |
| AUDIO FORMAT CODE=7(DTS) MAX NUMBER OF CHANNELS=7(8ch) 192/176.4/96/88.2/48/44.1/32kHz | AUDIO FORMAT CODE=7(DTS) MAX NUMBER OF CHANNELS=5(6ch) 96/88.2/48/44.1/32kHz | | |
| AUDIO FORMAT CODE=10(DOLBY DIGITAL+) MAX NUMBER OF CHANNELS=7(8ch) 192/176.4/96/88.2/48/44.1/32kHz | AUDIO FORMAT CODE=10(DOLBY DIGITAL+) MAX NUMBER OF CHANNELS=5(6ch) 96/88.2/48/44.1/32kHz | AUDIO FORMAT CODE=10(DOLBY DIGITAL+) MAX NUMBER OF CHANNELS=3(4ch) 48/44.1/32kHz | AUDIO FORMAT CODE=10(DOLBY DIGITAL+) MAX NUMBER OF CHANNELS=3(4ch) 48/44.1/32kHz |
| AUDIO FORMAT CODE=10(DTS-HD) MAX NUMBER OF CHANNELS=7(8ch) 192/176.4/96/88.2/48/44.1/32kHz | AUDIO FORMAT CODE=11(DTS-HD) MAX NUMBER OF CHANNELS=5(6ch) 96/88.2/48/44.1/32kHz | | |

FIG.25

(Max Number of channel OF EACH AUDIO FORMAT, Sampling FREQUENCY, QUANTIZATION BIT NUMBER ARE OMITTED)

| SINK DEVICE 1 (TV) | SINK DEVICE 2 (AV AMPLIFIER) | SINK DEVICE 3 (TV) | SINK DEVICE 4 (AV AMPLIFIER) | COMMON LIST |
|---|---|---|---|---|
| VIDEO FORMAT 1920x1080p@60Hz 1920x1080i@60Hz | | VIDEO FORMAT 1920x1080i@60Hz | | VIDEO FORMAT 1920x1080i@60Hz |
| AUDIO FORMAT L-PCM | | AUDIO FORMAT L-PCM | | |
| | AUDIO FORMAT DSD DTS-HD | | AUDIO FORMAT DSD L-PCM | AUDIO FORMAT OF AV AMPLIFIER DSD |

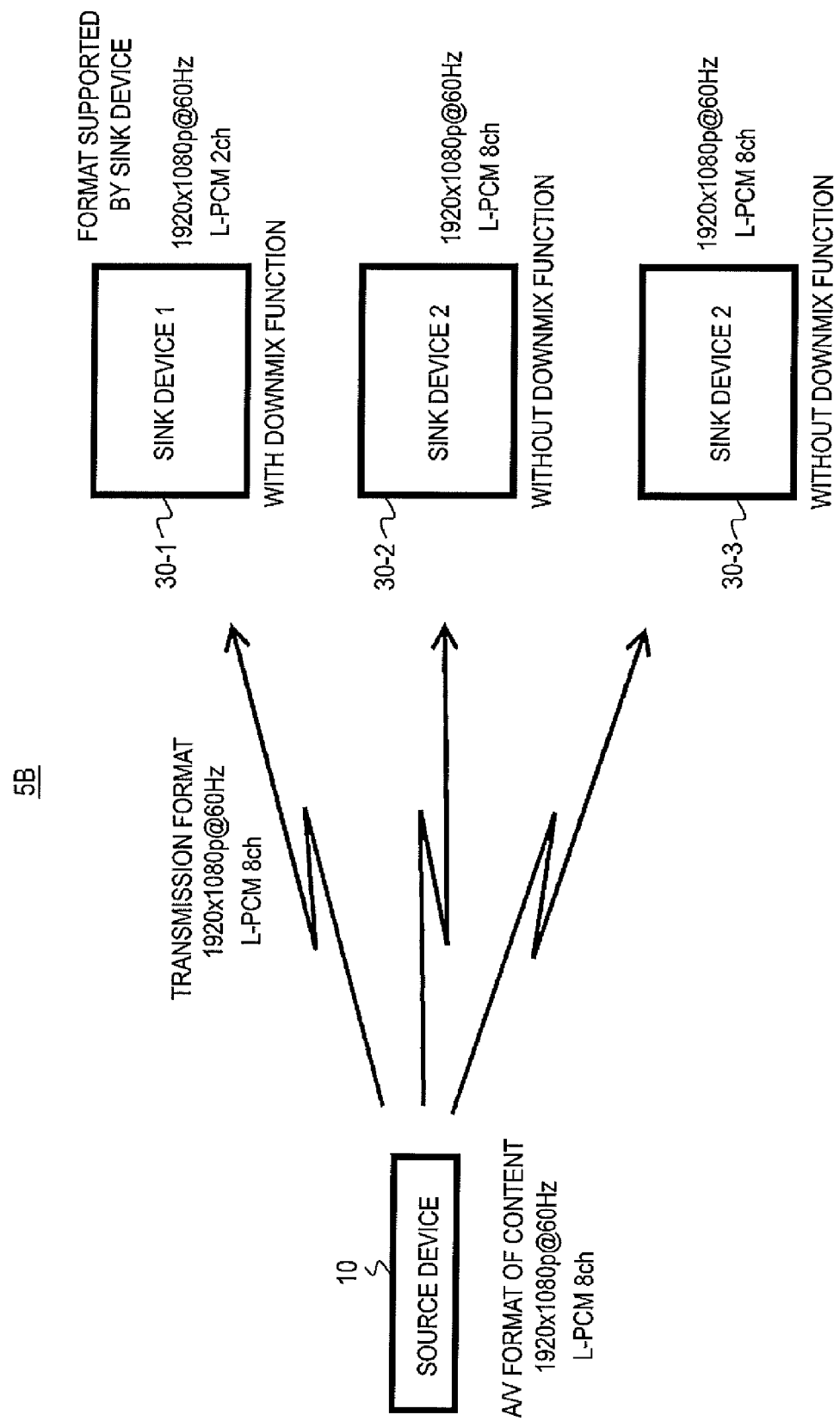

FIG.27

| BYTE# | 7 | 6 | 5 | 4 | 3 | 2 | 1 | 0 |
|---|---|---|---|---|---|---|---|---|
| | | BITS | | | | | | |
| 1 | 1 | 1 | 1 | LENGTH OF FOLLOWING DATA BLOCK PAYLOAD(IN BYETS) | | | | |
| | (TAG CODE) | | | | | | | |
| 2 | EXTENDED TAG CODE (RESERVED ONE OF 32 TO 255) | | | | | | | |
| 3 | SINK DEVICE TYPE (TELEVISION OR AV AMPLIFIER) | | | | | | | |
| 4 | PAIRING INFORMATION OF TELEVISION/AV AMPLIFIER | | | | | | | |
| 5 | INFORMATION ON PRESENCE OR ABSENCE OF DOWNMIX FUNCTION | | | | | | | |

FIG.28

| EXTENDED TAG CODES | TYPE OF DATA BLOCK |
|---|---|
| 0 | VIDEO CAPABILITY DATA BLOCK |
| 1 | VENDOR-SPECIFIC VIDEO DATA BLOCK |
| 2 | RESERVED FOR VESA VIDEO DISPLAY DEVICE INFORMATION DATA BLOCK |
| 3 | RESERVED FOR VESA VIDEO DATA BLOCK |
| 4 | RESERVED FOR HDMI VIDEO DATA BLOCK |
| 5 | COLORIMETRY DATA BLOCK |
| 6...15 | RESERVED FOR VIDEO-RELATED BLOCKS |
| 16 | CEA MISCELLANEOUS AUDIO FIELDS |
| 17 | VENDOR-SPECIFIC AUDIO DATA BLOCK |
| 18 | RESERVED FOR HDMI AUDIO DATA BLOCK |
| 19....31 | RESERVED FOR AUDIO- RELATED BLOCKS |
| 32...255 | RESERVED FOR GENERAL |

FIG.29

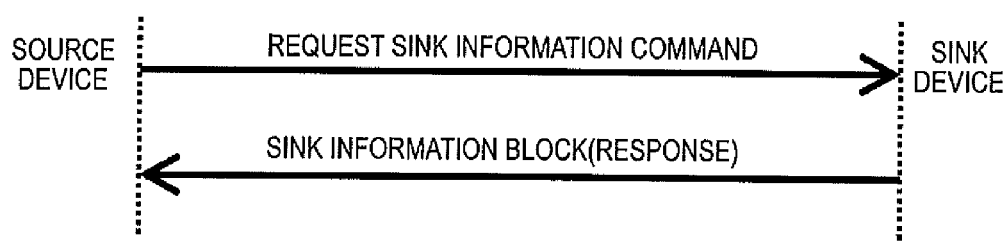

FIG.30

| BYTE# | |
|---|---|
| 1 | CODE REPRESENTING Sink Information Block |
| 2 | SINK DEVICE TYPE (TELEVISION or AV AMPLIFIER) |
| 3 | PAIRING INFORMATION OF TELEVISION/AV AMPLIFIER |
| 4 | INFORMATION ON PRESENCE OR ABSENCE OF DOWNMIX FUNCTION |

FIG.34

| BYTE# | 7 | 6 | 5 | 4 | 3 | 2 | 1 | 0 |
|---|---|---|---|---|---|---|---|---|
| 0 | VIDEO TAG CODE (=2) | | | | | LENGTH (=L) | | |
| 1 | CEA SHORT VIDEO DESCRIPTOR 1 = &H85(1920x1080i 60Hz 16:9 NATIVE MODE) | | | | | | | |
| 2 | CEA SHORT VIDEO DESCRIPTOR 2 = &H02(720x480i 60Hz 4:3) | | | | | | | |
| 3 | CEA SHORT VIDEO DESCRIPTOR 3 = &H03(720x480p 60Hz 16:9) | | | | | | | |
| 4 | CEA SHORT VIDEO DESCRIPTOR 4 = &H04(1280x720p 60Hz 16:9) | | | | | | | |
| 5 | CEA SHORT VIDEO DESCRIPTOR 5 = &H16(1920x1080p 60Hz 16:9) | | | | | | | |
| 6...L-1 | | | | | | | | |
| L | CEA SHORT VIDEO DESCRIPTOR L = &H46(1920x1080i 120Hz 16:9) | | | | | | | |

FIG.35

| BYTE# | 7 | 6 | 5 | 4 | 3 | 2 | 1 | 0 |
|---|---|---|---|---|---|---|---|---|
| 0 | VENDER-SPECIFIC TAG CODE =(3) | | | | LENGTH (=N) | | | |
| 1...3 | 24BIT IEEE REGISTRATION IDENTIFIER = (0x000C03) LSB FIRST | | | | | | | |
| 4 | A | | | | B | | | |
| 5 | C | | | | D | | | |
| 6 | SUPPORTS_AI | DC_48BIT | DC_36BIT | DC_30BIT | DC_Y444 | RESERVED (0) | | DVI-DUAL |
| 7 | LATENCY | | | MAX_TMDS_CLOCK | | | | |
| 8 | | | | RESERVED(0) | | | | |
| 9 | VIDEO LATENCY | | | | | | | |
| 10 | AUDIO LATENCY | | | | | | | |
| 11 | INTERLACED VIDEO LATENCY | | | | | | | |
| 12 | INTERLACED AUDIO LATENCY | | | | | | | |
| 13...N | RESERVED(0) | | | | | | | |

FIG.36

| | FRAME RATE | BIT | TRANSMISSION RATE |
|---|---|---|---|
| 4096 × 2048 | 60p | 36 | 18.119Gbps * |
| | | 24 | 12.080Gbps * |
| 3840 × 2400 | | 36 | 19.907Gbps * |
| | | 24 | 13.271Gbps * |
| 3840 × 2160 | | 36 | 17.916Gbps * |
| | | 24 | 11.944Gbps |
| 3200 × 2400 | | 36 | 16.589Gbps * |
| | | 24 | 11.059Gbps |
| 2560 × 2048 | | 36 | 11.325Gbps |
| | | 24 | 7.550Gbps |
| 2560 × 1600 | | 36 | 8.847Gbps |
| | | 24 | 5.900Gbps |
| 1920 × 1080 | | 36 | 4.479Gbps |
| | | 24 | 2.986Gbps |
| | 60i | 36 | 2.239Gbps |
| | | 24 | 1.493Gbps |

FIG.37

| BYTE# | 7 | 6 | 5 | 4 | 3 | 2 | 1 | 0 |
|---|---|---|---|---|---|---|---|---|
| 0 | VENDER-SPECIFIC TAG CODE =(3) | | | | LENGTH (=N) | | | |
| 1...3 | 24BIT IEEE REGISTRATION IDENTIFIER = (0x000C03) LSB FIRST | | | | | | | |
| 4 | A | | | | B | | | |
| 5 | C | | | | D | | | |
| 6 | SUPPORTS_AI | DC_48BIT | DC_36BIT | DC_30BIT | DC_Y444 | RESERVED(0) | | DVI-DUAL |
| 7 | MAX_TMDS_CLOCK | | | | | | | |
| 8 | LATENCY | | | | COMPRESS METHOD LENGTH (M-13) | | | |
| 9 | VIDEO LATENCY | | | | | | | |
| 10 | AUDIO LATENCY | | | | | | | |
| 11 | INTERLACED VIDEO LATENCY | | | | | | | |
| 12 | INTERLACED_AUDIO_LATENCY | | | | | | | |
| 13...M-1 | COMPRESS METHOD | | | | | | | |
| M..N | RESERVED(0) | | | | | | | |

FIG.38

| BYTE# | 7 | 6 | 5 | 4 | 3 | 2 | 1 | 0 |
|---|---|---|---|---|---|---|---|---|
| ... | | | | | | | | |
| 8 | LATENCY | | | COMPRESS METHOD LENGTH =0x01 | | | | |
| ... | | | | | | | | |
| 13 | RESERVED (0) | | | RLE | WAVELET | SBM | LLVC | |
| ... | | | | | | | | |

FIG.40

| BYTE# | 7 | 6 | 5 | 4 | 3 | 2 | 1 | 0 |
|---|---|---|---|---|---|---|---|---|
| 0 | CHECK SUM | | | | | | | |
| 1 | Rsvd(0) | Y1 | Y0 | A0 | B1 | B0 | S1 | S0 |
| 2 | C1 | C0 | M1 | M0 | R3 | R2 | R1 | R0 |
| 3 | ITC | EC2 | EC1 | EC0 | Q1 | Q0 | SC1 | SC0 |
| 4 | Rsvd(0) | VIC6 | VIC5 | VIC4 | VIC3 | VIC2 | VIC1 | VIC0 |
| 5 | RESERVED(0) | | | | PR3 | PR2 | PR1 | PR0 |
| 6,7 | LINE NUMBER OF END OF TOP BAR | | | | | | | |
| 8,9 | LINE NUMBER OF START OF BOTTOM BAR | | | | | | | |
| 10,11 | PIXEL NUMBER OF END OF LEFT BAR | | | | | | | |
| 12,13 | PIXEL NUMBER OF START OF RIGHT BAR | | | | | | | |
| 14 | COMPRESS METHOD LENGTH (M-15) | | | | | | | |
| 15...M-1 | COMPRESS METHOD | | | | | | | |
| M | COMPRESS RATIO | | | | | | | |
| M...27 | RESERVED(0) | | | | | | | |

FIG.41

| BYTE# | 7 | 6 | 5 | 4 | 3 | 2 | 1 | 0 |
|---|---|---|---|---|---|---|---|---|
| 14 | COMPRESS METHOD LENGTH =0x01 ||||||||
| 15 | RESERVED (0) |||||||0|
| 16 | COMPRESS RATIO INTEGER = 0x02 |||| COMPRESS RATIO FRACTIONAL PART = 0x00 ||||

FIG.47

| PIN | SIGNAL ASSIGNMENT | PIN | SIGNAL ASSIGNMENT |
|---|---|---|---|
| 1 | TMDS DATA2+ | 2 | TMDS DATA2 SHIELD |
| 3 | TMDS DATA2- | 4 | TMDS DATA1+ |
| 5 | TMDS DATA1 SHIELD | 6 | TMDS DATA1- |
| 7 | TMDS DATA0+ | 8 | TMDS DATA0 SHIELD |
| 9 | TMDS DATA0- | 10 | TMDS CLOCK+ |
| 11 | TMDS CLOCK SHIELD | 12 | TMDS CLOCK- |
| 13 | CEC | 14 | RESERVED (N.C. ON DEVICE) |
| 15 | SCL | 16 | SDA |
| 17 | DDC/CEC GROUND | 18 | +5V POWER |
| 19 | HOT PLUG DETECT | | |

| DIRECTION | TRANSMISSION BIT RATE |
|---|---|
| (a) | TRa |
| (b) | TRb |
| (c) | TRc |

FIG.57

| DIRECTION | SINK DEVICE 1 | SINK DEVICE 2 | SINK DEVICE 3 | COMMON LIST |
|---|---|---|---|---|
| (a) | TR1a(8.0) | TR2a(6.8) | TR3a(5.2) | 5.2Gbps |
| (b) | TR1b(7.3) | TR2b(7.0) | TR3b(6.8) | 6.8Gbps |
| (c) | TR1c(3.5) | TR2c(3.6) | TR3c(3.7) | 3.5Gbps |

TRANSMISSION BIT RATE (Gbps)

FIG.58

| VIDEO COMPRESSION METHOD | SINK DEVICE 1 | SINK DEVICE 2 | SINK DEVICE 3 | COMMON LIST |
|---|---|---|---|---|
| | RE | RE | RE | RE |
| | ZIP | ZIP | | |
| | WAVELET | | WAVELET | |
| | SBM | SBM | SBM | SBM |
| | LLVC | LLVC | LLVC | LLVC |

TRANSMISSION DEVICE AND METHOD OF DETERMINING TRANSMISSION DATE FORMAT

CROSS-REFERENCES TO RELATED APPLICATIONS

The present application is a national phase entry under 35 U.S.C. §371 of International Application No. PCT/JP2009/069569 filed Nov. 18, 2009, published on Jun. 10, 2010 as WO 2010/064540 A1, which claims priority from Japanese Patent Application No. JP 2008-306683 filed in the Japanese Patent Office on Dec. 1, 2008.

TECHNICAL FIELD

The present invention relates to a transmission device and a method of determining a transmission data format, and more particularly, to a transmission device or the like that broadcasts content data to a plurality of reception devices.

BACKGROUND ART

For example, as disclosed in PTL 1 or the like, there is known an AV (Audio Visual) system where content data (video data, audio data) is transmitted from a source device (for example, a disc recorder, a tuner for terrestrial digital broadcasting, or the like) as a transmission device to sink devices (for example, television receivers) as reception devices.

CITATION LIST

[PTL 1] Japanese Patent Application Laid-Open No. 2006-10900

SUMMARY OF INVENTION

Technical Problem

In an AV system including the source device and sink devices as described above, it is considered that content data is broadcast from one source device to a plurality of sink devices using a wireless or wired transmission path (transmission medium).

FIG. 60 illustrates an example where, in an AV system 600 including one source device (for example, a disc recorder) 610 and three sink devices (for example, television receivers) 620-1 to 620-3, content data is broadcast from the source device 610 to the sink devices 620-1 to 620-3.

The sink device 620-1 is made to be compatible with video formats: 1920×1080p@59.94/60 Hz, 1920×1080i@59.94/60 Hz, and 720×480p@59.94/60 Hz and audio formats: L-PCM, Dolby Digital, and AAC.

In addition, the sink device 620-2 is made to be compatible with video formats: 1920×1080i@59.94/60 Hz, and 720×480p@59.94/60 Hz and audio formats: L-PCM, and Dolby Digital.

In addition, the sink device 620-3 is made to be compatible with a video format: 720×480p@59.94/60 Hz and an audio format: L-PCM.

When the video format and audio format compatible with the sink devices 620-1 to 620-3 are different, any of the sink devices 620-1 to 620-3 may not perform reproduction depending on a format of the content data format that is broadcast from the source device 610.

For example, it may be considered that a case where content data (video data, and audio data) of which the video format is 1920×1080p@60 Hz and the audio format is AAC is transmitted from the source device 610. In this case, since the sink device 620-1 is compatible with a format of the content data that is transmitted from the source device 610, the sink device 620-1 can reproduce the content data. However, since the sink devices 620-2 and 620-3 are not compatible with the format of the content data that is transmitted from the source device 610, the sink devices 620-2 and 620-3 cannot reproduce the content data.

An object of the invention is to allow a broadcast transmission to a plurality of reception devices to be performed successfully.

Solution to Problem

The concept of the invention relates to a transmission device including a communication unit that broadcasts content data to a plurality of reception devices and performs an information transmission to and an information reception from the plurality of reception devices; and a format determining unit that determines a transmission data format of the content data that is a transmission object to be broadcast by the communication unit, based on information, which is acquired from the plurality of reception devices via the communication unit, of a data format with which the plurality of reception devices are compatible.

In this invention, content data is broadcast to a plurality of reception devices and an information transmission to and an information reception from the plurality of reception devices are performed. The broadcast transmission and the information transmission and reception by the communication unit may be performed by a wired or wireless transmission path.

For example, in the communication unit, downlink blocks may be sequentially transmitted with a non-transmission period interposed therebetween to the plurality of reception devices by using a single band and uplink blocks are received from the plurality of reception devices in the non-transmission period by using the single band. In addition, for example, in the communication unit, downlink blocks may be sequentially transmitted to the plurality of reception devices by using a first band and uplink blocks may be received from the plurality of reception devices by using a second band. In this case, the content data and the information to be transmitted to the reception devices may be included in the downlink blocks, and the information from the reception device may be included in the uplink blocks.

In a case where a single band is used, the number of bands used becomes 1. However, it is necessary for the communication unit to release the band after transmitting the downlink block and to receive the uplink block from the reception device. In addition, it is necessary for the reception device to transmit the uplink block to the transmission device in synchronization with the non-transmission period of the downlink block.

In a case where a first band and a second band are used, the number of bands used becomes two. However, the communication unit can transmit the downlink blocks in succession without releasing the band. In addition, the reception devices can transmit the uplink blocks to the transmission device out of synchronization with the downlink blocks, regardless of timing, with respect to a request from the transmission device.

In addition, the information of the data format compatible with each of the plurality of reception devices is acquired by the format determining unit from the plurality of reception devices via the communication unit. The transmission data format of the content data that is a transmission object to be broadcast by the communication unit is determined by the data format determining unit, based on the information of the data format with which the plurality of reception devices are compatible.

For example, a common list, which is a list of the data format commonly compatible with the plurality of reception devices, may be created by the format determining unit based on the information of the compatible data format acquired from each of the plurality of reception devices. For example, in a case where the content data is video data, when the common list is created, a color format type, a video format type, and a deep color mode type may be set to be common items. In addition, in a case where the content data is audio data, when the common list is created, an audio format type, and in each audio format a maximum number of channels, a sampling frequency and a quantization bit number may be set to be common items.

In the format determining unit, when the data format of the content data that is the transmission object is present in the common list, the data format may be set as the transmission data format. Therefore, since the plurality of reception devices can be compatible with the format of the content data broadcast from the transmission device, reproduction becomes possible. That is, a broadcast transmission from the transmission device to the plurality of reception devices is successfully performed.

In this invention, for example, when the data format of the content data that is the transmission object is not present in the common list, the format determining unit may determine a data format of a mandatory standard as the transmission data format. In this case, in the plurality of reception devices, the format of the content data broadcast from the transmission device is a data format of a mandatory standard, the plurality of reception devices is compatible with the format, and thereby reproduction becomes possible. That is, even when the data format of the content data that is a transmission object is not present in the common list, the broadcast transmission from the transmission device to the plurality of reception devices can be successfully performed.

In addition, in this invention, for example, a format converting unit that converts the data format of the content data that is the transmission object into another data format may be further provided. The format determining unit may store information indicating a priority ordering of plural kinds of data formats. When a data format with a priority ordering higher than that of the data format of the content data that is the transmission object is present in the common list, and a conversion into a data format with high priority ordering is possible in the format conversion unit, the data format with the high priority ordering may be determined as the transmission data format.

In this case, the content data, which is the transmission object, is converted to have a data format with high priority ordering and is broadcast to a plurality of receiving terminals. For this reason, to the extent that the data format has a high priority ordering, the data format has a high quality, such that the plurality of reception devices can receive content data with a higher quality and thereby reproduction quality can be improved.

In addition, in this invention, for example, in regard to the maximum number of channels in each audio format, the format determining unit may create the common list based on information, which is acquired from each of the reception devices not having a downmix function among the plurality of reception devices, of the maximum number of channels with which the reception devices are compatible. In this case, for example, even when the maximum number of channels of the reception devices having the downmix function is small, it is possible to transmit the audio data with the maximum number of channels with which the reception devices not having the downmix function are compatible and thereby it is possible to suppress the reproduction quality from being deteriorated.

In addition, in this invention, for example, in a case where the plurality of reception devices includes plural sets of a television monitor and AV amplifier combination, the format determining unit may determine the transmission data format of audio data that is broadcast by the communication unit, based on information, which is acquired from the plurality of AV amplifiers, of the audio data format with which the plurality of AV amplifiers are compatible.

In the case of the television monitor and AV amplifier combination, there is an application where an image is displayed by the television monitor and a sound is output from the AV amplifier. In addition, generally, the AV amplifier is compatible with an audio data format with a higher sound quality in relation to the television monitor. Therefore, since the transmission data format of the audio data is determined based on only the information of the audio data format acquired from the plurality of AV amplifiers as described above, it is possible to avoid a case where an audio data format with a low quality is determined. That is, in a case of the application where the image is displayed by the television monitor and the sound is output from the AV amplifier, it is possible to suppress the reproduction quality from being deteriorated.

In addition, in this invention, for example, a data compression unit that performs a data compression process with respect to non-compressed content data of the transmission data format determined by the format determining unit may be further provided. When a transmission bit rate, which corresponds to a transmission path to each of the plurality of reception devices, is equal to or greater than a bit rate of the non-compressed content data, the communication unit may broadcast the non-compressed content data to the plurality of reception devices, and when the transmission bit rate, which corresponds to the transmission path to each of the plurality of reception devices, is smaller than the bit rate of the non-compressed content data, the communication unit broadcasts compressed content data, which is obtained by subjecting non-compressed content data to a data compression process with the data compression unit, to the plurality of reception devices.

No matter whether the transmission path (transmission medium) is wireless or wired, the transmission bit rate of the transmission path varies with the change of a state thereof. For example, in a case where the transmission path is configured by a cable, due to signal attenuation caused by the deterioration (bending, distortion, disconnection) of the cable or the length of the cable, contact failure of a connector unit, or the like, a received signal quality deteriorates and the transmission bit rate of the transmission path actually decreases. In addition, for example, in a case where the transmission path is wireless, due to the presence of a barrier or an interfering wave or the like, the received signal quality deteriorates and thereby the transmission bit rate of the transmission path actually decreases.

As described above, according to a transmission bit rate of the transmission path, the data compression with respect to non-compressed content data of a determined transmission data format is performed according to necessity and then the transmission is performed, such that the broadcast transmission of the content data to the plurality of reception devices may be successfully performed, regardless of a transmission path state.

Advantageous Effects of Invention

According to the invention, information of a data format compatible with each of a plurality of transmission devices is acquired from the plurality of reception devices and a transmission data format is determined based on the information, such that it is possible to successfully perform a broadcast transmission to a plurality of reception devices.

BRIEF DESCRIPTION OF DRAWINGS

FIG. 9 is a diagram illustrating a correlation (partial extraction) between a Video Format and a Video Identification Code (Video ID Code).

FIG. 10 is a diagram illustrating details of a CEA Short Audio Descriptor.

FIG. 11 is a diagram illustrating a supportable Audio Format Code.

FIG. 12 is a diagram illustrating a structure of a Vendor Specific Data Block (VSDB).

FIG. 13 is a diagram illustrating a structure of a Colorimetry Data Block.

FIG. 14 is a diagram illustrating a creation example of a common list in regard to a video format.

FIG. 18 is a diagram illustrating a creation example of a common list in regard to an audio format.

FIG. 25 is a diagram illustrating a creation example of a common list of a video and an audio in the first modified example.

FIG. 26 is a diagram illustrating a second modified example of the AV system of the first embodiment.

FIG. 27 is a diagram illustrating an execution example where the source device acquires information related to the type (a television receiver or an AV amplifier) of each sink device, the presence or absence of a pairing of the television receiver and the AV amplifier, and the presence or absence of a downmix function of the sink device.

FIG. 28 is a diagram illustrating a list of an Extended Tag Code.

FIG. 29 is a diagram illustrating another execution example where the source device acquires information related to the type (a television receiver or an AV amplifier) of each sink device, the presence or absence of a pairing of the television receiver and the AV amplifier, and the presence or absence of a downmix function of the sink device.

FIG. 30 is a diagram illustrating an example of a structure of a sink information block.

FIG. 34 is a diagram illustrating a video data example of a Video Short region.

FIG. 35 is a diagram illustrating a data structure example of a Vendor Speciffic region.

FIG. 36 is a diagram illustrating a relationship between a video format and a transmission rate.

FIG. 37 is a diagram illustrating a data structure example of compression method information of a Vendor Specific region.

FIG. 38 is a diagram illustrating an example of compression method information of a Vendor Speciffic region.

FIG. 40 is a diagram illustrating a data structure example of AVI InfoFrame packet.

FIG. 41 is a diagram illustrating a data example of a compression method and a compression ratio of the AVI InfoFrame packet.

FIG. 47 is a diagram illustrating a pin array (type A) of an HDMI terminal.

FIG. 57 is a diagram illustrating a creation example of a transmission bit rate management table for each direction in the sink device.

FIG. 58 is a diagram illustrating a creation example of a video compression method common list.

DESCRIPTION OF EMBODIMENTS

Hereinafter, best modes (hereinafter, referred to as "embodiments") for carrying out the invention will be described. Description will be made in the following order.
1. First Embodiment
2. Second Embodiment
<1. First Embodiment>
[Configuration Example of AV System]

Figure 1:
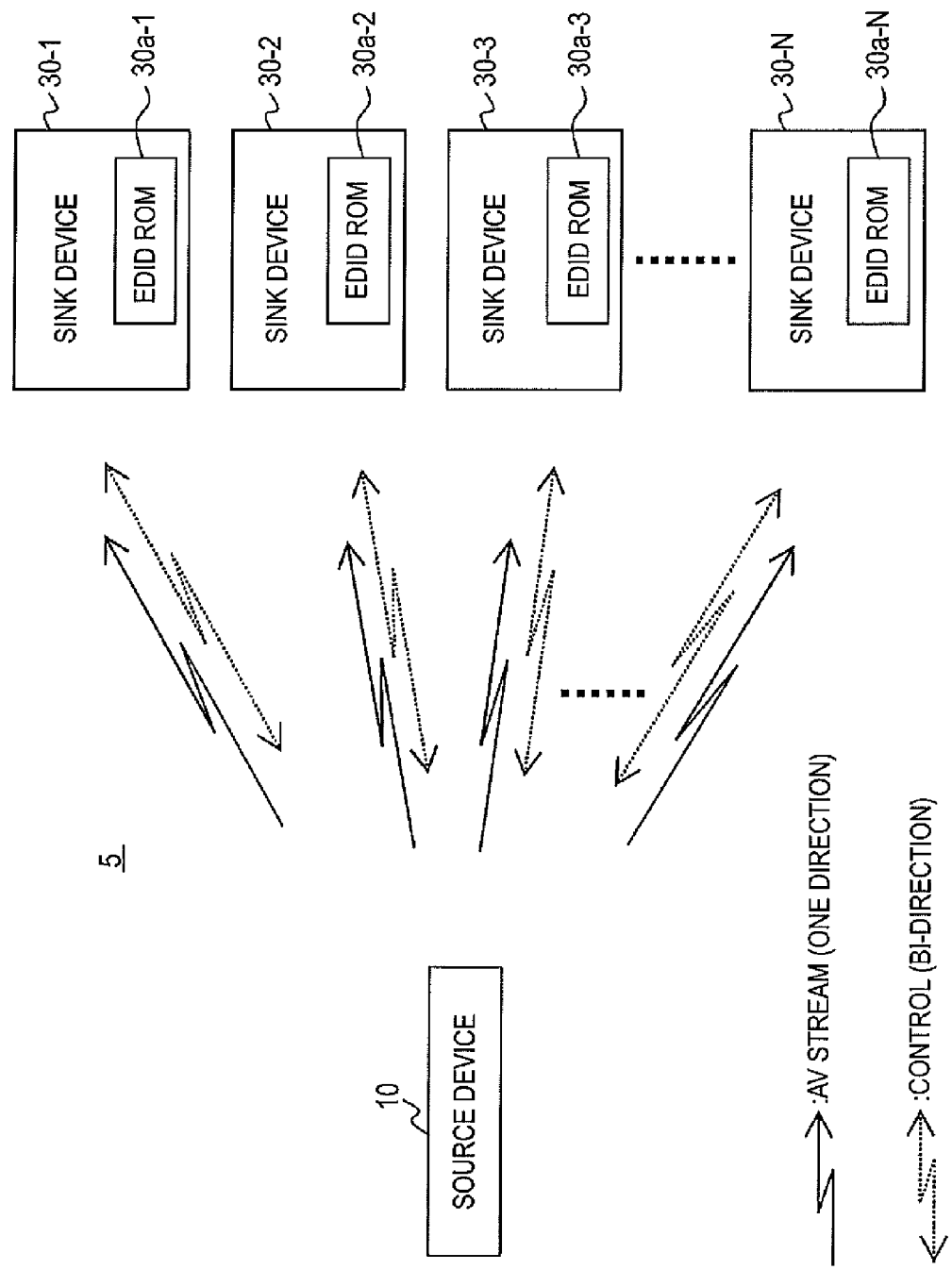
FIG. 1 is a block diagram illustrating a configuration example of an AV system as a first embodiment of the invention.

FIG. 1 shows a configuration example of an AV (Audio Visual) system 5 as an embodiment. The AV system 5 includes a source device 10 such as a disc recorder and N number of sink devices 30-1 to 30-N such as a television receiver. Here, the source device 10 makes up a transmission device and the sink devices 30-1 to 30-N make up reception devices.

The source device 10 has a function of broadcasting AV streams as content data to the sink devices 30-1 to 30-N via a transmission medium (transmission path). In addition, the source device 10 has a function of transmitting information to the sink devices 30-1 to 30-N via the transmission medium. In addition, the source device 10 has a function of receiving information transmitted from the sink devices 30-1 to 30-N via the transmission medium. Here, as the transmission medium, a wired or wireless one may be used.

The sink devices 30-1 to 30-N have a function of receiving the AV streams broadcast from the source device 10 as described above and reproducing the same. In addition, the sink devices 30-1 to 30-N have a function of receiving information transmitted from the source device 10 via the transmission medium. In addition, the sink devices 30-1 to 30-N have a function of transmitting information to the source device 10 via the transmission medium.

Each of the sink devices 30-1 to 30-N includes each of EDID ROMs (Read Only Memory) 30a-1 to 30a-N that store EDID (Extended Display Identification Data) that is information related to its own performance (configuration/capability). The EDID stored in the EDID ROMs 30a-1 to 30a-N includes information of a video format and an audio format that are compatible with each of the sink devices 30-1 to 30-N.

The source device 10 reads out the EDID from the EDID ROMs 30a-1 to 30a-N of the sink devices 30-1 to 30-N, respectively, by using the above-described transmitting and receiving function. Then, the source device 10 determines a transmission data format (video format and audio format) of the AV stream based on information of a video format and an audio format in the EDID. In this case, the source device 10 determines the transmission data format to be compatible with all of the sink devices 30-1 to 30-N. In addition, details of determining method of the transmission data format in the source device 10 will be described later.

An operation at the time of broadcasting the AV stream as the content data from the source device 10 to the sink devices 30-1 to 30-N in the AV system 5 shown in FIG. 1 will be described.

The source device 10 performs the determination of the transmission data format of the AV stream. In this case, the readout of the EDID from the EDID ROMs 30a-1 to 30a-N of the sink devices 30-1 to 30-N is performed, respectively, by using an information transmitting and receiving function.

The source device 10 determines transmission formats of video and audio in the AV streams to be compatible with all of the sink devices 30-1 to 30-N, based on information of a video format and an audio format in the EDID. In the source device 10, the AV streams based on the transmission data format determined as described above are broadcast to the sink devices 30-1 to 30-N.

The sink devices 30-1 to 30-N receive the AV streams broadcast from the source device 10 as described above. The transmission format of the video and the audio in the AV stream is set to be compatible with all of the sink devices 30-1 to 30-N as described above. Therefore, the received AV streams can be reproduced in the sink devices 30-1 to 30-N.

[Physical Layer Example for Realizing Wireless Transmission of AV Streams and Information]

Figure 2:
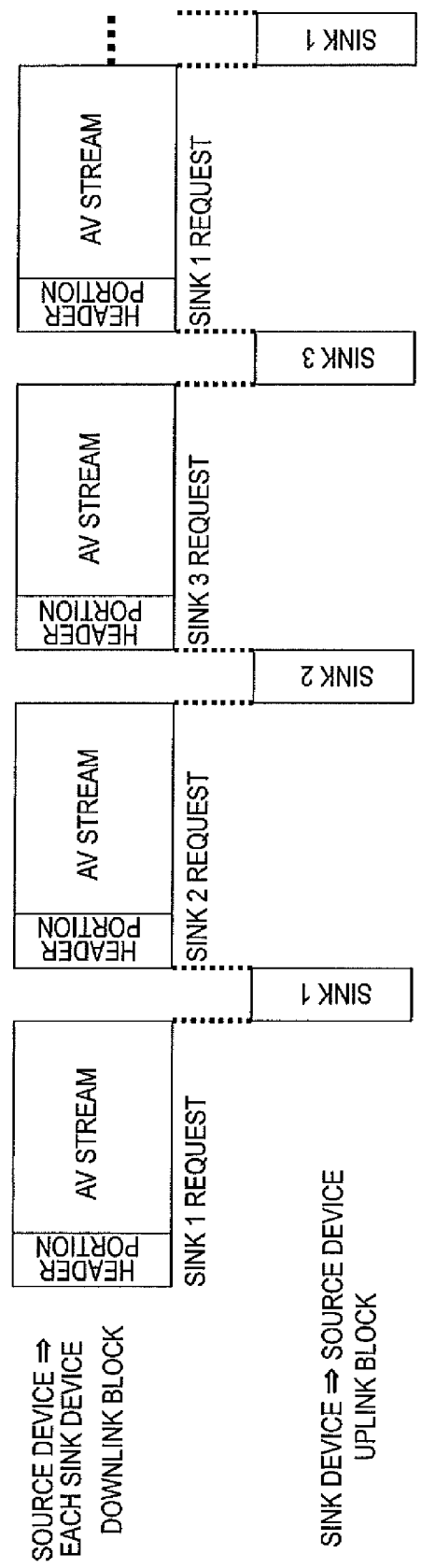
FIG. 2 is a diagram illustrating an example where a half-duplex communication is performed by using a single band, which is an example of a physical layer to realize a wireless transmission of an AV stream and information.

A physical layer example for realizing a wireless transmission of the AV streams and information will be described. FIG. 2 shows an example where a half-duplex communication is performed by using a single band. The source device sequentially transmits downlink blocks with a non-transmission period interposed therebetween to each of the sink devices by using a single band. In addition, the sink devices transmit uplink blocks to the source device in the above-described non-transmission period of the downlink blocks by using the above-described single band.

A header portion of the downlink block includes control information for each of the sink devices, and information of the sink devices or the like that will transmit the uplink block in the next non-transmission period (interval). AV stream that is reproduced by the sink devices is disposed behind the header portion. The source device releases the band such that the sink devices can transmit an uplink block after the transmission of a downlink block with a defined length.

The sink device, which is designated at the immediately preceding downlink block, transmits the uplink block to the source device after releasing the band. The uplink block includes various pieces of control information and EDID information or the like by a request from the source device.

Figure 3:
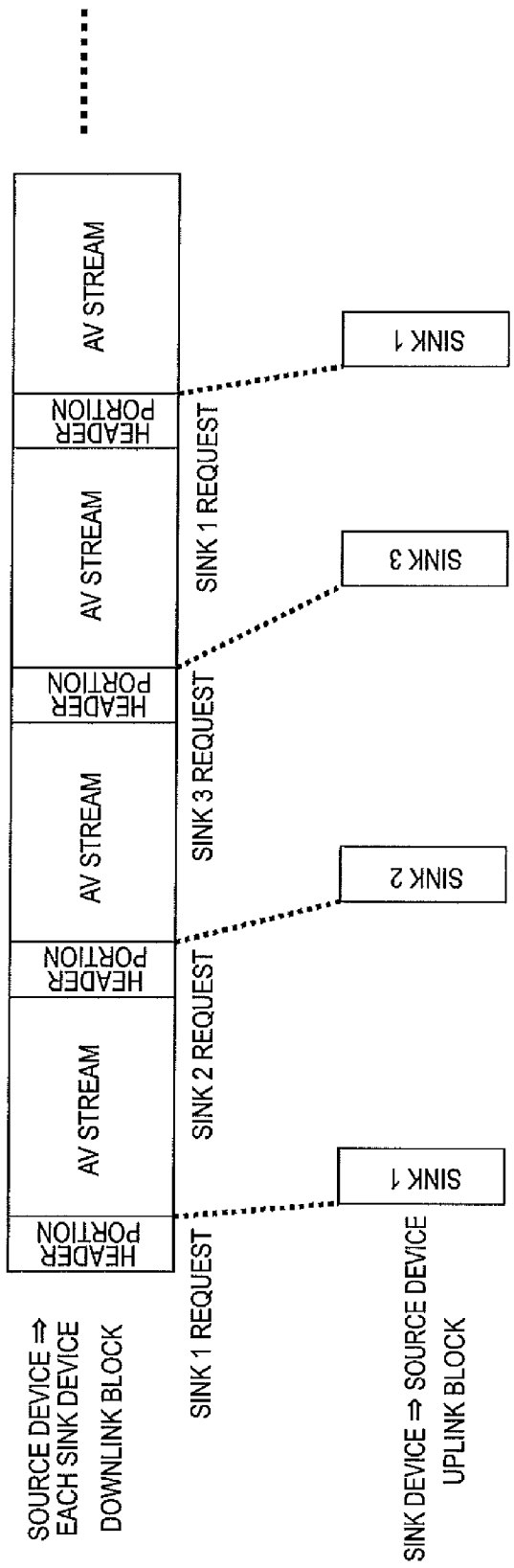
FIG. 3 is a diagram illustrating an example where full-duplex communication is performed by using a dual band, which is an example of a physical layer to realize wireless transmission of an AV stream and information.

FIG. 3 shows an example where a full-duplex communication is performed by using a dual band (a first band, a second band). The source device sequentially transmits the downlink blocks by using the first band. In addition, the source device transmits the uplink blocks to the source device by using the second band. Detailed description on content of the downlink blocks and the uplink blocks is omitted, but the content is substantially the same as that in the example using the single band as described above.

In a case where a single band is used like the example of FIG. 2, the number of bands used becomes one. However, it is necessary for the source device to release the band after transmitting the downlink block and to receive the uplink block from the sink devices. In addition, it is necessary for the sink devices to transmit the uplink block to the source device in synchronization with the non-transmission period (interval) of each downlink block.

Contrary to this, in a case where the dual band is used like the example of FIG. 3, the number of bands used becomes two. However, the source device can transmit the downlink blocks in succession without releasing the band. In addition, the sink devices can transmit the uplink blocks to the source device out of synchronization with the downlink blocks, regardless of timing, with respect to a request from the source device.

[Configuration Example of Source Device and Sink Device]

A configuration example of the source device 10 and the sink device 30 (30-1 to 30-N) will be described.

Figure 4:
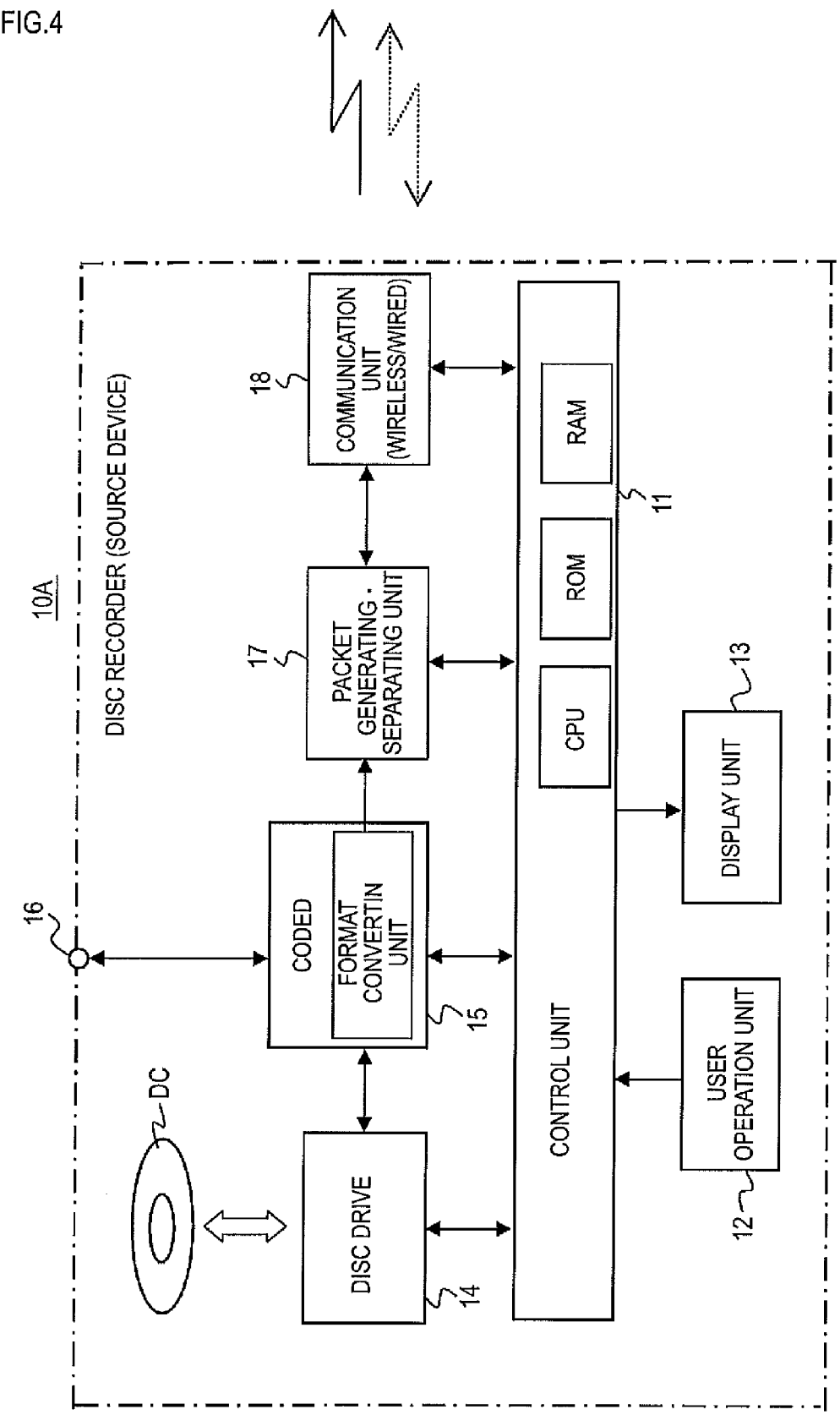
FIG. 4 is a block diagram illustrating a configuration example of a disc recorder as a source device.

First, the configuration example of the source device 10 will be described. FIG. 4 shows a configuration example of a disc recorder 10A as the source device 10. The disc recorder 10A includes a control unit 11, a user operation unit 12, a display unit 13, a disc drive 14, a codec 15, a terminal for the connection with an external device, a packet generating•separating unit 17, and a communication unit (wireless/wired) 18.

The control unit 11 controls an operation of each unit of the disc recorder 10A. The control unit 11 includes a CPU (Central Processing Unit), a ROM (Read Only Memory) and a RAM (Random Access Memory). The ROM stores a control program of the CPU, or the like. The RAM is used for a temporary storage of data necessary for a control process of the CPU, or the like.

The CPU lays out the program or data read out from the ROM on the RAM, activates the program and controls an operation of each unit of the disc recorder 10A. In addition, the CPU performs a request for, including EDID, various pieces of information of the sink devices such as the television/AV amplifier type, pairing information of the television and the AV amplifier, and the presence or absence of a downmix function via the communication unit 18, as described later. In addition, the CPU performs an analysis on various pieces of information, which is received by the communication unit 18, from the sink devices.

The user operation unit 12 and the display unit 13 make up a user interface and are connect to the control unit 11. The user operation unit 12 includes keys, buttons and dials disposed in a casing (not shown) of the disc recorder 10A, a touch panel disposed on a display surface of the display unit 13, a remote controller, or the like. The display unit 13 is configured by an LCD (Liquid Crystal Display) or the like.

The disc drive 14 records encoded data, which is obtained by encoding video data (video signal) and audio data (sound signal) accompanying the video data that are supplied from the codec 15 by using, for example, an MPEG (Moving Picture Experts Group) method or the like, on a disc-shaped recording medium DC such as a BD (Blu-ray Disc) and a DVD (Digital Versatile Disc). In addition, the disc drive 14 reproduces the encoded data from the disc-shaped recording medium. DC and supplies it to the codec 15.

The codec 15 decodes the encoded data supplied from the disc drive 14 to baseband (non-compressed) audio and video data by using the MPEG method or the like. The codec 15 supplies the data with the video and audio format to the packet generating•separating unit 17 and outputs it to the terminal 16. In addition, the codec 15 encodes the baseband audio and video data, which is input to the terminal 16 from an external device (not shown), to encoded data and supplies the encoded data to the disc drive 14. Here, as the external device, a hard disc recorder (HDD recorder), a personal computer, a DVD recorder, a video camera, or the like can be exemplified.

The packet generating•separating unit 17 generates a transmission packet including video and audio data supplied from the codec 15 and various pieces of information, for example, the above-described downlink block, and supplies it to the communication unit 18. In addition, the packet generating•separating unit 17 separates various pieces of information from a reception packet received by the communication unit 18, for example, above-described uplink block, and supplies it to the CPU in the control unit 11.

The communication unit 18 broadcasts the transmission packet, for example, the above-described downlink block, generated by the packet generating•separating unit 17 toward the sink devices such as a television receiver via a wireless or wired transmission medium. In addition, the communication unit 18 receives a reception packet, which is transmitted from the sink devices via the wireless or wired transmission medium, for example, the above-described uplink block and supplies it to the packet generating•separating unit 17.

Figure 5:
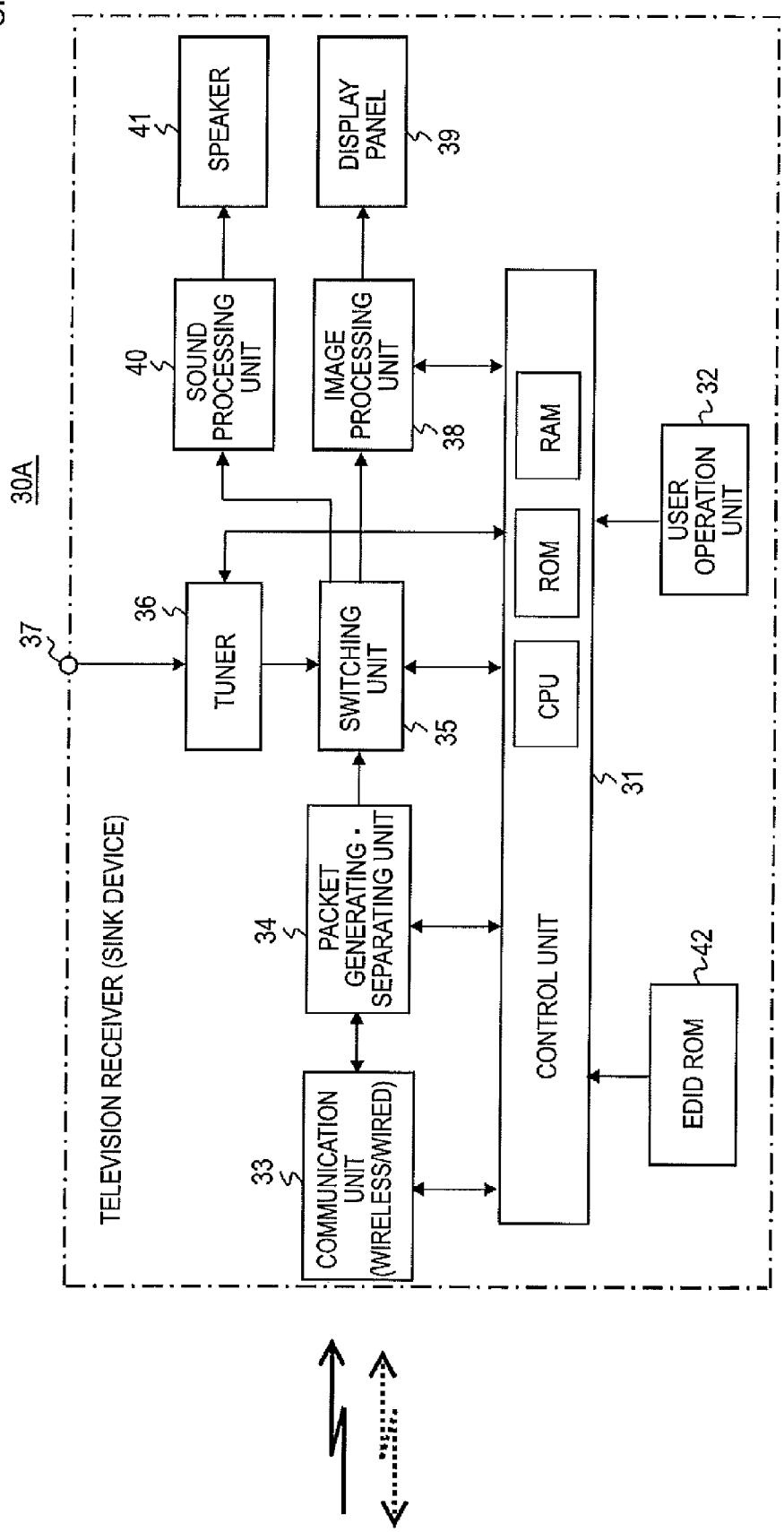
FIG. 5 is a block diagram illustrating a configuration example of a television receiver (television monitor) as the sink device.

Next, a configuration example of the sink device 30 (sink devices 30-1 to 30-N) will be described. FIG. 5 shows a configuration example of a television receiver 30A as the sink device 30. The television receiver 30A includes a control unit 31, a user operation unit 32, and an EDID ROM 42. In addition, the television receiver 30A includes a communication unit (wireless/wired) 33, a packet generating•separating unit 34, a switching unit 35, a tuner 36, an antenna terminal 37, an image processing unit 38, a display panel 39, a sound processing unit 40, and a speaker 41.

The control unit 31 controls an operation of each unit of the television receiver 30A. The control unit 31 includes a CPU, a ROM, and a RAM. The ROM stores a control program of the CPU, or the like. The RAM is used for a temporary storage of data necessary for the control process of the CPU.

The CPU lays out the program or data read out from the ROM on the RAM, activates the program and controls an operation of each unit of the television receiver 30A. In addition, the CPU performs an analysis on control information transmitted from the source device. In addition, the CPU collects, including EDID, various pieces of information of the sink device according to the request from the source device and supplies them to the packet generating•separating unit 34.

The user operation unit 32 is connected to the control unit 31. The user operation unit 32 includes keys, buttons and dials disposed in a casing (not shown) of the television receiver 30A, a remote controller, or the like. The EDID ROM stores the EDID that is information related to the performance (configuration/capability) of the television receiver 30A. The EDID includes information of a video format and an audio format compatible with the television receiver 30A. The EDID ROM 42 connects to the control unit 31. The EDID ROM 42 is configured by, for example, an EEPROM, a flash memory, or the like, and is made to be rewritable.

The communication unit 33 receives a reception packet, which is transmitted from the source device via the wireless or wired transmission medium, for example, above-described downlink block and supplies it to the packet generating•separating unit 34. In addition, the communication unit 33 transmits a transmission packet, which is generated by the packet generating•separating unit 34, for example, the above-described uplink block, to the source device via a wireless or wired transmission medium.

The packet generating•separating unit 34 generates a transmission packet, for example, above-described uplink block and supplies it to the communication unit 33. In addition, the packet generating•separating unit 34 separates and extracts video and audio data and various pieces of information from the reception packet, which is transmitted from the source device via a wireless or wired transmission medium, for example, the above-described downlink block. The packet generating•separating unit 34 supplies the video and audio data to the switching unit 35. In addition, the packet generating•separating unit 34 supplies the various pieces of information transmitted from the source device to the CPU in the control unit 31.

The tuner 36 receives, for example, BS broadcasting, terrestrial digital broadcasting, or the like. A broadcasting signal captured by an antenna (not shown) connected to the antenna terminal 37 is supplied to the tuner 36. The tuner 36 acquires video and audio data of a predetermined program based on the broadcasting signal. The switching unit 35 selectively takes out the video and audio data extracted by the packet generating•separating unit 34 and the video and audio data acquired by the tuner 36.

The image processing unit 38 performs a process such as color adjustment, contour enhancement, and superposition of graphics data with respect to the video data taken out by the switching unit 35. The display panel 39 displays an image with the video data processed by the image processing unit 38. The display panel 39 is configured by, for example, an LCD (Liquid Crystal Display), an organic EL (ElectroLuminescence), a PDP (Plasma Display Panel), or the like.

The sound processing unit 40 performs a necessary process such as amplification and a D/A conversion with respect to the audio data taken out by the switching unit 35. The sound processing unit 40 supplies a sound signal after the process to the speaker 41.

Figure 6:
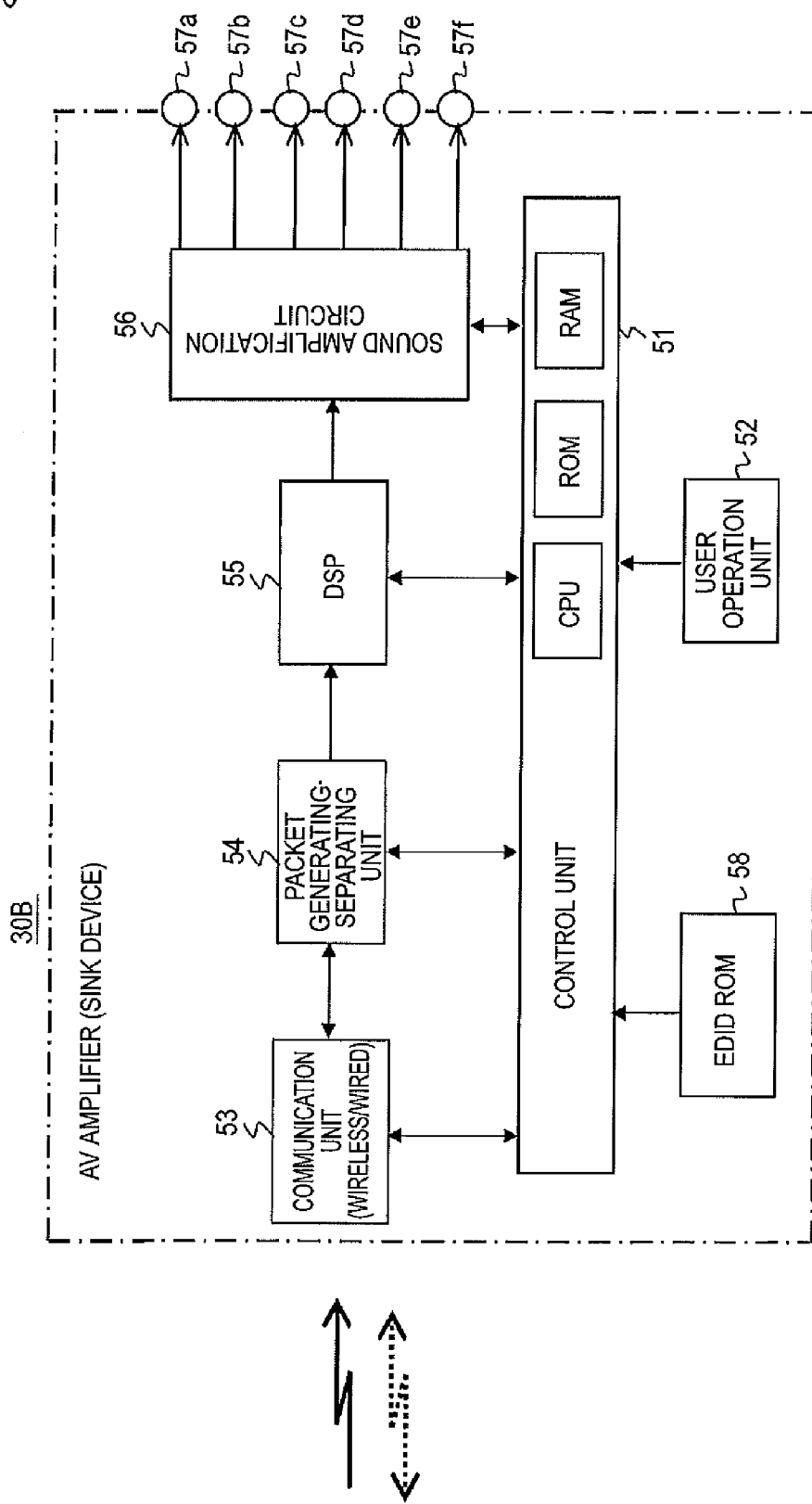
FIG. 6 is a block diagram illustrating a configuration example of an AV amplifier as the sink device.

FIG. 6 shows a configuration example of an AV amplifier 30B as the sink device 30. The AV amplifier 30B includes a control unit 51, a user operation unit 52, and an EDID ROM 58. In addition, the AV amplifier 30B includes a communication unit (wireless/wired) 53, a packet generating•separating unit 54, a digital signal processor (DSP) 55, a sound amplification circuit 56, and sound output terminals 57a to 57f.

The control unit 51 controls an operation of each unit of the AV amplifier 30B. The control unit 51 includes a CPU, a ROM, and a RAM. The ROM stores a control program of the CPU or the like. The RAM is used for temporary storage of data necessary for a control process of the CPU, or the like.

The CPU lays out the program or data read out from the ROM on the RAM, activates the program and controls an operation of each unit of the AV amplifier 30B. In addition, the CPU performs an analysis on control information transmitted from the source device. In addition, the CPU collects, including EDID, various pieces of information of the sink device according to the request from the source device and supplies them to the packet generating•separating unit 54.

The user operation unit 52 is connected to the control unit 51. The user operation unit 52 includes keys, buttons and dials disposed in a casing (not shown) of the AV amplifier 30B, a remote controller, or the like. The EDID ROM 58 stores the EDID that is information related to the performance (configuration/capability) of the AV amplifier 30B. The EDID includes information of an audio format compatible with the AV amplifier 30B. The EDID ROM 58 connects to the control unit 51. The EDID ROM 58 is configured by, for example, an EEPROM, a flash memory, or the like, and is made to be rewritable.

The communication unit 53 receives a reception packet, which is transmitted from the source device via the wireless or wired transmission medium, for example, the above-described downlink block and supplies it to the packet generating•separating unit 54. In addition, the communication unit 53 transmits transmission packets, which are generated by the packet generating•separating unit 54, for example, the above-described uplink block, to the source device.

The packet generating•separating unit 54 generates a transmission packet, for example, the above-described uplink block and supplies it to the communication unit 53. In addition, the packet generating•separating unit 54 separates and extracts audio data and various pieces of information from the reception packet, which is transmitted from the source device via a wireless or wired transmission medium, for example, the above-described downlink block. The packet generating•separating unit 54 supplies the audio data to the DSP 55. In addition, the packet generating•separating unit 54 supplies the various pieces of information transmitted from the source device to the CPU in the control unit 51.

The DSP 55 performs a process that processes the audio data obtained by the packet generating•separating unit 54 and generates sound data of each channel to realize 5.1 channel surround sound, a process that applies a predetermined sound characteristic, a process that converts a digital signal to an analog signal, or the like. The sound amplification circuit 56 amplifies a front left sound signal SFL, a front right sound signal SFR, a front center sound signal SFC, a rear left sound signal SRL, a rear right sound signal SRR, and a subwoofer sound signal $S_{SW}$, which are output from the DSP 55, and outputs them to the sound output terminals 57a to 57f.

[Method of Determining Transmission Data Format]

A method of determining the transmission data format (transmission video format and transmission audio format) in the source device 10 will be described in detail. The source device 10 determines a transmission video format based on the video format information in the EDID acquired from each of the sink devices 30-1 to 30-N. In addition, the source device 10 determines a transmission audio format based on the audio format information in the EDID acquired from each of the sink devices 30-1 to 30-N.

When the transmission video format is determined, information of a color format (Color Format), a video identification code (Video IdentificationCode) and a deep color mode (Deep Color Mode), which are included in the EDID, is used. In addition, when the transmission audio format is determined, information of an audio format, and in each audio format the maximum number of channels, a sampling frequency and a quantization bit number, which are included in the EDID, is used.

Figure 7:
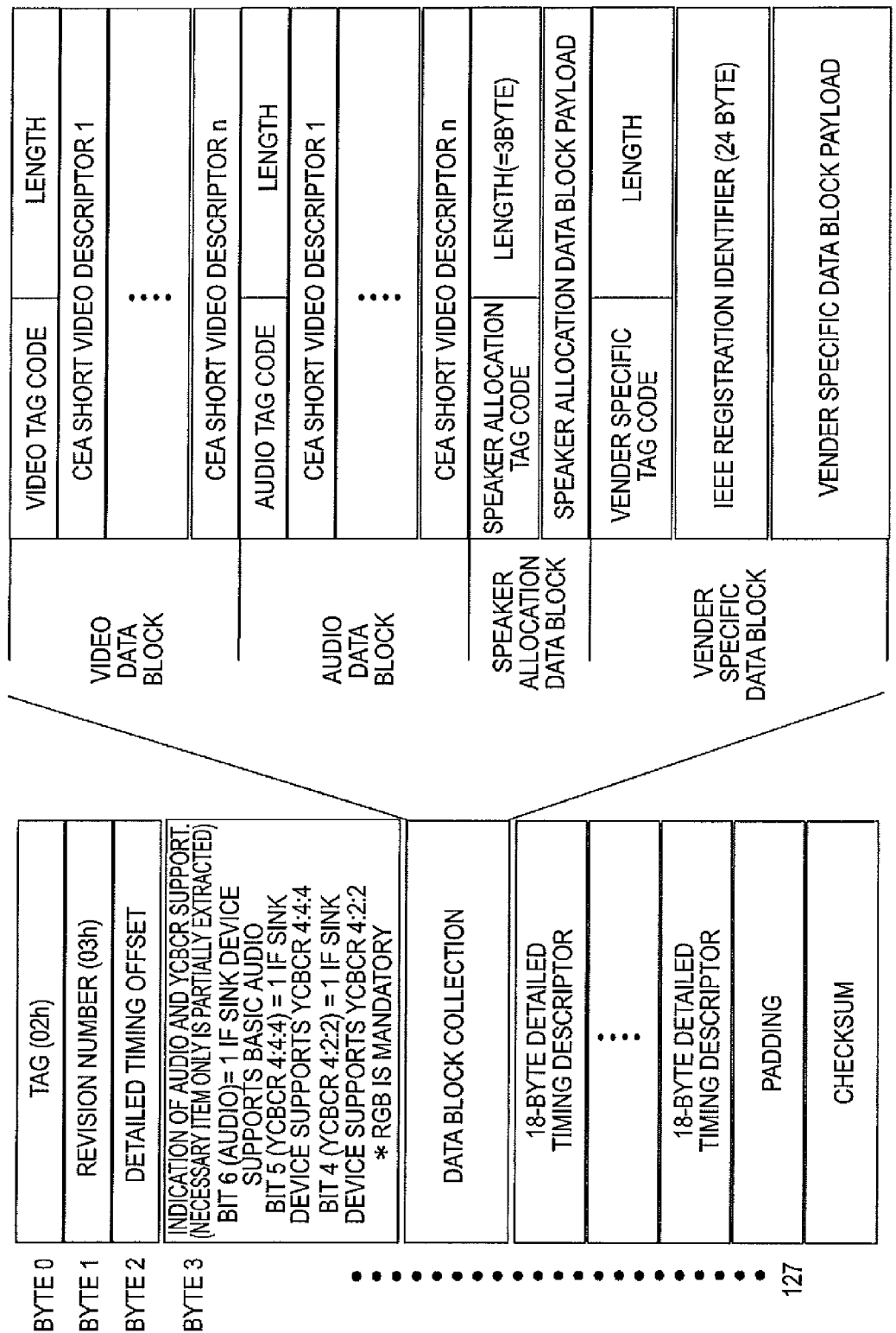
FIG. 7 is a diagram illustrating an EDID structure (Block 1 and thereafter, an expanded portion for an HDMI).
Figure 8:
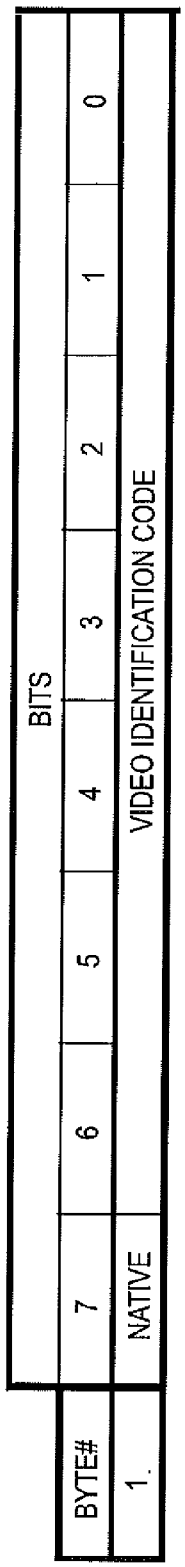
FIG. 8 is a diagram illustrating details of a CEA Short Video Descriptor.

FIG. 7 shows an EDID structure (Block 1 and thereinafter, an expanded portion for an HDMI). Detailed description of the EDID structure is omitted, but it is defined by the EIA/CEA-861D standard. In FIG. 7, Video Formats that can be displayed by the sink device is defined in each CEA Short Video Descriptor of a Video Data Block. FIG. 8 shows details of the CEA Short Video Descriptor. The Video Format that can be displayed is designated by a Video Identification Code of 7 bits. FIG. 9 shows a correlation between the Video Format and the Video Identification Code (Video ID Code) (partial extraction).

In addition, in FIG. 7, an Audio Format, which can be reproduced by the sink device, the maximum number of channels, a sampling frequency, and a quantization bit number are defined in an Audio Data Block of each CEA Short Audio Descriptor. FIGS. 10(a) to (c) show details of the CEA Short Audio Descriptor. As shown in FIGS. 10(a) to (c), the CEA Short Audio Descriptor is classified into three types due to a difference in the Audio Format. FIG. 10(a) shows details of the CEA Short Audio Descriptor corresponding to "Audio Code=1: Linear-PCM". FIG. 10(b) shows details of the CEA Short Audio Descriptor corresponding to "audio code=2-8". FIG. 10(c) shows details of the CEA Short Audio Descriptor corresponding to "audio code=9-15". FIG. 11 shows a supportable Audio Format Code.

In addition, FIG. 12 shows a structure of a Vendor Specific Data Block (VSDB). DC_48 bit, DC_36 bit, DC_30 bit, and DCY444 as support information of a deep color mode of the sink device are defined in Byte 6. Meanwhile, the DCY 444 indicates whether or not the deep color is permitted in the color format of YCBCR.

In addition, in FIG. 7, a color format supported by the sink device is defined in an Identification of Audio and YCBCR support of Byte 3. In addition, a Colorimetry Data Block shown in FIG. 13 is defined in the EDID structure. The color format supported by the sink device is also defined in xvYCC709 and xvYCC601 of the Byte 3 of the Colorimetry Data Block.

[Determination of Transmission Video Format] The source device 10, first, creates a common list representing a video format with which the sink device 30-1 to 30-N are commonly compatible, to determine the transmission video format.

Items common at the time of creating the common list are three items as follows:
  a. Color Format Type
  b. Video Identification Code Type
  c. Deep Color Mode Type In regard to the item of "a. Color Format Type", common items are determined with reference to Byte 3 (RGB, YCBCR 4:4:4, YCBCR4:2:2) of the EDID structure shown in FIG. 7, and Byte 3 (xvYCC709, xvYCC601) of the Colorimetry Data Block. In addition, in regard to the item of "b. Video Identification Code Type", the common items are determined with reference to a CEA Short Video Descriptor shown in FIG. 8. In addition, in regard to the item "c. Deep Color Mode Type", the common items are determined with reference to Byte 6 (DC_48 bit, DC_36 bit, DC_30 bit, DCY444) of a VSDB structure shown in FIG. 12.

FIG. 14 shows a creation example of a common list in regard to a video format. In this example, there is shown a case where the number of the sink devices is three. In regard to the color format, a sink device 1 supports RGB, YCBCR4:4:4, YCBCR4:2:2, xvYCC601, and xvYCC709, a sink device 2 supports RGB, YCBCR4:4:4, and YCBCR4:2:2, and a sink device 3 supports RGB, YCBCR4:4:4, and YCBCR4:2:2. Therefore, as the common items of the color format, the RGB, YCBCR4:4:4, and YCBCR4:2:2 are determined. Meanwhile, it is mandatory for the source device and the sink devices to support RGB, and other color formats are optional.

In addition, in regard to the video format, the sink devices 1 to 3 support the following video formats, respectively. The sink device 1 supports 01: 640×480p@59.94/60 Hz, 02: 720× 480p@59.94/60 Hz, 03: 720×480p@59.94/60 Hz, 04: 1280× 720p@59.94/60 Hz, 05: 1920×1080i@59.94/60 Hz, 16: 1920×1080p@59.94/60 Hz, 31: 1920×1080p@50 Hz, and 32: 1920×1080p@23.98/24 Hz. The sink device 2 supports 01: 640×480p@59.94/60 Hz, 02: 720×480p@59.94/60 Hz, 03: 720×480p@59.94/60 Hz, 04: 1280×720p@59.94/60 Hz, 05: 1920×1080i@59.94/60 Hz, and 32: 1920×1080p@23.98/ 24 Hz. The sink device 3 supports 01: 640×480p@59.94/60 Hz, 02: 720×480p@59.94/60 Hz, 03: 720×480p@59.94/60 Hz, 04: 1280×720p@59.94/60 Hz, 05: 1920×1080i@59.94/ 60 Hz, 16: 1920×1080p@59.94/60 Hz, and 31: 1920×1080p@50 Hz. In addition, the two-digit number at the front of the video formats indicates a Video ID Code (see FIG. 9).

Therefore, as the common items of the video format, 01: 640×480p@59.94/60 Hz, 02: 720×480p@59.94/60 Hz, 03: 720×480p@59.94/60 Hz, 04: 1280×720p@59.94/60 Hz, and 05: 1920×1080i@59.94/60 Hz are determined. In addition, it is mandatory for the source device and the sink devices to support 01: 640×480p@59.94/60 Hz, 02: 720×480p@59.94/ 60 Hz, 03: 720×480p@59.94/60 Hz, 04: 1280×720p@59.94/ 60 Hz, and 05: 1920×1080i@59.94/60 Hz, and others are optional.

In addition, in regard to the deep color mode, the sink device 1 supports DC_48bit, DC_36bit, DC_30bit, and DCY444, the sink device 2 supports DC_30bit and DCY444, and the sink device 3 supports DC_36bit, DC_30bit, and DCY444. Therefore, the DC_30 bit and DCY444 are determined as the common items of the deep color mode.

Next, the source device 10 determines the color format, the video format, and the deep color mode as the transmission video format by using the common list created as described above. In addition, in this case, the source device 10 refers to stored information of a priority ordering of the color format, the video format, and the deep color mode.

Figure 15:
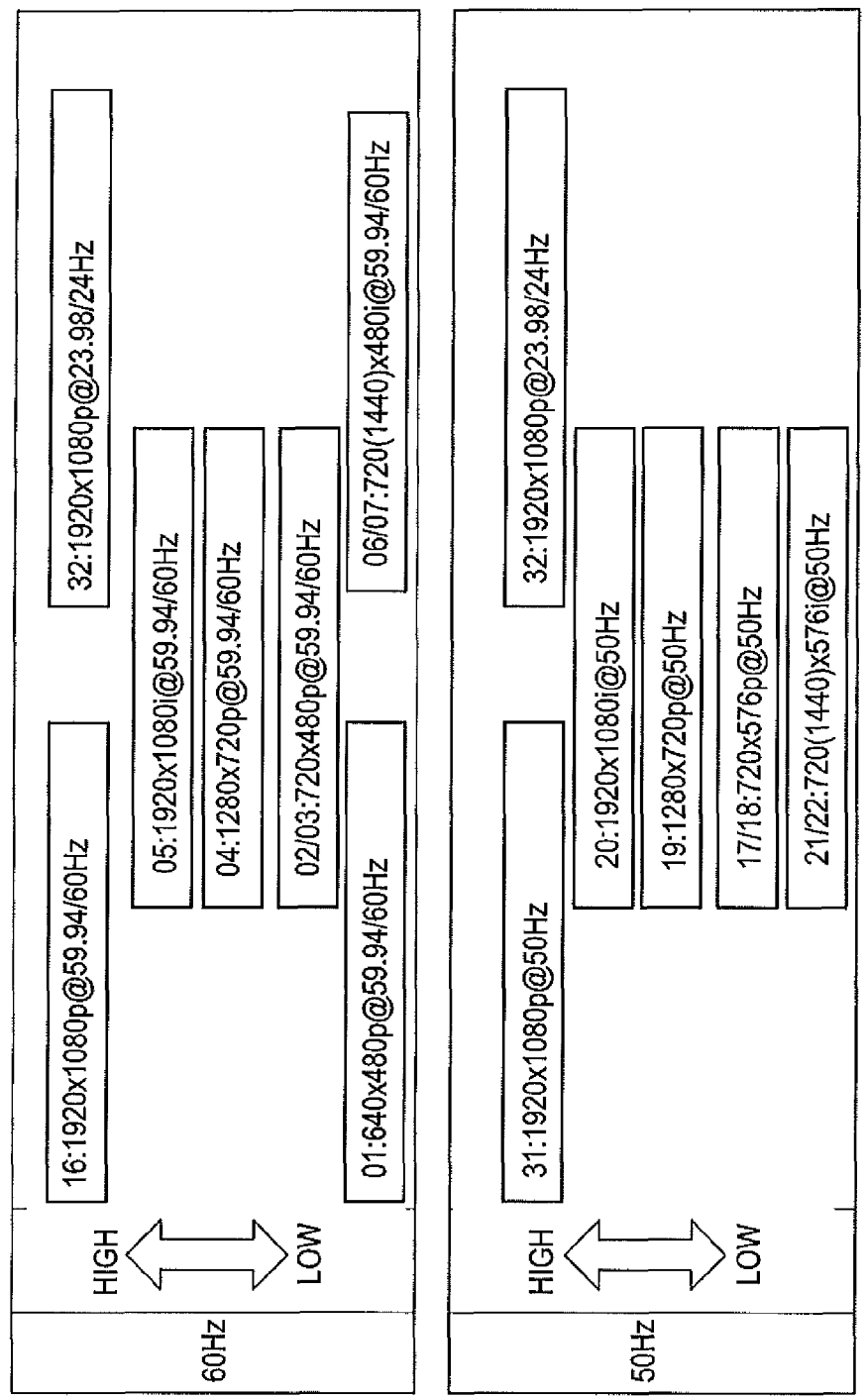
FIG. 15 is a diagram illustrating a priority ordering example of a video format frequently used in an HDMI among video formats.

FIG. 15 shows a priority ordering of the video format frequently used by the HDMI in the video formats. As a determination reference of the priority ordering in regard to other Video Formats not described in FIG. 15, as the number of original pixel clocks (value when Pixel Repetition Factor=0) is high, it becomes a high priority ordering. In addition, as an exception, when commonly supported by the source device and each of the sink devices, the 1920×1080p@23.98/ 24 Hz is set to the video format with a top priority ordering.

Figure 16:
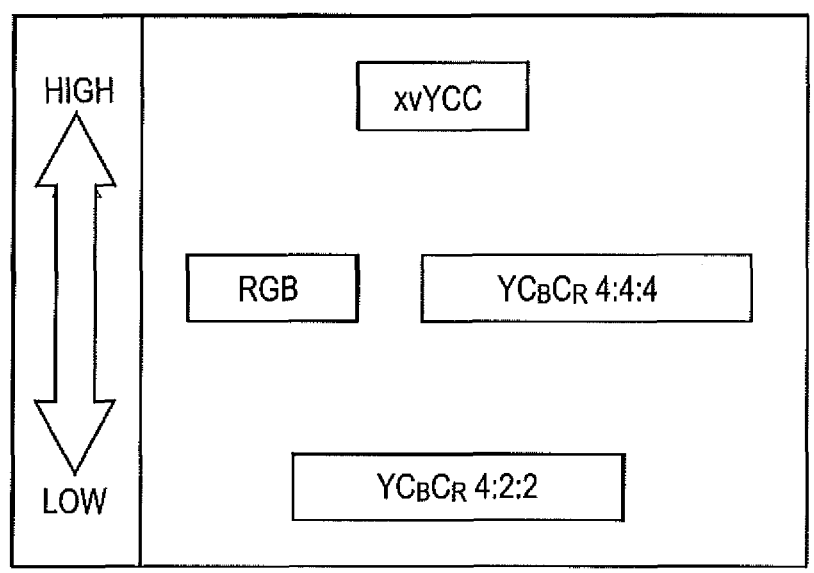
FIG. 16 is a diagram illustrating a priority ordering example of a color format.
Figure 17:
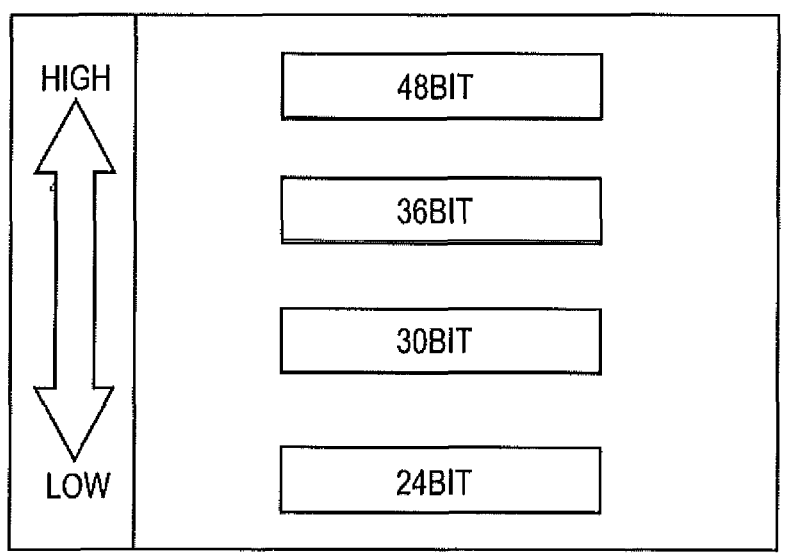
FIG. 17 is a diagram illustrating a priority ordering example of a deep color mode.

FIG. 16 shows a priority ordering of a color format. In addition, FIG. 17 shows a priority ordering of a deep color mode. In FIGS. 15, 16 and 17, as the priority ordering is high, they have high image quality.

The control unit (CPU) of the source device 10 determines the video format making up the transmission video format as described below. Specifically, when a video format of video data (video source) that is a transmission object is present in the common list, the control unit basically determines the video format thereof as the transmission video format. In this case, since a video format of AV streams broadcast from the source device 10 is compatible with each of the sink devices 30-1 to 30-N, reproduction becomes possible. That is, it is possible to successfully broadcast the AV streams from the source device 10 to each of the sink devices 30-1 to 30-N.

In addition, when the video format of the video data that is a transmission object is not present in the common list, the control unit determines a video format of a mandatory standard as the transmission video format. When it is determined as described above, in the source device 10, the video format of the video data that is the transmission object is converted into a video format of a mandatory standard by the format converting unit. In the disc recorder 10A shown in FIG. 4, the format converting unit is included in, for example, the codec 15.

In this case, in each of the sink devices 30-1 to 30-N, the video format of AV streams broadcast from the source device 10 is a video format of a mandatory standard and each of the sink devices 30-1 to 30-N is compatible with the video format, and reproduction becomes possible. That is, even when the video format of a video source (video data that is a transmission object) is not present in the common list (video), it is possible to successfully broadcast the AV streams from the source device 10 to each of the sink devices 30-1 to 30-N.

In addition, when a video format with a priority ordering higher than that of a video format of video data that is a transmission object is present in the common list and the conversion into a video format with a high priority ordering by the format converting unit is possible, the control unit determines the video format with a high priority ordering as the transmission video format. When it is determined as described above, in the source device 10, the video format of the video data that is the transmission object is converted into the video format with a high priority ordering by the format converting unit.

In this case, the image source (video data that is a transmission object) is converted to have a video format with a high priority ordering and is broadcast from the source device 10 to the plurality of sink devices 30-1 to 30-N. For this reason, to the extent that the data format has a high priority ordering, the data format has a high quality, such that each of the sink devices 30-1 to 30-N can receive video data with a higher quality and thereby display quality can be improved.

Detailed description will be omitted, but the control unit (CPU) of the source device 10 determines a color format and a deep color mode that make up the transmission video format, similar to the above-described video format.

[Determination of Transmission Audio Format]

The source device 10 creates, first, a common list representing an audio format commonly compatible with the sink devices 30-1 to 30-N to determine the transmission audio format.

Items that are common at the time of creating the common list are as follows:
 a. Audio format type
 b. In regard to each audio format,
  b-1. Maximum number of channels
  b-2. Sampling frequency
  b-3. Quantization bit number In regard to each item, common items are determined with reference to CEA Audio Descriptor shown in FIGS. 10 (*a*) to (*c*).

FIG. 18 shows a creation example of a common list in regard to an audio format. In this example, there is shown a case where the number of the sink devices is three. A sink device 1 supports an Audio Format Code=1 (Linear-PCM), and in this format, it supports Max number of Channels=7 (8ch), 192/176.4/96/88.2/48/44.1/32 kHz, and 24/20/16 bit. In addition, the sink device 1 supports an Audio Format Code=6 (AAC), and in this format, it supports Max number of Channels=7 (8ch), 192/176.4/96/88.2/48/44.1/32 kHz.

In addition, the sink device 1 supports an Audio Format Code=7 (DTS), and in this format, it supports Max number of Channels=7 (8ch), 192/176.4/96/88.2/48/44.1/32 kHz. In addition, the sink device 1 supports an Audio Format Code=10 (Dolby Digital+), and in this format, it supports Max number of Channels=7 (8ch), 192/176.4/96/88.2/48/44.1/32 kHz. In addition, the sink device 1 supports an Audio Format Code=(DTS-HD), and in this format, it supports Max number of Channels=7 (8ch), 192/176.4/96/88.2/48/44.1/32 kHz.

A sink device 2 supports an Audio Format Code=1 (Linear-PCM), and in this format, it supports Max number of Channels=5 (6ch), 96/88.2/48/44.1/32 kHz, and 24/20/16 bit. In addition, sink device 2 supports an Audio Format Code=7 (DTS), and in this format, it supports Max number of Channels=5 (6ch), 96/88.2/48/44.1/32 kHz.

In addition, the sink device 2 supports an Audio Format Code=10 (Dolby Digital+), and in this format, it supports Max number of Channels=5 (6ch), 96/88.2/48/44.1/32 kHz. In addition, the sink device 2 supports an Audio Format Code=(DTS-HD), and in this format, it supports Max number of Channels=5 (6ch), 96/88.2/48/44.1/32 kHz.

A sink device 3 supports an Audio Format Code=1 (Linear-PCM), and in this format, it supports Max number of Channels=3 (4ch), 48/44.1/32 kHz, and 24/20/16 bit. In addition, the sink device 3 supports an Audio Format Code=10 (Dolby Digital+), and in this format, it supports Max number of Channels=3 (4ch), and 48/44.1/32 kHz.

Therefore, as the common items of the audio format, the Audio Format Code=1 (Linear-PCM) and the Audio Format Code=10 (DolbyDigital+) are determined so as to be commonly compatible with the sink devices 1 to 3. In addition, in regard to the audio format of the Audio Format Code=1 (Linear-PCM), as the maximum number of the channels, the sampling frequency, and the quantization bit number, the Max number of Channels=3 (4ch), 48/44.1/32 kHz, and 24/20/16 bit are determined so as to be commonly compatible with the sink devices 1 to 3. In addition, in regard to the audio format of the Audio Format Code=10 (Dolby Digital+), as the maximum number of the channels and the sampling frequency, the Max number of Channels=3 (4ch) and 48/44.1/32 kHz are determined so as to be commonly compatible with the sink devices 1 to 3.

In this case, in regard to the audio format, it is set to that commonly included in the sink devices 1 to 3. In addition, the maximum number of channels commonly compatible with the sink device 1 to 3 is set to the minimum number of channels in the maximum number of channels of the sink devices 1 to 3. In addition, in regard to the sampling frequency and the quantization bit number, they are set to those commonly compatible with the sink devices 1 to 3.

Next, the source device 10 determines the audio format, the maximum number of channels, the sampling frequency and the quantization bit number as the transmission audio format by using the common list created as described above. In addition, in this case, the source device 10 refers to stored information of the priority ordering of the audio format.

Figure 19:
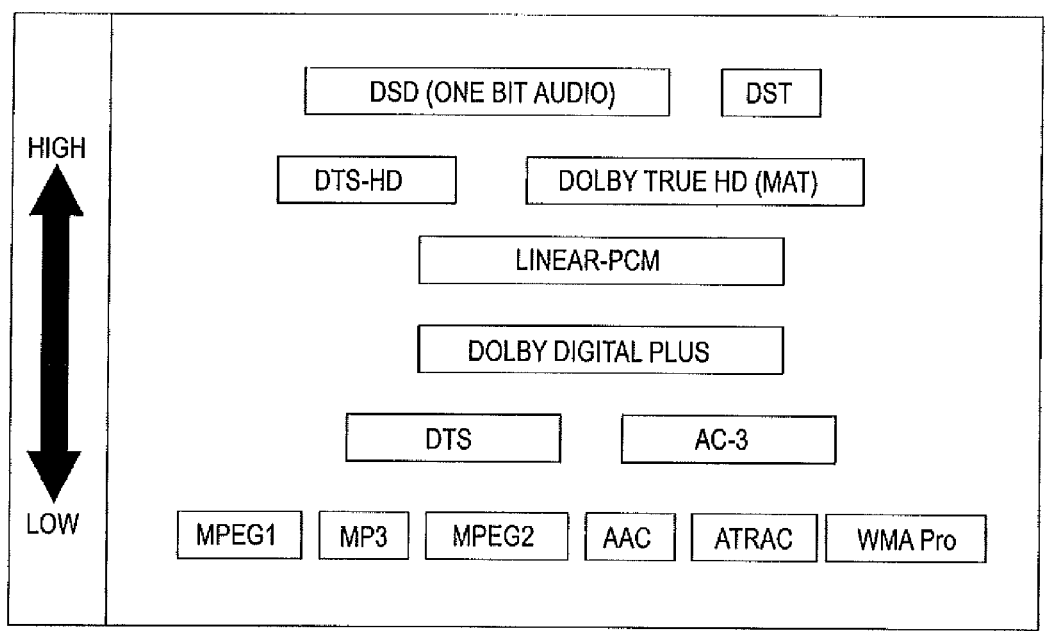
FIG. 19 is a diagram illustrating a priority ordering example of each of audio formats with a sound quality given as a reference.
Figure 20:
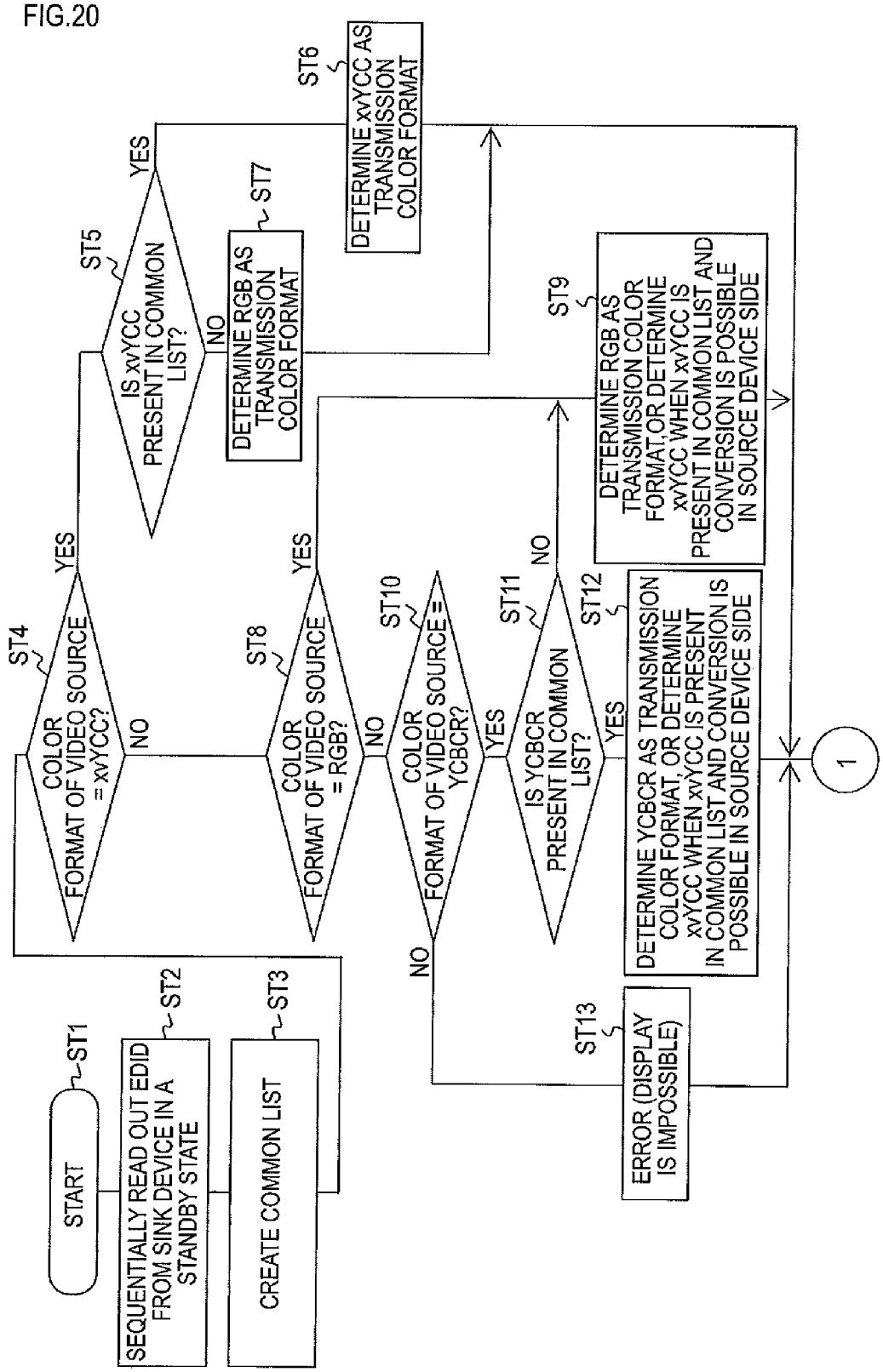
FIG. 20 is a diagram (1/4) illustrating an initial process of a source device.
Figure 21:
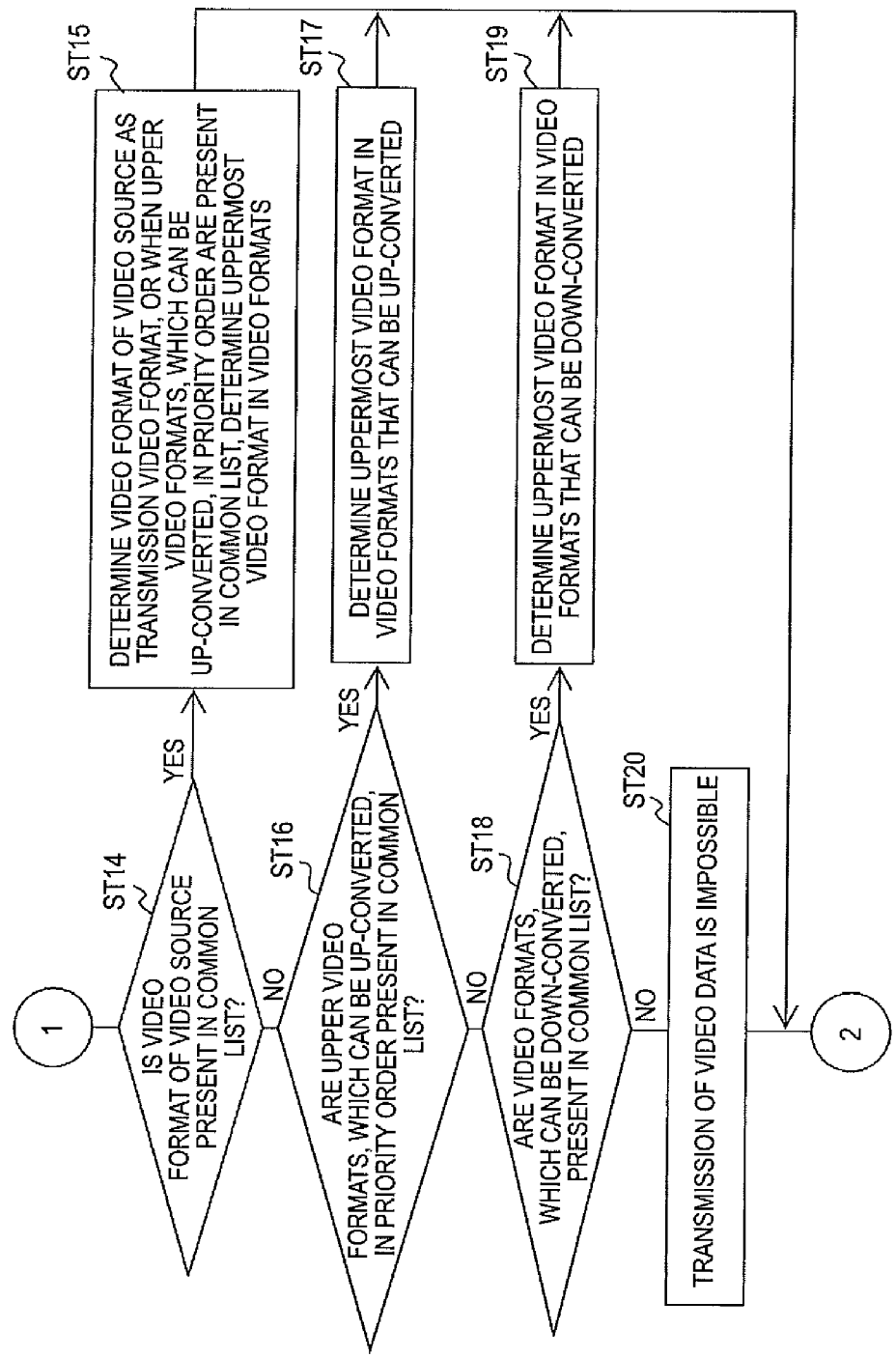
FIG. 21 is a diagram (2/4) illustrating an initial process of a source device.
Figure 22:
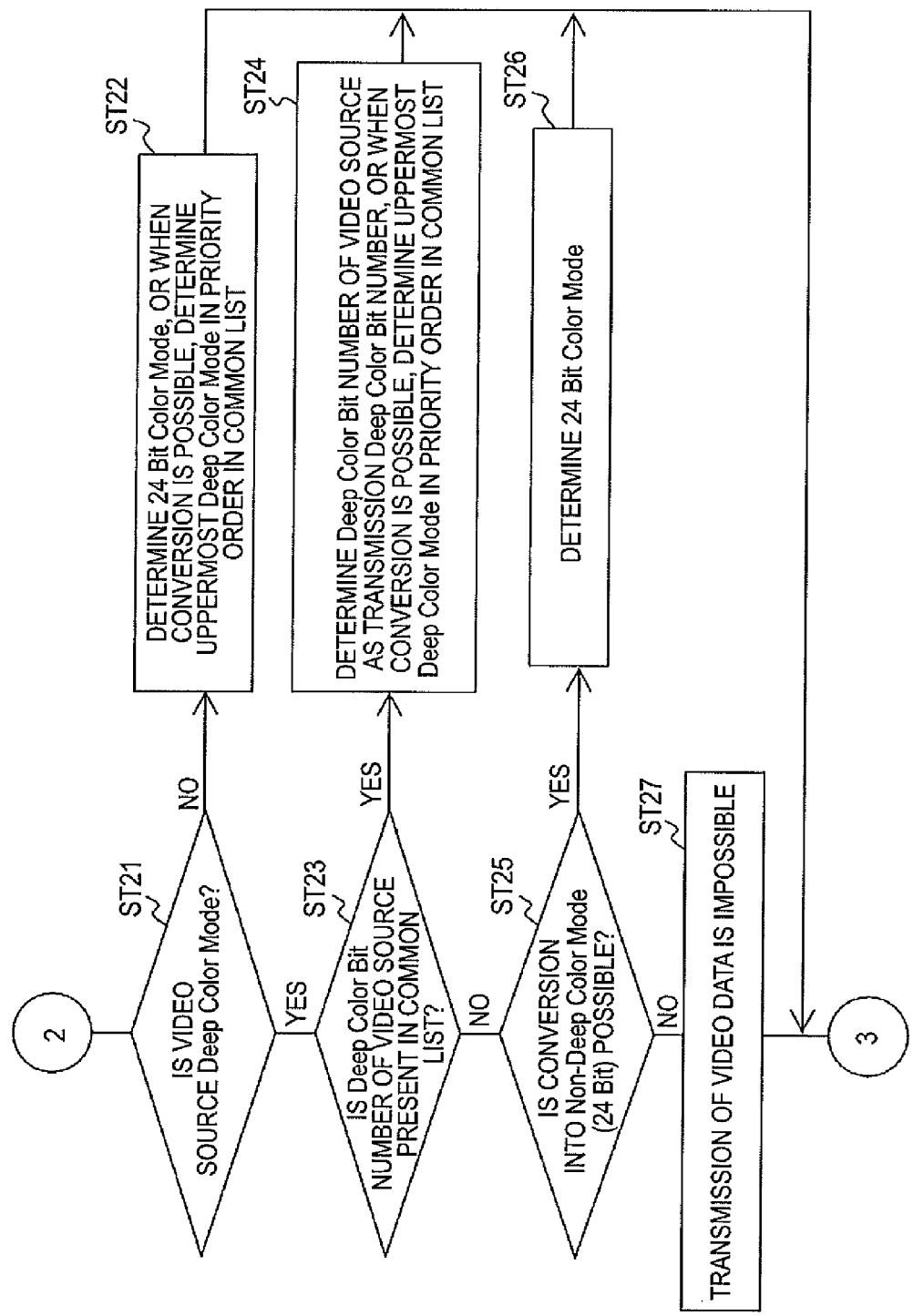
FIG. 22 is a diagram (3/4) illustrating an initial process of a source device.
Figure 23:
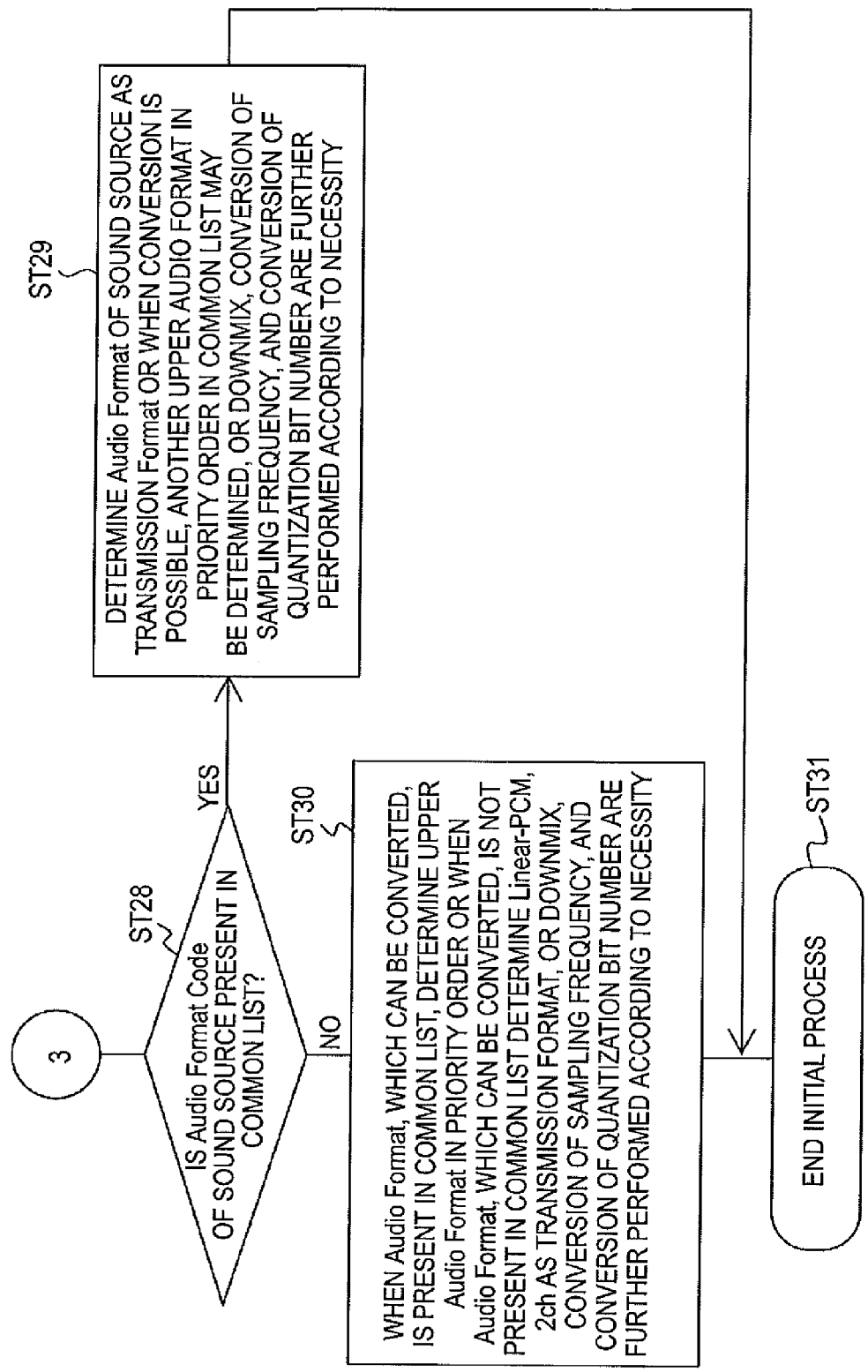
FIG. 23 is a diagram (4/4) illustrating an initial process of a source device.

FIG. 19 shows the priority ordering of each of the audio formats in FIG. 11 with a sound quality given as a reference. As it goes toward an upper side format, the sound quality gets higher. However, FIG. 19 shows only an example, it is not absolute.

The control unit (CPU) of the source device 10 determines the audio format making up the transmission audio format as described below. Specifically, when an audio format of audio data (audio source) that is a transmission object is present in the common list, the control unit basically determines the audio format thereof as the transmission audio format. In this case, since an audio format of AV streams broadcast from the source device 10 is compatible with each of the sink devices 30-1 to 30-N, reproduction becomes possible. That is, it is possible to successfully broadcast the AV streams from the source device 10 to each of the sink devices 30-1 to 30-N.

In addition, when an audio format with a priority ordering higher than that of an audio format of audio data that is a transmission object is present in the common list and the conversion into an audio format with a high priority ordering by the format converting unit is possible, the control unit determines the audio format with a high priority ordering as the transmission audio format.

In this case, the sound source (audio data that is a transmission object) is converted to have an audio format with a high priority ordering and is broadcast from the source device 10 to the plurality sink devices 30-1 to 30-N. For this reason, to the extent that the audio format has a high priority ordering, the audio format has a high quality, such that each of the sink devices 30-1 to 30-N can receive audio data with a higher quality and thereby reproduction quality can be improved.

In addition, when the audio format of the audio data that is a transmission object is not present in the common list, the control unit determines the transmission audio format as described below. Specifically, when an audio format commonly compatible with each of the sink devices is present in the created common list, and the conversion into the audio format by the format converting unit is possible, the control unit determines the audio format as the transmission audio format.

In addition, when an audio format commonly compatible with each of the sink devices is present in the created common list but the conversion into the audio format by the format converting unit is impossible, the control unit determines the Linear-PCM, 2ch, that is an audio format of a mandatory standard, as the transmission audio format. In addition, even when an audio format commonly compatible with each of the sink devices is not present in the created common list, the control unit determines the Linear-PCM, 2ch that is the audio format of the mandatory standard, as the transmission audio format. In this case, the audio format of AV streams broadcast from the source device 10 is an audio format of a mandatory standard, each of the sink devices 30-1 to 30-N is compatible with the audio format, and thereby reproduction becomes possible. That is, even when the audio format of the sound source (audio data that is a transmission object) is not present in the common list (audio), the broadcast transmission from the source device 10 to each of the sink devices 30-1 to 30-N can be successfully performed.

Accompanying the determination of the transmission audio format as described above, the control unit performs a conversion of an audio format, a downmix, conversion of a sampling frequency, and conversion of quantization bit number, according to necessity.

[Operation at Start-Up of Source Device]

In regard to an AV system 10 shown in FIG. 1, description will be given with respect an operation when at least one of the sink devices 30-1 to 30-N is in a standby state and a power source of the source device 10 is turned on. At this time, the control unit (CPU) of the source device 10 performs a control process (initial process) shown by flowcharts of FIGS. 20 to 23.

First, in step ST1, the control unit starts the process. Then, in step ST2, the control unit sequentially reads out EDID from each of sink devices in a standby state. Here, the standby state of the sink devices 30-1 to 30-N means a state where AV streams can be received from the source device 10 and can be reproduced.

Next, in step ST3, the control unit creates a common list (video) representing a video format commonly compatible with each of the sink devices in the standby state, based on video format information in the EDID of each of the sink devices in the standby state (see FIG. 14).

In addition, in step ST3, the control unit creates a common list (audio) representing a audio format commonly compatible with each of the sink devices in the standby state, based on audio format information in the EDID of each of the sink devices in the standby state (see FIG. 18).

Next, in step ST4, the control unit determines whether or not a color format of a video source (video data that is a transmission object) is xvYCC. When the color format is xvYCC, in step ST5, the control unit determines whether or not the xvYCC is present in the common list (video). When the xvYCC is present, in step ST6, the control unit determines the xvYCC as the transmission color format and then the process proceeds to step ST14.

In addition, when in step ST5, it is determined that xvYCC is not present in the common list (video), in step ST7, the control unit determines RGB of a mandatory standard as the transmission color format and then transitions to a process in step ST14.

In addition, when in step ST4, it is determined that the color format of the video source is not xvYCC, in step ST8, the control unit determines whether or not the color format of the video source is RGB. When the color format is RGB, in step ST9, the control unit determines RGB as the transmission color format. In addition, in step ST9, when the xvYCC is present in the common list (video) and a conversion may be performed by the format converting unit of the source device 10, the control unit may determine the xvYCC as the transmission color format. After the process of step ST9, the control unit transitions to a process in step S14.

In addition, when in step ST8, it is determined that the color format of the video source is not RGB, in step ST10, the control unit determines whether or not the color format of the video source is YCBCR. When the color format of the video source is YCBCR, in step ST11, the control unit determines whether or not YCBCR is present in the common list (video).

When YCBCR is not present in the common list (video), in step ST9, the control unit determines RGB or xvYCC as the above-described transmission color format and then transitions to a process in step ST14.

In addition, when in step ST11, it is determined that YCBCR is present in the common list (video), in step ST12, the control unit determines the transmission color format to YCBCR. In addition, in step ST11, when the xvYCC is present in the common list (video) and a conversion may be performed by the format converting unit of the source device 10, the control unit may determine the xvYCC as the transmission color format. After the process of step ST11, the control unit transitions to a process in step S14.

In addition, when in step ST10, it is determined that the color format of the video source is not YCBCR, the control unit determines that there is an error (display is impossible) and immediately transitions to a process in step ST14. The above-described processes ST4 to ST13 are processes to determine the transmission color format.

In step ST14, the control unit determines whether or not a video format of the video source is present in the common list (video). When a video format of the video source is present in the common list (video), in step ST15, the control unit determines the video format of the video source as a transmission video format. In addition, in step ST15, when upper video formats, which can be up-converted, in a priority ordering are present in the common list (video), the control unit determines an uppermost video format in the video formats as the transmission video format. After the process in step ST15, the control unit transitions to a process in step ST21.

In addition, when in step ST 14, it is determined that a video format of the video source is not present in the common list (video), in step ST16, the control unit determines whether or not upper video formats, which can be up-converted, in a priority ordering are present in the common list (video). When upper video formats, which can be up-converted, in a priority ordering are present in the common list (video), in step ST17, the control unit determines an uppermost video format in the video formats that can be up-converted as the transmission video format. After the process in step ST17, the control unit transitions to a process in step ST21.

When in step ST16, it is determined that an upper video format, which can be up-converted, in a priority ordering is not present in the common list (video), in step ST18, the control unit determines whether or not video formats, which can be down-converted, are present in the common list. When upper video formats, which can be down-converted, in a priority ordering are present in the common list (video), in step ST19, the control unit determines an uppermost video format in the video formats that can be down-converted as the transmission video format. After the process in step ST19, the control unit transitions to a process in step ST21.

In addition, When in step ST18, it is determined that video format, which can be down-converted, is not present in the common list (video), in step ST20, the control unit determines that the transmission of the video data is impossible, and transitions to a process in step ST21. The above-described processes ST14 to ST20 are processes to determine the transmission video format.

In step ST21, the control unit determines whether or not the video source is in a deep color mode. When the video source is not in the deep color mode, 24 bit Color Mode is determined by the control unit in step ST22. In addition, when a conversion is possible, an uppermost deep color mode in a priority ordering in the common list (video) is determined by the control unit in step ST22. After the process in step ST22, the control unit transitions to a process in step ST28.

In addition, when in step ST21, it is determined that the video source is in the deep color mode, in step ST23, the control unit determines whether or not a deep color bit number of the video source is present in the common list (video). When the deep color bit number of the video source is present in the common list (video), in step ST24, the control unit determines the deep color bit number of the video source as a transmission deep color bit number. After the process in step ST24, the control unit transitions to a process in step ST28.

In addition, when in step ST23, it is determined that the deep color bit number of the video source is not present in the common list (video), in step ST25, the control unit determines whether or not a conversion into a Non-Deep Color Mode (24 bit) is possible. When the conversion into Non-Deep Color Mode (24 bit) is possible, in step ST26, the 24 bit Color Mode is determined by the control unit. After the process in step ST26, the control unit transitions to a process in step ST28.

In addition, when in step ST25, it is determined that the conversion into the Non-Deep Color Mode (24 bit) is impossible, in step ST27, the control unit determines that the transmission of the video data is impossible, and transitions from the process in step ST21 to a process in step ST27. The processes in step ST21 to step ST27 are processes to determine the transmission deep color mode.

In step ST28, the control unit determines whether or not an Audio Format code of a sound source (audio data to be transmitted) is present in the common list (audio). When the Audio Format code of a sound source is present in the common list (audio), the control unit transitions to a process in step ST29. In step ST29, the control unit determines the audio format of the sound source as a transmission audio format. In addition, when a conversion is possible, in step ST29, the control unit may determine another upper audio format in a priority ordering in the common list (audio) as the transmission audio format. In addition, in step ST29, the control unit performs a downmix, conversion of a sampling frequency, and conversion of a quantization bit number, according to necessity. After the process in step ST29, in step ST31, the control unit ends the initial process.

When in step ST28, it is determined that the Audio Format code of a sound source is not present in the common list (audio), the control unit transitions to a process in step ST30. In step ST30, when an audio format, which can be converted, is present in the common list (audio), an upper audio format in a priority ordering is determined by the control unit. In addition, in step ST30, when an audio format, which can be converted, is not present in the common list (audio), the control unit determines a Linear-PCM, 2ch that is an audio format of a mandatory standard, as the transmission audio format. In addition, in step ST30, the control unit performs a downmix, conversion of a sampling frequency, and conversion of a quantization bit number, according to necessity. After the process in step ST30, in step ST31, the control unit ends the initial process. The above-described processes in steps ST28 to ST30 are processes to determine the transmission audio format.

[Another Operation]

"Start-Up of Sink Device"

In regard to the AV system 5 shown in FIG. 1, an operation when the source device is in a standby state and the power of each of the sink devices 30-1 to 30-N is turned on is the same as that when the power of the source device 10 is turned on. Here, the standby state of the source device 10 means a state where AV streams can be transmitted according to a request from the sink device.

"When Power of Another Sink Device is Turned On During Transmission of AV Streams"

When the power of another sink device is turned on during transmission of AV streams and thereby sink devices are added, image quality and sound quality of the AV streams that are being transmitted may be deteriorated depending on display and reproduction capability of the added separate sink device.

Therefore, in regard to whether to accept the addition of another sink device or not, three items described below may be set by a menu or the like of each of the sink/source devices. A process when the acceptation is permitted is the same as the operation when the power of the source device 10 is turned on.

(1) Unconditional permission
(2) Unconditional non-permission
(3) Determination depending on an agreement of each sink device that receives AV streams In regard to (3), inquiries are made between audiences on each sink device that is performing the reception, and as a result thereof, when it comes to an agreement with a defined number, the addition is permitted, and when it does not come to an agreement with a defined number, the addition is not permitted. In addition, it is defined how to treat (whether to permit or not to permit), when there is no response within a defined time from the start-up of the inquiries.

In addition, the set-up of the three items is made to be individually performed depending on the following conditions. Therefore, detailed set-up is possible like such things as the change by which the quality is increased is set to "unconditional permission", the change by which the quality is decreased is set to "unconditional non-permission", or the "determination depending on an agreement".

a. Case where it is not necessary to change an audio/video format.

b. Case where it corresponds to a change by which the audio quality is increased c. Case where it corresponds to a change by which the audio quality is decreased d. Case where the audio quality does not vary, but the change is necessary e. Case where it corresponds to a change by which the video quality is increased f. Case where it corresponds to a change by which the video quality is decreased g. Case where the video quality does not vary, but the change is necessary "When Power of One Sink Device is Turned Off During Transmission of AV Streams"

When the power of one sink device is turned off during transmission of AV streams and thereby the number of sink devices is reduced, there is a possibility of being changed into an audio format and a video format with a higher quality. In regard to whether to change or not to change, three items described below may be set by a menu or the like of each of the sink/source devices.

A process when the change is permitted is the same as the operation when the power of the source device 10 is turned on.

(1) Unconditional permission
(2) Unconditional non-permission
(3) Determination depending on an agreement of each sink device that receives AV streams In regard to (3), inquiries are made between audiences on each sink device that performs the reception, and as a result thereof, when it comes to an agreement with a defined number, the change is permitted, and when it does not come to an agreement with a defined number, the change is not permitted. In addition, it is defined how to treat (whether to permit or not to permit), when there is no response within a defined time from the start-up of the inquiries.

In addition, the set-up of the three items is made to be individually performed depending on the following conditions. Therefore, detailed set-up is possible like such things as the change by which the quality is increased is set to "Unconditional permission", the change by which the quality is decreased is set to "Unconditional non-permission", or the "Determination depending on an agreement".

a. Case where it corresponds to a change by which the audio quality is increased b. Case where the audio quality does not vary, but the change is necessary c. Case where it corresponds to a change by which the video quality is increased d. Case where the video quality does not vary, but the change is necessary As described above, in regard to the AV system 5 shown in FIG. 1, the source device 10 reads out EDID from each of a plurality of sink devices 30-1 to 30-N, a video format and an audio format with which each of the sink devices is commonly compatible is determined as a transmission video format and a transmission audio format, based on information of a video format and an audio format with which each of the sink devices is compatible. Therefore, the source device 10 can successfully perform a broadcast transmission to the plurality of sink devices 30-1 to 30-N.

MODIFIED EXAMPLE

Modified Example 1

In addition, in the above-described embodiment, an example where EDID is read out from all of a plurality of sink devices 30-1 to 30-N those are in a standby state, respectively, and a transmission audio format is determined based on information of an audio format with which each of the sink devices is compatible.

Figure 24:
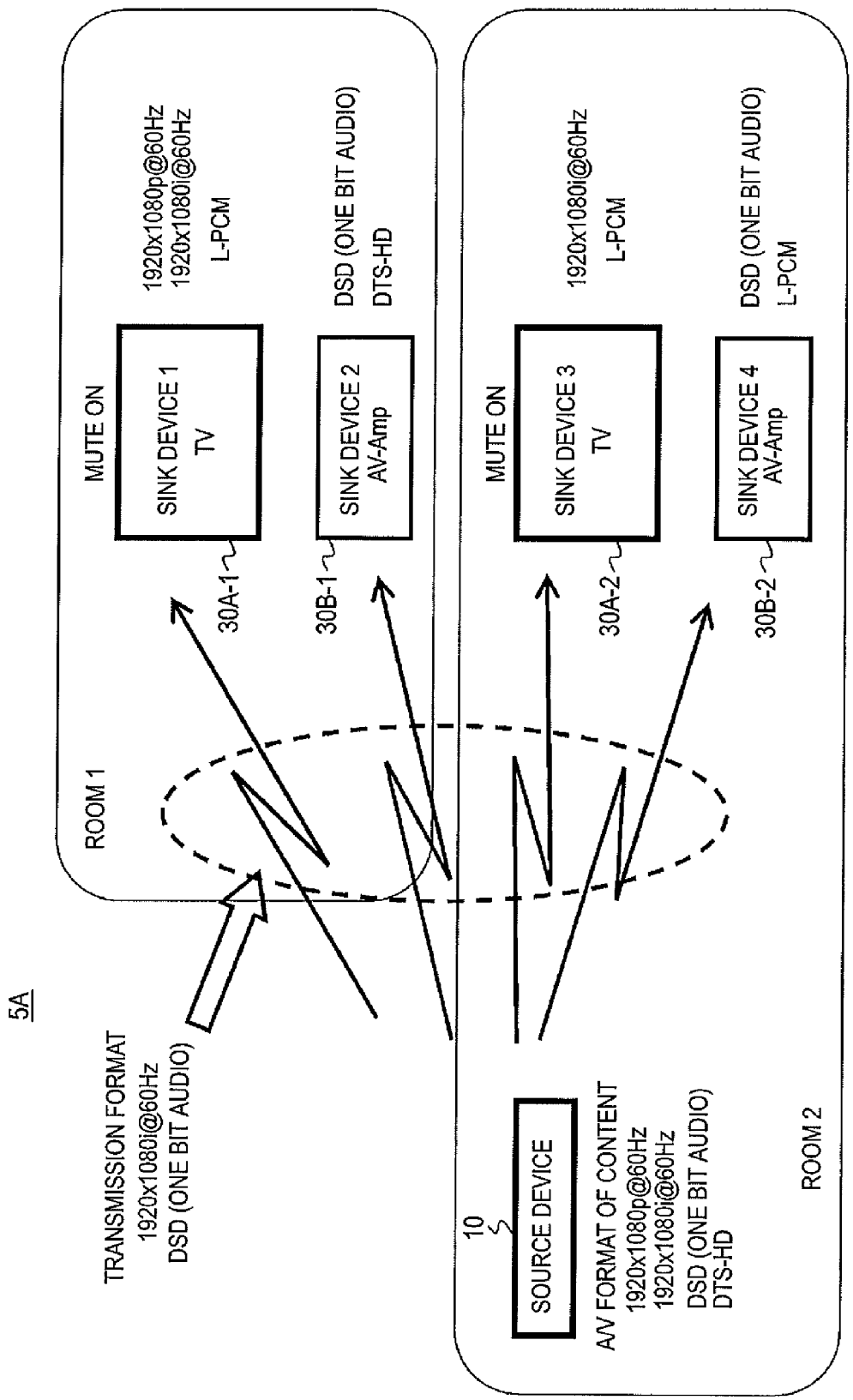
FIG. 24 is a diagram illustrating a first modified example of the AV system of the first embodiment.

However, for example, like an AV system 5A shown in FIG. 24, there is a case where the plurality of sink devices includes plural sets of a television monitor and AV amplifier combination. In FIG. 24, in regard to a room 1, a television receiver 30A-1 and an AV amplifier 30B-1 are paired. In addition, in regard to a room 2, a television receiver 30A-2 and an AV amplifier 30B-2 are paired. In a case where the television receiver and the AV amplifier are paired as described above, for example, a usage where an image is displayed by the television receiver, and a sound is output by the AV amplifier may be assumed.

In a case of the AV system 5A, a transmission audio format is determined based on audio format information included in EDID read out from AV amplifiers 30B-1 and 30B-2. That is, in this case, a common list is created based on the audio format information of the AV amplifiers 30B-1 and 30B-2, and the transmission audio format is determined by using the common list similar to the above-described embodiment.

FIG. 25 shows a creation example of a common list of a video and an audio of the AV system 5 shown in FIG. 24. In the example shown in FIG. 25, the maximum number of channels of the audio format, a sampling frequency, and a quantization bit number are omitted.

A sink device 1 (television receiver 30A-1) supports 1920×1080p@60 Hz and 1920×1080i@60 Hz with respect to the video format, and supports an L-PCM with respect to the audio format. In addition, a sink device 2 (AV amplifier 30B-1) supports a DSD and a DTS-HD with respect to the audio format. In addition, a sink device 3 (television receiver 30A-2) supports 1920×1080i@60 Hz with respect to the video format and supports an L-PCM with respect to the audio format. In addition, a sink device 4 (AV amplifier 30B-2) supports a DSD and an L-PCM with respect to the audio format.

Therefore, the 1920×1080i@60 Hz is determined as a common item of the video format. In addition, since the common list is created based on the audio format information of the AV amplifiers 30B-1 and 30B-2, the DSD is determined as a common item of the audio format.

In general, the AV amplifier can be compatible with an audio data format with a high sound quality in relation to the television receiver (television monitor). Therefore, since the transmission audio format is determined based on only information of the audio format acquired from the plurality of AV amplifiers, it is possible to avoid a situation where an audio format with a low quality is determined. That is, in a case where the image is displayed on the television monitor and the sound is output from the AV amplifier, it is possible to suppress the reproduction quality from being decreased.

Modified Example 2

In addition, in the above-described embodiment, there is described an example where the EDID is read out from all of the plurality of sink devices 30-1 to 30-N those are in a standby state, respectively, and the transmission audio format is determined based on information of the audio format with which each of the sink devices is compatible.

However, for example, like an AV system 5B shown in FIG. 26, there is a case where a sink device having a downmix function (function of converting a multi-channel audio format into one with a relatively small number of channels) is included in the plurality of sink devices. In an example of FIG. 26, the sink device 30-1 has the downmix function, and the sink devices 30-2 and 30-3 do not have the downmix function.

In a case of the AV system 5B, with respect to the maximum channel numbers in regard to the transmission audio format, it is determined based on information, which is included in EDID read out from the sink devices 30-2 and 30-3 not having the downmix function, of the maximum number of channels.

In the example FIG. 26, the sink device 1 supports 2ch to the maximum and has also the downmix function. The sink devices 2 and 3 support 8ch to the maximum but do not have the downmix function. In this case, "Max number of Channels=7 (8ch)" is described in the common list and a transmission is also performed with 8ch.

As described above, since the maximum number of channels in regard to the transmission audio format is determined based on the information of the maximum number of channels of the sink device without the downmix function, even when the maximum number of channels of the sink device with the downmix function is small, it is possible to transmit the audio data with the maximum number of channels with which the sink device without the downmix function is compatible and thereby it is possible to suppress the reproduction quality from being decreased. In the example in FIG. 26, since the presence or absence of the downmix function is considered, the sink device 1 can perform the reproduction with 2ch, and the sink devices 2 and 3 can perform the reproduction with 8ch.

In the above-described modified examples 1 and 2, the source device 10 needs to acquire information of a type (television receiver (television monitor) or AV amplifier) of each sink device, the presence or absence of the pairing of the television receiver and AV amplifier, and the presence or absence of the downmix function.

However, such information does not exist in a present EDID. Therefore, it is necessary to newly add acquisition means. FIGS. 27 and 29 show an implementation example of the means. FIG. 27 shows an example where an empty Extended Tag Code in an EDID Block 1 is used for this object. In a case of a Tag Code=7 in a data block of the EDID, an Extended Tag Code is defined in a second Byte. As can be seen from FIG. 28 showing a list of Extended Tag Code, 32 to 255 are reserved for general purpose. One of them is used to indicate the television/AV amplifier type of the sink device, pairing information of the television and AV amplifier, and the presence or absence of the downmix function of the sink side.

FIG. 29 shows an example where a new request/response command is defined between the source device and the sink device. In this case, after the sink device receives a Request Sink Information Command of sink information from the source device, the source device transmits a Sink Information Block. FIG. 30 shows an example of a structure of the sink block information, and the television/AV amplifier type of the sink device, pairing information of the television and the AV amplifier, and information on the presence or absence of the downmix function of the sink side or the like is included.

<Second Embodiment>

In regard to the first embodiment, the source device 10 determines the data format with which each of the sink devices 30-1 to 30-N is commonly compatible as the transmission data format, based on the information of the data format with which the plurality of sink devices 30-1 to 30-N is compatible.

Even when a transmission path is wireless or wired one, the transmission bit rate of the transmission path varies with the change of a state thereof. For example, in a case where the transmission path is configured by a cable, due to signal attenuation caused by the deterioration (bending, distortion, disconnection) of the cable or the length of the cable, contact failure of a connector unit, or the like, a received signal quality is deteriorated and the transmission bit rate of the transmission path actually decreases. In addition, for example, in a case where the transmission path is wireless one, due to the presence of a barrier or an interfering wave or the like, the received signal quality is deteriorated and thereby the transmission bit rate of the transmission path actually decreases.

When the source device 10 broadcasts the content data (AV stream) to each of the sink devices 30-1 to 30-N based on the transmission data format determined as described above, there is a case where a successful transmission may be impossible depending on the transmission bit rate. Therefore, it can be considered that based on the information of the transmission bit rate, the source device 10 performs a compression process with respect to the content data (AV stream) based on the determined transmission data format, and transmits it.

[Related Technique]

Figure 31:
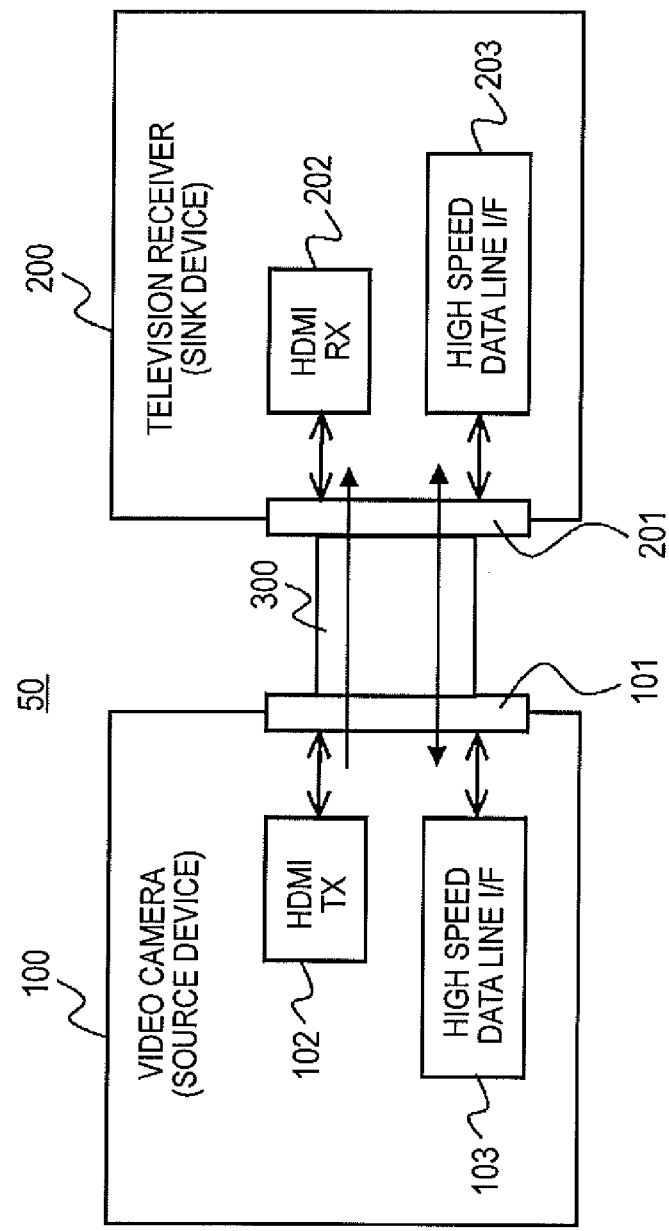
FIG. 31 is a block diagram illustrating a configuration example of an AV system.

Description will be given with respect to an example the content data (AV stream) is transmitted from the source device 10 to one since device. FIG. 31 shows a configuration example of an AV system 50. In FIG. 31, the AV system 50 includes a video camera 100 as the source device and a television receiver (TV) 200 as the sink device. In addition, the video camera 100 and the television receiver 200 are connected with each other via an HDMI cable 300.

In the video camera 100, an HDMI terminal 101 to which an HDMI transmission unit (HDMI TX) 102 and a high speed data line interface 103 are connected is provided. In the television receiver 200, an HDMI terminal 201 to which an HDMI reception unit (HDMI RX) 202 and a high speed data line interface 203 are connected is provided. One end of the HDMI cable 300 is connected to the HDMI terminal 101 of the video camera 100 and the other end of the HDMI cable 300 is connected to the HDMI terminal 201 of the television receiver 200.

In regard to the AV system 50, the video camera 100 can transmit a non-compressed (baseband) video signal or a compressed video signal to the television receiver 200. The non-compressed video signal is transmitted by using a TMDS (Transition Minimized Differential Signaling) channel of the HDMI. In this case, the non-compressed video signal is supplied from the HDMI transmission unit 102 of the video camera 100 to the HDMI reception unit 202 of the television receiver 200 via the HDMI cable 300. In addition, the compressed video signal is also transmitted by using the TMDS channel of the HDMI. In this case, the compressed video signal is supplied from the HDMI transmission unit 102 of the video camera 100 to the HDMI reception unit 202 of the television receiver 200 via the HDMI cable 300.

Figure 32:
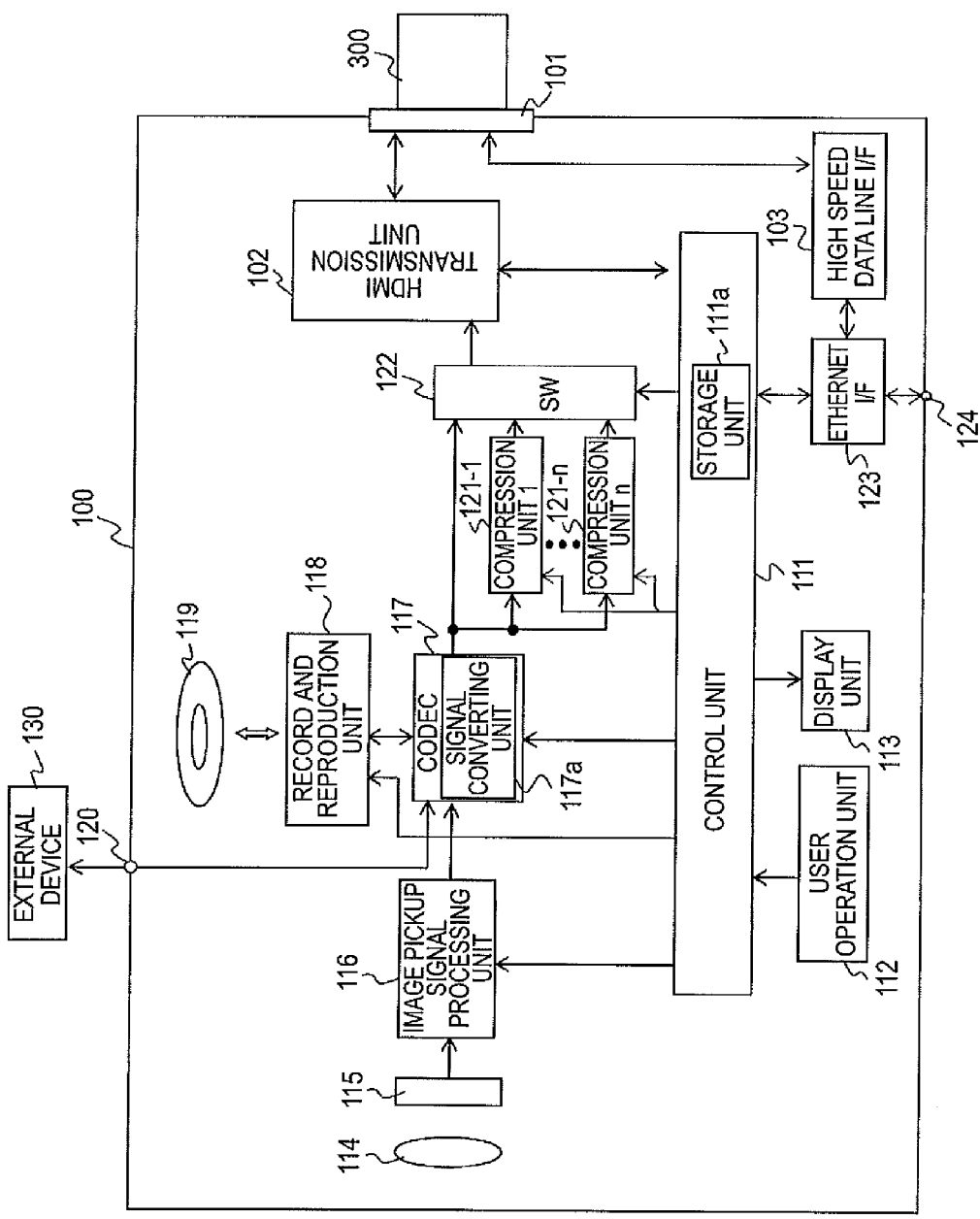
FIG. 32 is a block diagram illustrating a configuration example of a video camera as the source device.

FIG. 32 shows a configuration example of the video camera 100. The video camera 100 includes an HDMI terminal 101, an HDMI transmission unit 102, a high speed data line interface 103, a control unit 111, a user operation unit 112, a display unit 113, an image pickup lens 114, an image pickup device (imaging sensor) 115, an image pickup signal processing unit 116, a codec 117, a record and reproduction unit 118, an external terminal 120, n number of data compression units 121-1 to 121-n, a switch unit 122, an Ethernet interface (Ethernet I/F) 123, and a network terminal 124. In addition, "Ethernet" is a registered trademark.

The control unit 111 controls an operation of each unit of the video camera 100. The user operation unit 112 and the display unit 113 make up a user interface and are connected to the control unit 111. The user operation unit 112 includes keys, buttons and dials disposed in a casing (not shown) of the video camera 100, a touch panel disposed on a display surface of the display unit 113, a transmission and reception unit of a remote controller, or the like. The display unit 113 is configured by an LCD (Liquid Crystal Display) or the like.

The image pickup device 115 is configured by, for example, a CCD (Charge Coupled Device) imaging sensor, CMOS (Complementary Metal Oxide Semiconductor) imaging sensor, or the like. The image pickup device 115 performs an image pickup process in a state where an optical image of a subject is imaged on an image pickup surface by the image pickup lens 114 and outputs an image pickup signal. The image pickup signal processing unit 116 performs a sample-and-hold and gain control, a conversion from an analog signal to a digital signal, a white balance adjustment, a gamma correction with respect to an image pickup signal (analog signal) output from the image pickup device 115, and generates image data (video signal).

The record and reproduction unit 118 record, in an HD (Hard Disc) 119, encoded data obtained by encoding image data (video signal) supplied from the codec 17 by using, for example, an MPEG (Moving Picture Experts Group) method or the like. In addition, the record and reproduction unit 118 reproduces (reads out) the encoded data from the HD 119 and supplies it to the codec 117.

The codec 17 decodes the encoded data supplied from the record and reproduction unit 118 to obtain a non-compressed (baseband) video signal, and supplies it to an external device 130 via the external terminal 120 according to necessity. In addition, the codec 117 encodes a non-compressed video signal supplied from the image pickup signal processing unit 116 or the external device 130 into encoded data and supplies the encoded data to the record and reproduction unit 118. Here, the external device 130 is an HDD recorder, a personal computer, a DVD (Digital Versatile Disc) player, a video camera, or the like.

In addition, the codec 117 supplies the non-compressed video signal supplied from the image pickup signal processing unit 116 or the external device 130, or the non-compressed video signal obtained by being decoded to the HDMI transmission unit 102, data compression units 121-1 to 121-n, or the like, for the transmission to the television receiver 200. In this sense, the codec 117 makes up a video signal output unit that outputs a non-compressed video signal to be transmitted.

In addition, the codec 117 includes a signal converting unit 117a, converts a format such as a resolution, a bit depth and a frame rate of the non-compressed video signal, which is supplied to the HDMI transmission unit 102, the data compression units 121-1 to 121-n or the like, according to necessity, so as to be handled by the television receiver 200, that is, so as to be displayed by the television receiver 200, and outputs it.

The HDMI transmission unit 102 reads out, through a DDC (Display Data Channel), E-EDID (Enhanced Extended Display Identification Data) of the HDMI reception unit 202 from the HDMI reception unit 202 of the television receiver 200 via the HDMI cable 300. The E-EDID includes information of a video signal format (a resolution, a bit depth, a frame rate, or the like) that can be handled with the television receiver 200. The HDMI transmission unit 102 makes up video format information receiving unit.

Figure 33:
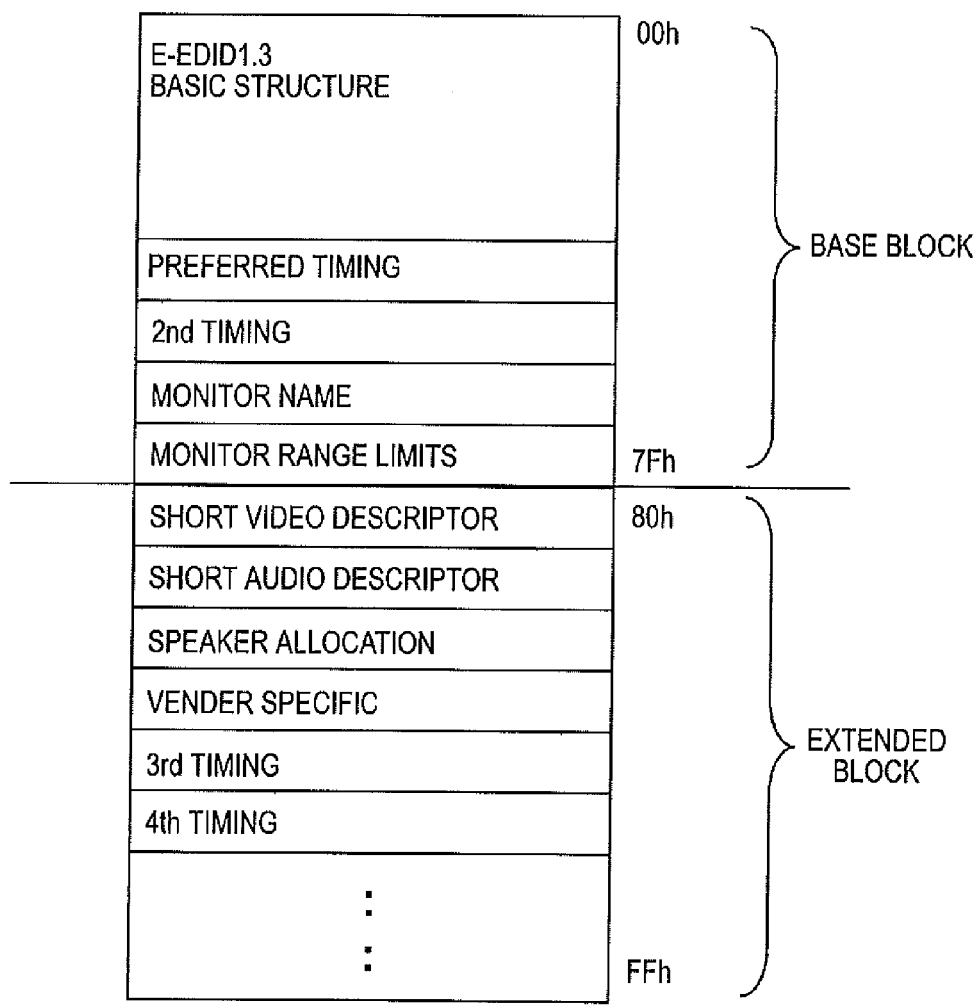
FIG. 33 is a diagram illustrating a structure example of E-EDID data.

FIG. 33 shows a data structure example of the E-EDID. The E-EDID includes a base block and an extended block. Data, which is expressed by "E-EDID1.3 Basis Structure" and is defined by E-EDID1.3 standard, is disposed at the front of the base block, and thereafter timing information, which is expressed by "Preferred timing", for maintaining compatibility with a conventional EDID, and timing information, which is expressed by "2nd timing", for maintaining compatibility with a conventional EDID and is different from the "Preferred timing", are disposed.

In addition, subsequent to "2nd timing", information, which indicates a name of a display device and is expressed by "Monitor Name", and information, which indicates the number of pixels that can be displayed in a case where an aspect ratio is 4:3 and 16:9 and is expressed by "Monitor Range Limits", are sequentially disposed.

"Short Video Descriptor" is disposed at the front of the expanded block. This is information indicating an image size (resolution) that can be displayed, a frame rate, and an interlaced or progressive. Subsequently, "Short Audio Descriptor" is disposed. This is information of a reproducible sound codec type, a sampling frequency, a cut-off band, a codec bit number, or the like. Subsequently, information, which is related to a left speaker and a right speaker and is expressed by "Speaker Allocation", is disposed.

In addition, subsequent to the "Speaker Allocation", data that is peculiarly defined for every manufacturer and is expressed by "Vender Specific", timing information, which is expressed by "3rd timing", for maintaining compatibility with a conventional EDID, and timing information, which is expressed by "4th timing", for maintaining compatibility with a conventional EDID, are disposed in the expanded block.

FIG. 34 shows a video data example of a Short Video Descriptor region. A format that can be displayed by a reception device (the television receiver 200 in this embodiment) in video signal formats defined by CEA-861-D is described with a combination of resolution•frame rate•aspect ratio in Byte #1 to Byte #L of the region.

FIG. 35 shows a data structure example of a Vendor Specific region. In the Vender Specific region, block 0 to block N are provided, each of them being 1 byte block.

A header that is expressed by "Vendor-Specific tag code (=3)" and indicates a data region of data "Vender Specific", and information that is expressed by "Length (=N)" and indicates a length of data "Vender Specific" are disposed in block 0 located on the front of the data expressed by "Vender Specific".

In addition, information, which is expressed by "24 bit IEEE Registration Identifier (0x000003) LSB first" and indicates a number "0x000003" registered for an HDMI (R), is disposed in block 1 to block 3. In addition, information, which is expressed by "A", "B", "C", and "D", respectively, and indicates a physical address of a sink device of 24 bit, is disposed in block 4 and block 5.

A flag that is expressed by "Supports-AI" and indicates a function with which the sink device is compatible, each of plural pieces of information that are expressed by "DC-48 bit", "DC-36 bit", and "DC-30 bit", respectively, and that define a bit number for one pixel, a flag that is expressed by "DC-Y444" and indicates whether the sink device is compatible with a transmission of an image of YCbCr4:4:4, and a flag that is expressed by "DVI-Dual" and indicates whether the sink device is compatible with a dual DVI (Digital Visual Interface) are disposed in block 6.

In addition, information that is expressed by "Max-TMDS-Clock" and indicates a maximum frequency of a pixel clock of a TMDS is disposed in block 7. In addition, a flag that is expressed by "Latency" and indicates a presence or absence of video delay information and sound delay information is disposed in block 8.

In addition, delay time data, which is expressed by "Video Latency", of a progressive video is disposed in block 9, and delay time data, which is expressed by "Audio Latency", of a sound accompanying the progressive video is disposed in block 10. In addition, delay time data, which is expressed by "Interlaced Video Latency", of an interlaced video is disposed in block 11. Delay time data, which is expressed by "Interlaced Audio Latency", of a sound accompanying the interlaced video is disposed in block 12.

As described above, the information of the bit depth that can be displayed by the reception device (the television receiver 200 in this embodiment), is described in block 6 (Byte #6) of the Vendor-Specific region.

The data compression units 121-1 to 121-n compresses the non-compressed video signal output from the codec 117 with a predetermined compression ratio, respectively, and outputs the compressed video signal. The data compression units 121-1 to 121-n make up a video signal compression units. Each of the data compression units 121-1 to 121-n performs the data compression process with a compression method different from each other. For example, as the compression method, "RLE (Run Length Encoding)", "Wavelet", "SBM (SuperBit Mapping)", "LLVC (Low Latency Video Codec)", "ZIP", or the like may be considered. In addition, a compression ratio necessary for the data compression units 121-1 to 121-n may be small, and a compression method that performs an inter-line compression process or an inter-frame (field) compression process is sufficient, and from the viewpoint of suppressing image quality deterioration, a reversible compression method is desired. For example, RLE and ZIP are reversible compression methods.

The switch unit 122 selectively takes out one of the non-compressed video signal output from the codec 117 and the compressed video signal output from the data compression units 121-1 to 121-n, and supplies it to the HDMI transmission unit 102. The switch unit 122 makes up a video signal selecting unit.

Here, the operations of the switch unit 122 and the data compression units 121-1 to 121-n are controlled as described below by the control unit 111. In this case, it is assumed that the bit rate of the non-compressed (baseband) video signal output from the codec 117 is BR1, and the transmission bit rate of the HDMI transmission path is BR2. The bit rate BR1 can be obtained with a computation expression of, for example, (resolution)×(frame rate)×(three colors worth of bit depth). In addition, the transmission bit rate BR2 (a theoretical upper limit transmission bit rate) of the HDMI transmission path is 10.2 Gbps.

FIG. 36 shows a video format and a bit rate (transmission rate) of a non-compressed video signal corresponding to the video format. As described above, since the transmission bit rate BR2 of the HDMI transmission path is 10.2 Gbps, when the bit rate BR1 of the non-compressed video signal output from the codec 117 exceeds 10.2 Gbps (see a format to which a mark "*" is attached in FIG. 36), the non-compressed video signal cannot be transmitted without change.

When the bit rate BR1 does not exceed the BR2, the switch unit 122 takes out the non-compressed video signal output from the codec 117, and supplies to the HDMI transmission unit 102 as a video signal to be transmitted. On the other hand, in a case where the bit rate BR1 exceeds the bit rate BR2, the switch unit 122 takes out the compressed video signal obtained by performing a data compression process with respect to the non-compressed video signal output from the codec 117 with one of the data compression units 121-1 to 121-n, and supplies to the HDMI transmission unit 102 as a video signal to be transmitted.

Here, the control unit 111 makes a reference to information, which indicates a compression method with which the television receiver 200 is compatible and is transmitted from the television receiver 200, and determines which data compression unit of the data compression units 121-1 to 121-n to select. Specifically, the control unit 111 selects a data compression unit that satisfies a condition where the data compression process is performed by using a compression method with which the television receiver 200 is compatible, and the compressing process is performed so that the bit rate of the compressed video signal generated by the data compression process does not exceed the transmission bit rate BR2 of the HDMI transmission path. In this case, in the data compression unit wherein the compression ratio can be changed, there are cases wherein the above-described bit rate condition can be satisfied by compression ratio change control.

In addition, in a case where two or more of data compression units satisfying the above-described condition are present, and a data compression unit that can perform data compression with a reversible compression method is present, the control unit 111 preferentially selects that data compression unit. As described above, since the data compression unit, which performs a data compression with a reversible compression method, can be preferentially selected, image deterioration caused by the data compression process can be suppressed.

In addition, as described above, in a case where the bit rate BR1 exceeds the bit rate BR2, basically, the compressed video signal obtained by data compression process with one of the data compression units 121-1 to 121-n is set as a video signal to be transmitted, but in a case where the data compression unit, which performs the data compression with a compression method with which the television receiver 200 is compatible, is not present in the data compression units 121-1 to 121-n, the control unit 111 performs control described below.

Specifically, the control unit 111 allows the signal converting unit 117a provided to the codec 117 to make small one or a plurality of items among the resolution, the bit depth, and the frame rate of the non-compressed video signal, so that that the bit rate BR1 of the non-compressed video signal does not exceed the transmission bit rate BR2 of the HDMI transmission path. The control unit 111 takes out the non-compressed video signal output from the codec 117 by the switch unit 122, and supplies it to the HDMI transmission unit 102 as a video signal to be transmitted.

In this embodiment, regions "Compress Method" and "Compress Method Length" indicating the correlation of the compression method are newly defined, for example, in the Vender Specific region of the E-EDID (see FIG. 33) as shown in FIG. 37, the information indicating a compression method (decompression method) with which the television receiver 200 is compatible is transmitted to the camera 100.

Bits are assigned to the "Compress Method" according to types of compression methods, respectively, and for example, "1" is set to the bit corresponding to the method with which the television receiver 200 is compatible. In a case where the number of types of compression methods exceeds eight, the number of bytes is defined in the "Compress Method Length" so that a plurality of bytes can be defined. The video camera 100 reads out the compression method information, such that the video camera 100 can determine the compression method to be selected. The video camera 100 stores the compression method information supplied from the television receiver 200 side as described above, for example, in the storage unit 111a built in the control unit 111.

FIG. 38 shows a description example of the "Compress Method Length" and "Compress Method" in a case where the television receiver 200 is compatible with four compression methods. Since the number of compression methods defined in the bit 5 to 0 of Byte 8 is eight or less, this shows that a necessary data region may be one byte. The description example shows that "LLVC (Low Latency Video codec)" corresponds to bit 0 of Byte 13, "SBM (Super Bit Mapping)" to bit 1, "Wavelet" to bit 2, and "RLE (Run Length Encoding)" to bit 3.

In addition, the television receiver 200 may transmit information of a compression method (decompression method) with which the above-described television receiver 200 is compatible, to the video camera 100, via a CEC line or a high speed data line, instead of the E-EDID Vender Specific region.

The control unit 111 receives the compression method information from the television receiver 200 via the E-EDID Vender Specific region, the CEC line, the high speed data line, or the like, thereby making up a compression information receiving unit along with the HDMI transmission unit 102, the high speed data line interface 103, or the like.

Figure 39:
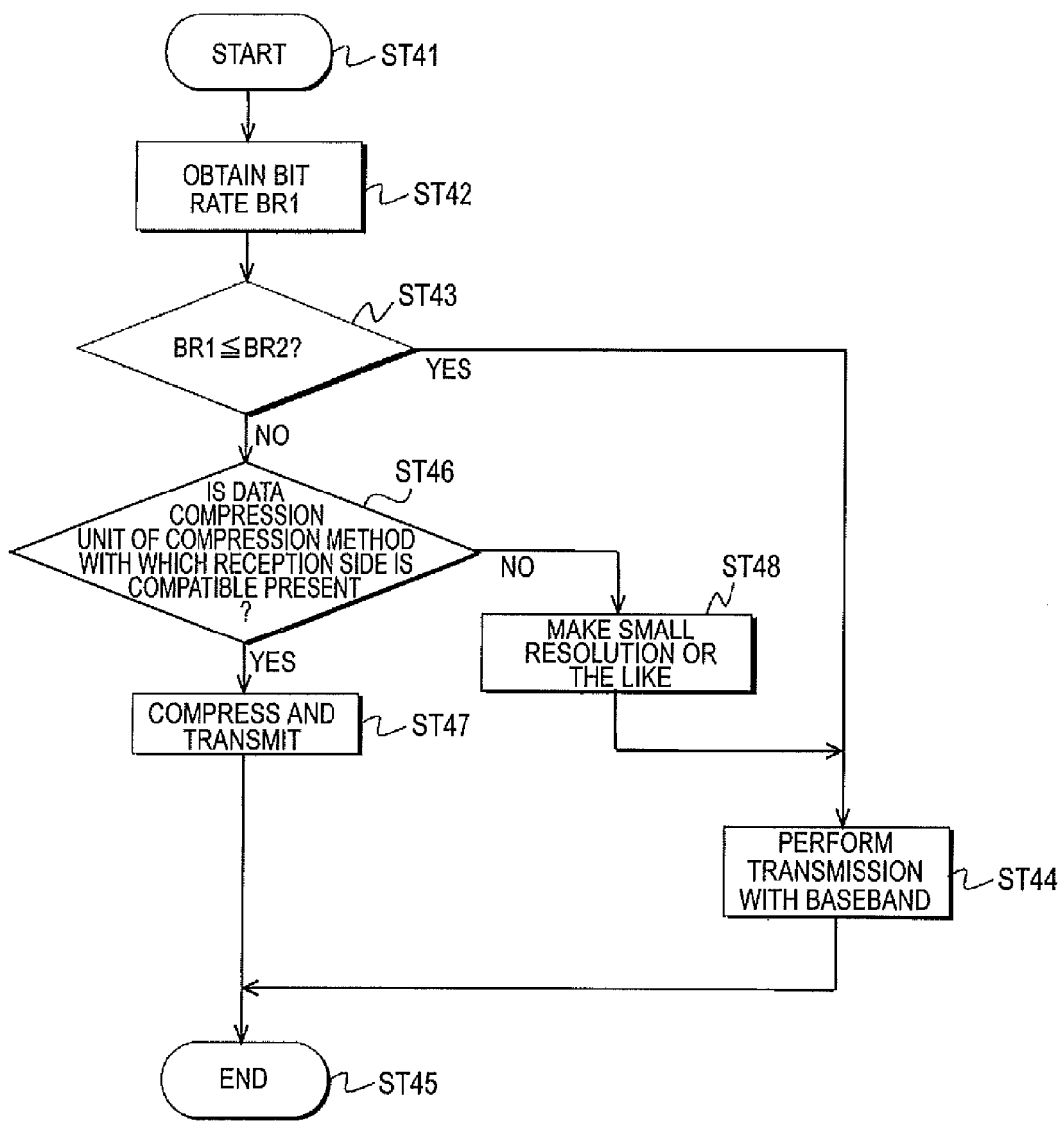
FIG. 39 is a flow chart illustrating a control operation of a data compression unit and a switch unit by a control unit of the video camera.

The flowchart of FIG. 39 shows the above-described control operation of the control unit 111. First, the control unit 111 starts the control process, in step ST41, and then in step ST42, obtains the bit rate BR1 of the non-compressed video signal output from the codec 117 by the above-described computation equation.

Next, in step ST43, the control unit 111 determines whether or not the bit rate BR1 of the non-compressed video signal output from the codec 117 is greater than the transmission bit rate BR2 of the HDMI transmission path. When BR1≤BR2, in step ST44, the control unit 111 determines to transmit the video signal with a baseband. Specifically, the control unit 111 takes out the non-compressed video signal output from the codec 117 by the switch unit 122 and supplies it to the HDMI transmission unit 102. After the process in step ST44, the control unit 111 ends the control process in step ST45.

On the other hand, when BR1≤BR2 is not satisfied, in step ST46, the control unit 111 determines whether or not there is present a data compression unit of a compression method with which the reception side, that is, the television receiver 200 is compatible. When there is present a data compression unit with which the reception side is compatible, in step ST47, the control unit 111 determines to compress and transmit. Specifically, the control unit 111 subjects the non-compressed video signal output from the codec 117 to a data compression process with the data compression unit compatible with the reception side among the data compression units 121-1 to 121-n, takes out the compressed video signal thereof by a switch unit 122, and supplies it to the HDMI transmission unit 102. After the process in step ST47, in step ST45, the control unit 111 ends the control process.

In addition, when in step ST46, it is determined that a data compression unit with which the reception side is compatible is not present, in step ST48, the control unit 111 makes small the resolution or the like of the non-compressed video signal output from the codec 117, so that the bit rate BR1 thereof does not exceed the transmission bit rate BR2 of the HDMI transmission path. In step ST44, the control unit 111 determines to transmit the video signal with a baseband. Specifically, the control unit 111 allows the switch unit 122 to fetch the non-compressed video signal, of which the resolution or the like is made to be small, output from the codec 117, and supplies it to the HDMI transmission unit 102. After the process in step ST44, in step ST45, the control unit 111 ends the control process.

The control unit 111 supplies the control information of the switch unit 122 and data compression units 121-1 to 121-n, and further the format information (information of resolution or the like) of the video signal output from the codec 117 described above to the television receiver 200. The control information (hereinafter, referred to as "compression information") of the switch unit 122 and data compression units 121-1 to 121-n includes information indicating whether the video signal transmitted to the television receiver 200 is a non-compressed video signal or a compressed video signal, and information of a compression method, a compression ratio or the like, when the video signal transmitted to the television receiver 200 is a compressed video signal.

In this embodiment, the control unit 111 transmits the control information of the above-described switch unit 122 and data compression units 121-1 to 121-n to the television receiver 200 by using an AVI (Auxiliary Video Information) InfoFrame packet. The AVI InfoFrame packet transmits the data from source device to sink device, and indicates information related to the video•audio signal that is currently active. Since the AVI InfoFrame packet transmits once for every video frame, in a case where the compression method, compression ratio or the like changes on the source device side, notification can be made to the sink device side by changing the data of the AVI InfoFrame packet.

FIG. 40 shows a data structure example of the AVI InfoFrame packet. In addition, in FIG. 40, a state omitting the header is shown. In addition, in the header, packet type information, version information, packet length information, or the like are described. In this embodiment, compression information of the video camera 100 is described in Byte 14 to Byte M in the AVI InfoFrame packet, as shown in FIG. 40.

The Byte 14 shows the data length of the compression method information and compression ratio information. Also, the Bytes 15 to (M−1) show which compression method is used for data compression process in the compatible compression methods transmitted from the reception device. For example, this shows that if the Byte 15 is "0x01", then "LLVC (Low Latency Video Codec)", if it is "0x02", then "SBM (SuperBit Mapping)", if it is "0x04", then "Wavelet", and if it is "0x08", then "RLE (RunLength Encoding)" is selected and data compression process is performed. Also, Byte 16 shows the compression ratio data.

FIG. 41 shows a data example of the compression method and compression ratio in the AVI InfoFrame packet. In this data example, an integer portion and a portion below a decimal point of the compression ratio are expressed with four bits, respectively, whereby if the integer portion is "0x02" and the portion below the decimal point is "0x00", the compression ratio becomes 2.0. The expression of the compression ratio may be in a logarithmic format, instead of an integral format.

The information of the format (resolution or the like) of the non-compressed video signal output from the coded 117 described above is transmitted from the video camera 100 to the television receiver 200 by using, for example, a CEC line or a high speed data line. In regard to the compression information transmitted by the AVI InfoFrame packet described above, the transmission may be also performed with the CEC line or the high speed data line.

As described above, the control unit 111 transmits the compression information to the television receiver 200 by using the AVI InfoFrame packet, the CEC line, the high speed data line, or the like, thereby making up the compression information transmitting unit along with the HDMI transmission unit 102, high speed data line interface 103 or the like.

The HDMI transmission unit 102 transmits the video signal supplied from the switch unit 122 to the television receiver 200 in one direction via the HDMI cable 300, with communication compliant to an HDMI. In this sense, the HDMI transmission unit 102 makes up the video signal transmitting unit. The details of the HDMI transmission unit 102 will be described later.

The high speed data line interface 103 is a bi-directional communication interface using a predetermined line making up the HDMI cable 300. The high speed data line interface 103 is inserted between the Ethernet interface 123 and HDMI terminal 101. The high speed data line interface 103 transmits transmission data supplied from the control unit 101 via the Ethernet interface 123 to the television receiver 200 from the HDMI terminal 101 via the HDMI cable 300. In addition, the high speed data line interface 103 supplies reception data, which is received from the HDMI cable 300 via the HDMI terminal 101, from the television receiver 200 to the control unit 111 via the Ethernet interface 123. The details of the high speed data line interface 103 will be described later.

In addition, the Ethernet interface 123 is connected to a network terminal 124. The video camera 100 is made to be connectable with the network of the Ethernet by using the network terminal 124.

Figure 42:
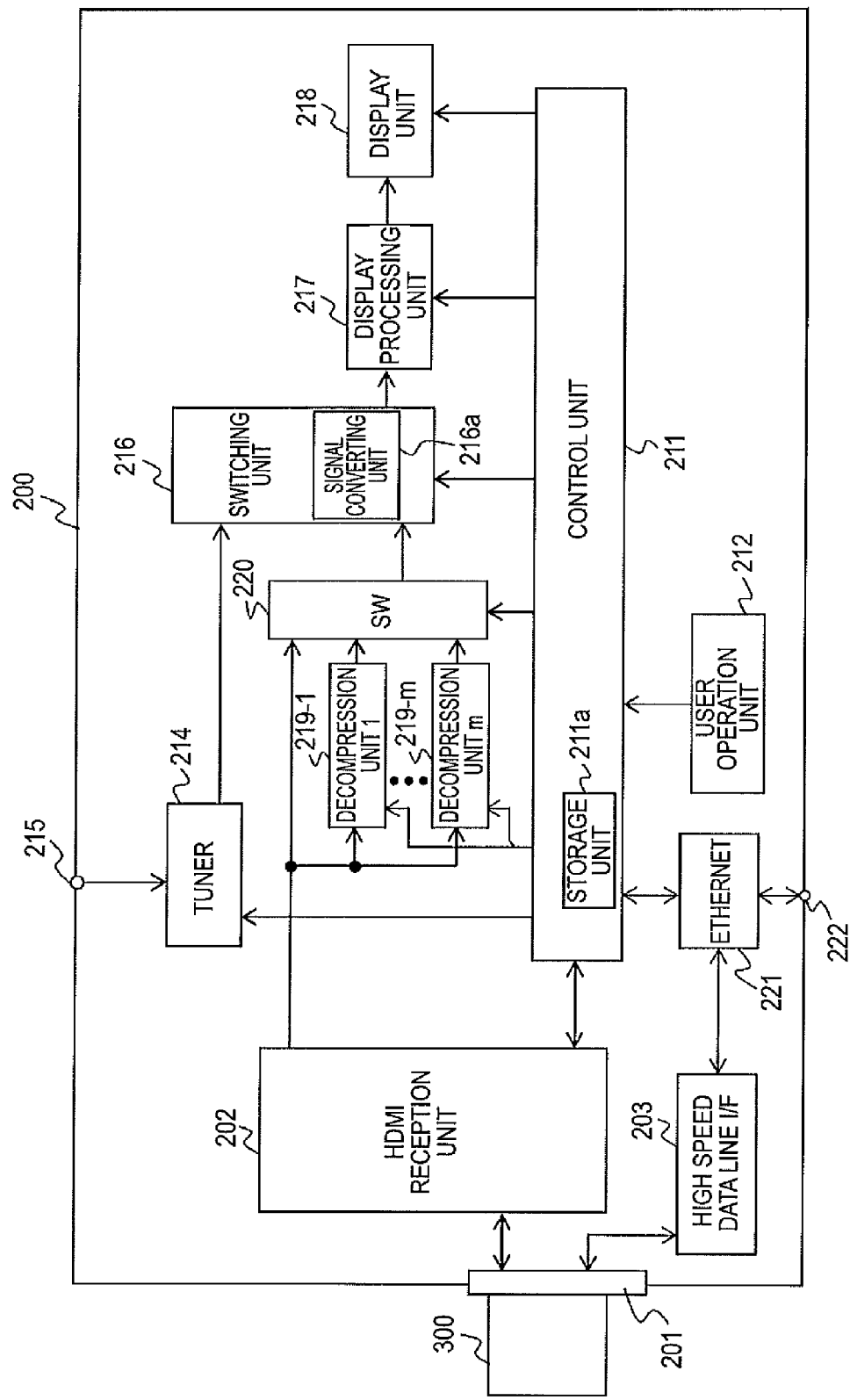
FIG. 42 is a block diagram illustrating a configuration example of the television receiver as the sink device.

FIG. 42 shows a configuration example of the television receiver 200. The television receiver 200 includes an HDMI terminal 201, an HDMI reception unit 202, a high speed data line interface 203, a control unit 211, a user operation unit 212, a tuner 214, an antenna terminal 215, a switching unit 216, a display processing unit 217, a display unit 218, m data decompression units 219-1 to 219-m, a switch unit 220, an Ethernet interface 221, and a network terminal 222.

The control unit 211 controls the operation of each unit of the television receiver 200. The user operation unit 212 makes up the user interface, and is connected to the control unit 211. The user operation unit 212 includes keys, buttons and dials disposed in a casing (not shown) of the television receiver 200, a remote controller, or the like.

The HDMI reception unit 202 receives the video signal transmitted in one direction from the HDMI transmission unit 102 of the video camera 100 connected via the HDMI cable 300, with communication compliant to an HDMI. The HDMI reception unit 202 makes up the video signal receiving unit. The details of the HDMI reception unit 202 will be described later. The HDMI reception unit 202 supplies the received video signal to the switch unit 220 and data decompression units 219-1 to 219-m.

The high speed data line interface 203 is a bi-directional communication interface using a predetermined line making up the HDMI cable 300, similar to the high speed data line interface 103 of the video camera 100 described above. The high speed data line interface 203 is inserted between the Ethernet interface 221 and HDMI terminal 201.

The high speed data line interface 203 transmits the transmission data supplied from the control unit 211 via the Ethernet interface 221, to the video camera 100 from the HDMI terminal 201 via the HDMI cable 300. In addition, the high speed data line interface 203 supplies the reception data, which is received from the HDMI cable 300 via the HDMI terminal 201, from the video camera 100 to the control unit 211 via the Ethernet interface 221. The details of the high speed data line interface 203 will be described later.

In addition, the network terminal 222 is connected to the Ethernet interface 221. The television receiver 200 is made to be connectable with the network of the Ethernet by using network terminal 222.

The tuner 214 receives BS broadcasting, terrestrial digital broadcasting, or the like. A broadcasting signal captured by an antenna (not shown) connected to the antenna terminal 215 is supplied to the tuner 214.

When the video signal received by the HDMI reception unit 202 is a compressed video signal, and the data decompression units 219-1 to 219-m are compatible with the compression method thereof, the data decompression units 219-1 to 219-m perform a data decompression process to the video signal, and output a non-compressed video signal. The data decompression units 219-1 to 219-m make up a video signal decompression unit. The switch unit 220 selectively takes out the video signal received by the HDMI reception unit 202 or the non-compressed video signal obtained by the data decompression units 219-1 to 219-m, and supplies it to the switching unit 216. The switch unit 220 makes up the video signal selecting unit.

Here, an operation of the data decompression units 219-1 to 219-m and switch unit 220 are controlled by the control unit 211 as described below. Specifically, the control unit 211 performs control based on the compression information and video signal format information transmitted from the video camera 100 by using the AVI InfoFrame packet, the CEC line, or the high speed data line, as described above. The control unit 211 stores the above-described compression information and video signal format information in a storage unit 211a.

The compression information includes information indicating whether the video signal received by the HDMI reception unit 202 is a non-compressed video signal or a compressed video signal, and information of a compression method, a compression ratio or the like, when the video signal is a compressed video signal. The control unit 111 makes up the compression information receiving unit along with the HDMI reception unit 202 and high speed data line interface 203.

The control unit 211 controls the operation of the data decompression units 219-1 to 219-m and switch unit 220, based on the above-described compression information or the like. Specifically, when the video signal received by the HDMI reception unit 202 is a non-compressed video signal, the control unit 211 takes out the non-compressed video signal by the switch unit 220, and supplies it to the switching unit 216 as a reception video signal.

On the other hand, when the video signal received by the HDMI reception unit 202 is a compressed video signal, the control unit 211 subjects the video signal received by the HDMI reception unit 202 to a data decompression process by the data decompression unit corresponding to the compression method, and takes out the non-compressed video signal obtained as a result thereof by the switch unit 220, and supplies it to the switching unit 216 as a reception video signal.

In addition, the switching unit 216 includes a signal converting unit 216a. Even when the video signal received by the HDMI reception unit 202 is a non-compressed video signal as described above, when the resolution or the like of the non-compressed video signal is made to be small by the signal converting unit 117a of the codec 117 of the video camera 100 from the relation with the transmission bit rate of the HDMI transmission path, the signal converting unit 216a returns the resolution or the like to a state that can be handled by the television receiver 200, that is, a state that can be displayed by the television receiver 200, based on the information of the resolution or the like of the non-compressed video signal transmitted from the video camera 100 as described above.

The switching unit 216 selectively takes out the video signal received by the tuner 214 or the video signal taken out by the switch unit 220, and supplies it to the display processing unit 217. The display processing unit 217 performs a contour enhancement or the like for displaying with respect to the image data taken out by the switching unit 216. The display unit 218 displays the image with the video signal processed by the display processing unit 217. The display unit 218 is configured by, for example, an LCD (Liquid Crystal Display), an organic EL (ElectroLuminescence), a PDP (Plasma Display Panel), a CRT (Cathode Ray Tube) or the like.

In addition, as described in the description of the video camera 100, information indicating a compression method (decompression method) with which the television receiver 200 is compatible is transmitted from the television receiver 200 to the video camera 100 with an E-EDID Vender Specific region, a CEC line, a high speed data line, or the like. In this sense, the control unit 211 makes up the compression method information transmitting unit along with the HDMI reception unit 202 and high speed data line interface 203.

In addition, as described in the description of the video camera 100, information of format, which can be handled with the television receiver 200, that is, impossible with the television receiver 200, of the video signal is transmitted to the video camera 100 in the E-EDID Video Short region and Vender Specific region. In this sense, the HDMI reception unit 202 makes up the video format information transmitting unit.

An operation example of the AV system 50 in FIG. 31 (FIG. 32, FIG. 42) configured as described above will be described. In addition, in regard to the audio system, description will be omitted.

For example, when a user operates the video camera 100 so as to image-pickup a subject, the image pickup device 115 starts the image-pickup operation, and a video signal (image data) corresponding to the subject is obtained from the image pickup signal processing unit 116. The video signal output from the image pickup signal processing unit 116 is encoded with the codec 117, and the encoded data is recorded in the HD 119 by the record and reproduction unit 118. In addition, for example, when the user operates the video camera 100 so as to record data from the external device 130, the video signal from the external device 130 is encoded by the codec 117, and the encoded data is recorded in the HD 119 by the record and reproduction unit 118.

When the user operates the video camera 100 so as to transmit the data recorded in the HD 119, the encoded data is reproduced from the HD 119 by the record and reproduction unit 118, and is supplied to the codec 117. In the codec 117, the encoded data reproduced by the record and reproduction unit 118 is decoded to a non-compressed (baseband) video signal to be transmitted. A resolution, a bit depth, a frame rate or the like of the non-compressed video signal is converted by the signal converting unit 117a, for example, so as to be handled by the television receiver 200, that is, so as to be displayed by the television receiver 200.

The video signal output from the codec 117 is supplied to the HDMI transmission unit 102 via the switch unit 122 without change, or the video signal output from the codec 117 is supplied to the HDMI transmission unit 102 via the switch unit 122 after being subjected to data compression process with one of the data compression units 121-1 to 121-n.

In this case, in a case where it is assumed that the bit rate of the non-compressed video signal output from the codec 117 is BR1 and the transmission bit rate of the HDMI transmission path is BR2, when BR1≤BR2 is satisfied, the non-compressed video signal output from the codec 117 is supplied to the HDMI transmission unit 102 as a video signal to be transmitted.

On the other hand, when BR1≤BR2 is not satisfied, the non-compressed video signal output from the codec 117 is subjected to data compression process with one of the data compression units 121-1 to 121-n, and the output compressed video signal is supplied to the HDMI transmission unit 102 as a video signal to be transmitted.

In addition, even when BR1≤BR2 is not satisfied, if there is no data compression unit performing a data compression process with a compression method with which the television receiver 200 which is compatible among the data compression units 121-1 to 121-n, the resolution or the like of the non-compression video signal output from the codec 117 is made to be small so as to satisfy BR1≤BR2, and the non-compressed video signal is supplied to the HDMI transmission unit 102 as the video signal to be transmitted. Therefore, the video camera 100 can successfully transmit the video signal with a desired bit rate within the transmission bit rates of the HDMI transmission path to the television receiver 200.

In addition, when the user operates the video camera 100 so as to transmit the image pickup data, the video signal (image data) output from the image pickup signal processing unit 116 as described above is supplied to the HDMI transmission unit 102 via the switch unit 122 without change, similar to the video signal reproduced from the HD 119 as described above, or the video signal output from the codec 117 is supplied to the HDMI transmission unit 102 via the switch unit 122 after being subjected to data compression process with one of the data compression units 121-1 to 121-n.

Therefore, the video signal (non-compressed video signal or the compressed video signal) supplied to the HDMI transmission unit 102 is transmitted in one direction to the television receiver 200 via the HDMI cable 300 with communication compliant to an HDMI. In addition, the compression information and the format information of the transmission video signal is transmitted from the control unit 111 to the television receiver 200 by using the AVI InfoFrame packet, the CEC line, the high speed data line, or the like inserted in a blanking period of the video signal.

With the television receiver 200, a video signal transmitted from the HDMI transmission unit 102 of the video camera 100 in one direction via the HDMI cable 300 is received by the HDMI reception unit 202, with communication compliant to an HDMI. The video signal received by the HDMI reception unit 202 is supplied to the switch unit 220 and data decompression unit 219-1 to 219-m.

The operation of the switch unit 220 and data decompression unit 219-1 to 219-m is controlled from the video camera 100, based on the compression information supplied as described above. Specifically, when the video signal received by the HDMI reception unit 202 is a non-compressed video signal, the non-compressed video signal is supplied to the switching unit 216 via the switch unit 220. On the other hand, when the video signal received by the HDMI reception unit 202 is a compressed video signal, the video signal received by the HDMI reception unit 202 is subjected to a data decompression process with the data decompression unit corresponding to the compression method, and the non-compressed video signal obtained as a result thereof is supplied to the switching unit 216 via the switch unit 220.

In addition, when the non-compressed video signal supplied to the switching unit 216 has the resolution or the like made to be small on the video camera 100 side from the relation with the transmission bit rates of the HDMI transmission path, the resolution or the like is returned to a state that can be handled by the television receiver 200, that is, a state that can be displayed by the television receiver 200, based on the format information supplied from the video camera 100 as described above.

Therefore, regardless of whether the video signal received at the HDMI reception unit 202 is a non-compressed video signal or a compressed video signal, a good received video signal is supplied to the switching unit 216. In addition, as described above, in regard to the video camera 100, the data compression process is performed with a compression method with which the television receiver 200 is compatible, based on the compression method information from the television receiver 200, such that the compression video signal received by the HDMI reception unit 202 can always be decompressed by one of the data decompression units 219-1 to 219-m.

In addition, the video signal received by the tuner 214 is supplied to the switching unit 216. When the user performs an operation to select the HDMI reception unit 202 by the user operation unit 212, the video signal received at the HDMI reception unit 202 is taken out by the switching unit 216. On the other hand, when the user performs an operation to select the tuner 214 by the user operation unit 212, the image data received at the tuner 214 is taken out by the switching unit 216.

The video signal taken out by the switching unit 216 is supplied to the display processing unit 217. In the display processing unit 217, a contour enhancement process, a noise reduction process, or the like is performed with respect to the video signal based on control by the control unit 211, and the video signal after being processed is supplied to the display unit 218. In the display unit 218, the image is displayed based on the image data supplied from the display processing unit 217.

Figure 43:
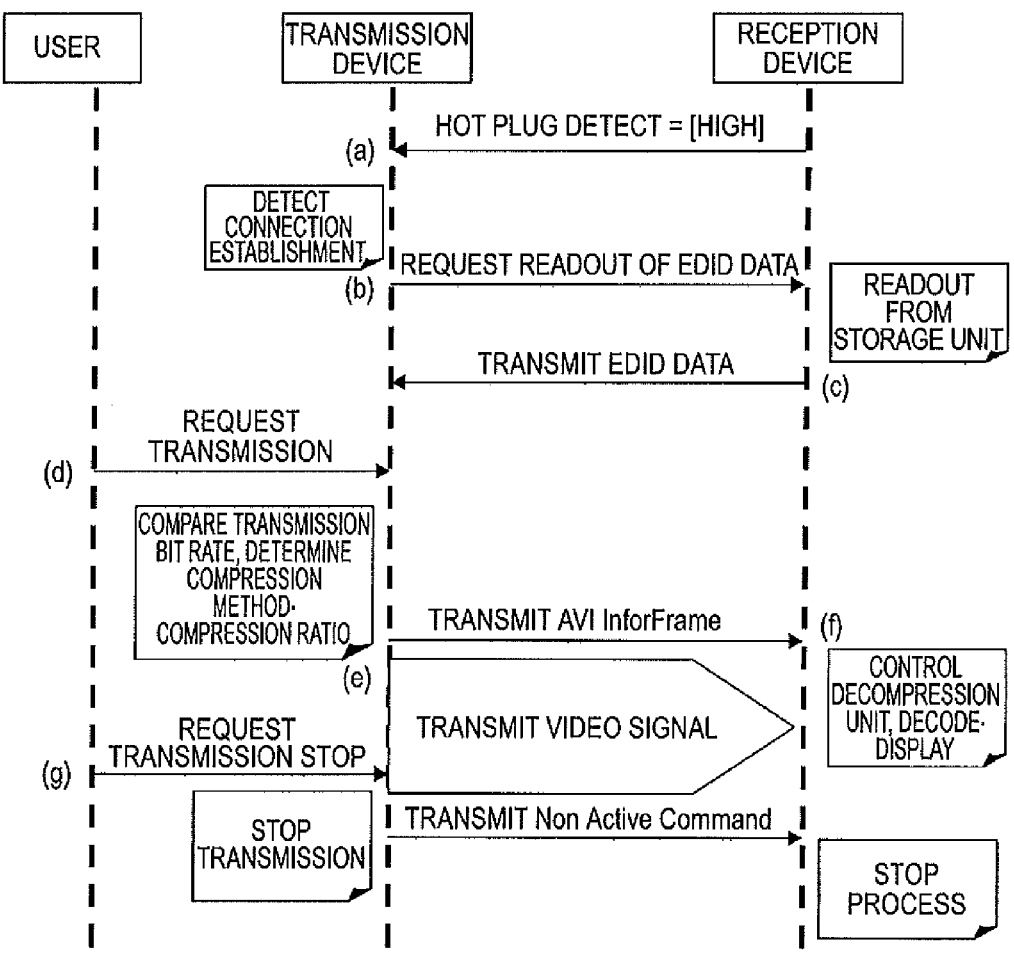
FIG. 43 is a diagram illustrating a control sequence in a case where a video signal is transmitted from a transmission device (video camera) to a reception device (television receiver) via a HDMI cable.

FIG. 43 shows a control sequence in a case of transmitting a video signal from the transmission device (video camera 100) to the reception device (television receiver 200) via the HDMI cable 300.

(a) When receiving an HPD (Hot Plug Detect) signal transmitted from the reception device, the transmission device knows that a connection is established. (b) The transmission device makes a request for the readout of the E-EDID data including compression method (decompression method) information to the reception device. (c) When receiving the request, the reception device reads out the E-EDID data from the storage unit of the reception device, and transmits it to the transmission device. The transmission device recognizes the compression method with which the reception device is compatible from the transmitted E-EDID data, and determines the compression method that the transmission device can use. (d) When a request for transmission is made by the user and the selected video signal is to be transmitted, the transmission device compares the transmission bit rate of the HDMI transmission path and the bit rate of the transmission video signal, and if the bit rate of the transmission video signal is equal to or less than the transmission bit rate of the HDMI transmission path, the video signal is transmitted while remaining non-compressed.

On the other hand, in a case where the bit rate of the transmission video signal exceeds the transmission bit rate of the HDMI transmission path, the transmission device selects an appropriate compression method from the above-described determined compression methods, and determines a compression ratio according to necessity, and (e) sets the information thereof to a predetermined region of the AVI InfoFrame packet and transmits it to the reception device, and transmits the compressed video signal.

(f) The reception device extracts information of a compression method and a compression ratio from the received AVI InfoFrame packet, and if the video signal is in a non-compressed state, passes the video signal to the display unit without change. On the other hand, if the video signal is transmitted in a compressed state, a decompression process (decoding) with respect to the compressed video signals is performed by using the information of the compression method and the compression ratio. (g) When a transmission stop is instructed by the user operation, the transmission device stops the transmission of the video signal.

Figure 44:
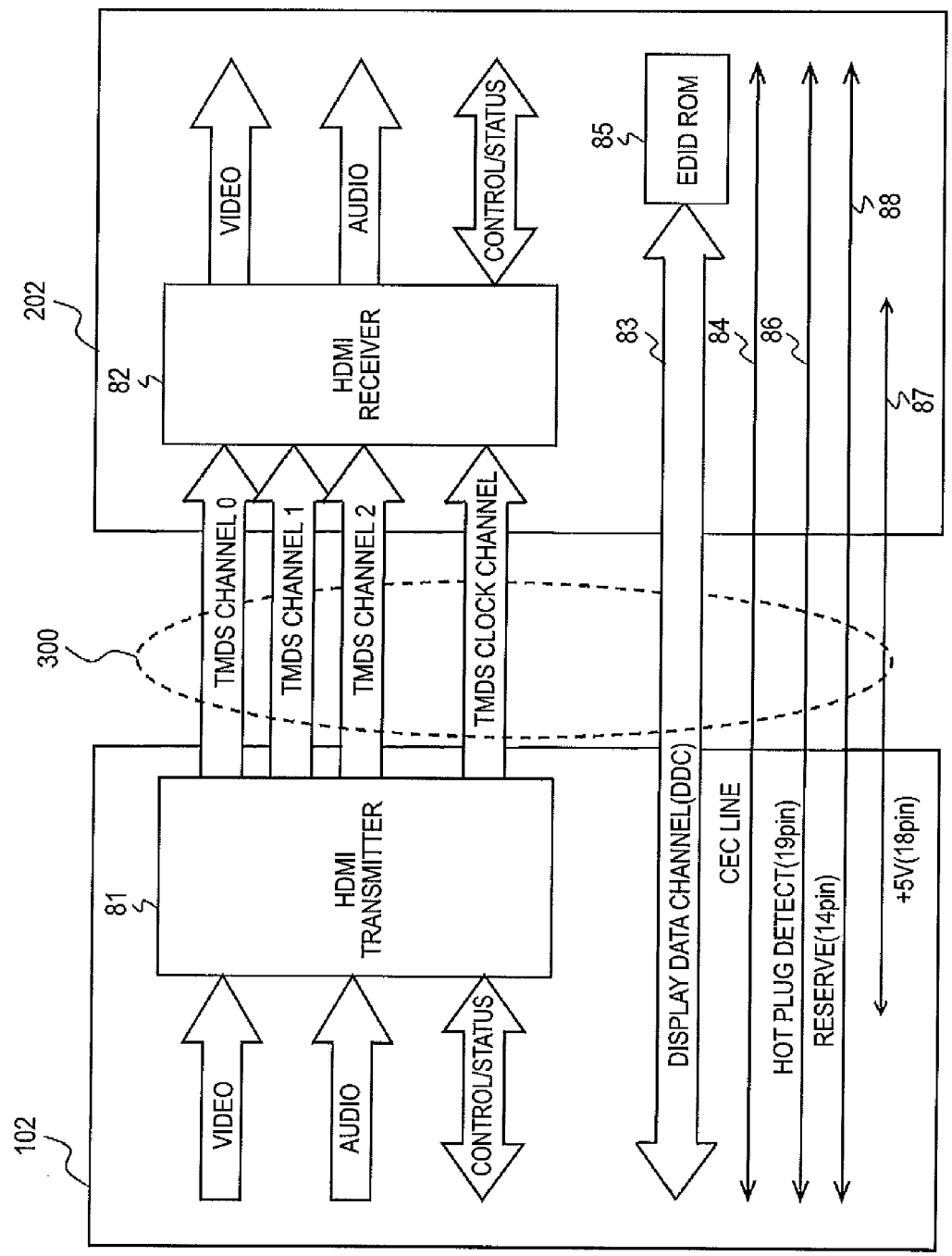
FIG. 44 is a block diagram illustrating a configuration example of an HDMI transmission unit of the source device and an HDMI reception unit of the sink device.

Next, the HDMI transmission unit 102 of the video camera 100 and the HDMI reception unit 202 of the television receiver 200 will be described. FIG. 44 shows a configuration example of the HDMI transmission unit (HDMI source) 102 and the HDMI reception unit (HDMI sink) 202.

In regard to an active image section (hereafter, appropriately referred to as "active video section") that is a section obtained by removing a horizontal blanking section and a vertical blanking section from a section ranging from one vertical synchronous signal to the next vertical synchronous signal, the HDMI transmission unit 102 transmits a differential signal corresponding to pixel data of one screen worth of a non-compressed image in one direction to the HDMI reception unit 202 through multiple channels, and transmits a differential signal corresponding to at least audio data, control data, other auxiliary data or the like accompanying the image, in the horizontal blanking section or vertical blanking section, in one direction to the HDMI reception unit 202 through multiple channels.

Specifically, the HDMI transmission unit 102 includes a transmitter 81. For example, the transmitter 81 converts the pixel data of the non-compressed image to a corresponding differential signal, and serially transmits in one direction to the HDMI reception unit 202 connected via the HDMI cable 300 through three TMDS channels #0, #1, #2 that are multiple channels.

In addition, the transmitter 81 converts the audio data accompanying the non-compressed image, and further necessary control data and other auxiliary data and the like into corresponding differential signals, and serially transmits in one direction to the HDMI reception unit 202 connected via the HDMI cable 300 through the three TMDS channels #0, #1, #2.

In addition, the transmitter 81 transmits a pixel clock synchronized with the pixel data transmitted through the three TMDS channels #0, #1, #2 to the HDMI reception unit 202 connected via the HDMI cable through a TMDS clock channel. Here, through one TMDS channel #i (i=0, 1, 2), 10 bits of pixel data is transmitted during one clock of the pixel clock.

The HDMI reception unit 202 receives the differential signal corresponding to the pixel data transmitted in one direction from the HDMI transmission unit 102 through multiple channels in the active video section, and receives the differential signals corresponding to the audio data and control data transmitted in one direction from the HDMI transmission unit 102 through multiple channels in the horizontal blanking section or vertical blanking section.

Specifically, the HDMI reception unit 202 includes a receiver 82. The receiver 82 receives the differential signal corresponding to the pixel data and the differential signals corresponding to the audio data and control data that are transmitted in one direction from the HDMI transmission unit 102 connected via the HDMI cable 300 through the TMDS channels #0, #1, #2, in synchronization with a pixel clock transmitted similarly from the HDMI transmission unit 102 through a TMDS clock channel.

In the transmission channels of the HDMI system including the HDMI transmission unit 102 and HDMI reception unit 202, there are transmission channels called a DDC (Display Data channel) 83 and a CEC line 84, besides three TMDS channels #0 to #2 as the transmission channels for serially transmitting the pixel data and audio data in one direction from the HDMI transmission unit 102 to the HDMI reception unit 202 in synchronization with the pixel clock, and the TDMS clock channel as the transmission channel for transmitting the pixel clock.

The DDC 83 includes two signal lines (not shown) included in the HDMI cable 300, and is used for the HDMI transmission unit 102 to read out the E-EDID (Enhanced Extended Display Identification Data) from the HDMI reception unit 202 connected via the HDMI cable 300.

Specifically, the HDMI reception unit 202 includes an EDID ROM (Read Only Memory) 85 that stores E-EDID that is capability information related to its own capability (Configuration/capability), besides the HDMI receiver 82. The HDMI transmission unit 102 reads out the E-EDID of the HDMI reception unit 202 via the DDC 83 from the HDMI reception unit 202 connected via the HDMI cable 300, and based on the E-EDID thereof, recognizes the image format (profile) such as RGB, YCbCr 4:4:4, YCbCr 4:2:2 or the like with which an electronic apparatus including the HDMI reception unit 202 is compatible.

The CEC line 84 includes one signal line (not shown) included in the HDMI cable 300, and is used to perform bi-directional communication of data for control between the HDMI transmission unit 102 and HDMI reception unit 202.

In addition, a line 86 connected to a pin called an HPD (Hot Plug Detect) is included in the HDMI cable 300. The source device can detect the sink device connection by using the line 86. In addition, a line 87 used to supply power to the sink device from the source device is included in the HDMI cable 300. Further, a reserve line 88 is included in the HDMI cable 300.

Figure 45:
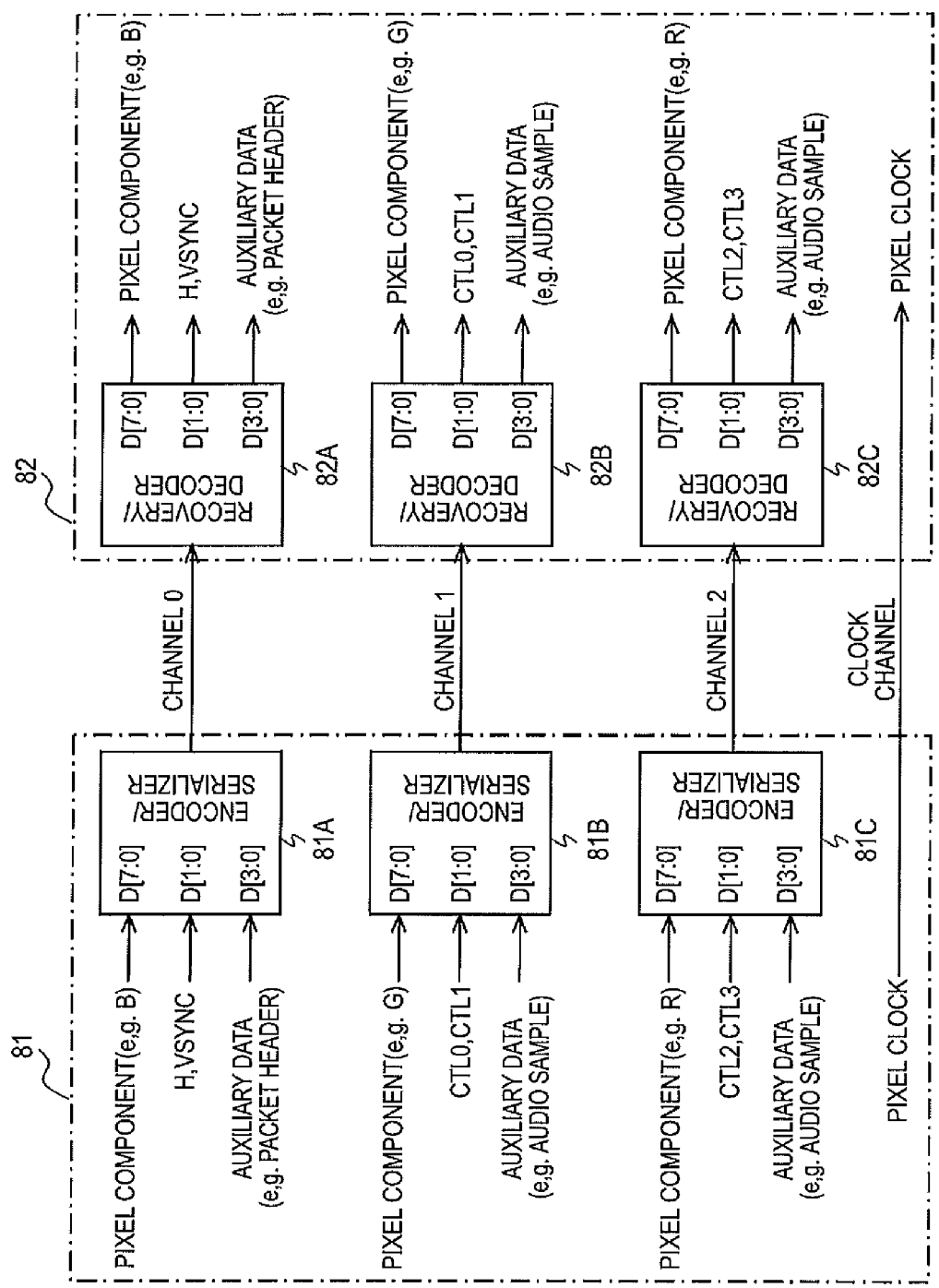
FIG. 45 is a block diagram illustrating a configuration example of an HDMI transmitter and an HDMI receiver.

FIG. 45 shows a configuration example of the HDMI transmitter 81 and the HDMI receiver 82 of FIG. 44.

The transmitter 81 includes three encoders/serializers 81A, 81B, 81C, each corresponding to the three TMDS channels #0, #1, #2. Each of the encoders/serializers 81A, 81B, 81C encodes the image data, the auxiliary data, and the control data supplied thereto, converts from parallel data to serial data, and transmits it with the differential signal. Here, in a case where the image data includes, for example, the three components of R (red), G (green), and B (blue), the B component (B component) is supplied to the encoder/serializer 81A, the G component (G component) is supplied to the encoder/serializer 81B, and the R component (R component) is supplied to the encoder/serializer 81C.

In addition, as auxiliary data, for example, there are audio data and control packets, the control packets are supplied, for example, to the encoder/serializer 81A, and the audio data is supplied to the encoders/serializers 81B and 81C.

In addition, as control data, there is one bit vertical synchronous signal (VSYNC), one bit horizontal synchronous signal (HSYNC), and one bit each of control bits CTL0, CTL1, CTL2, CTL3. The vertical synchronous signal and horizontal synchronous signal are supplied to the encoder/serializer 81A. The control bits CTL0, CTL1 are supplied to the encoder/serializer 81B, and the control bits CTL2, CTL3 are supplied to the encoder/serializer 81C.

The encoder/serializer 81A time-divisionally transmits the B component of the image data supplied thereto, the vertical synchronous signal and horizontal synchronous signal, and the auxiliary data. Specifically, the encoder/serializer 81A has the B component of the image data supplied thereto as parallel data in 8-bit unit that is a fixed number of bits. In addition, the encoder/serializer 81A encodes the parallel data thereof, converts it to the serial data, and transmits the converted serial data through the TMDS channel #0.

In addition, the encoder/serializer 81A encodes two bits of parallel data of the vertical synchronous signal and the horizontal synchronous signal supplied thereto, converts it to serial data, and transmits the converted serial data through the TMDS channel #0. In addition, the encoder/serializer 81A has the auxiliary data supplied thereto as 4-bit unit parallel data. In addition, the encoder/serializer 81A encodes the parallel data thereof, converts it to serial data, and transmits the converted serial data through the TMDS channel #0.

The encoder/serializer 81B time-divisionally transmits the G component of the image data supplied thereto, the control bits CTL0 and CTL1, and the auxiliary data. Specifically, the encoder/serializer 81B has the G component of the image data supplied thereto as parallel data in an 8-bit unit that is a fixed number of bits. In addition, the encoder/serializer 81B encodes the parallel data thereof, converts it to the serial data, and transmits the converted serial data through the TMDS channel #1.

In addition, the encoder/serializer 81B encodes two bits of parallel data of the control bits CTL0 and CTL1 supplied thereto, converts it to serial data, and transmits the converted serial data through the TMDS channel #1. In addition, the encoder/serializer 81B has the auxiliary data supplied thereto as parallel data in a 4-bit unit. In addition, the encoder/serializer 81B encodes the parallel data thereof, converts it to serial data, and transmits the converted serial data through the TMDS channel #1.

The encoder/serializer 81C time-divisionally transmits the R component of the image data supplied thereto, the control bits CTL2 and CTL3, and the auxiliary data. Specifically, the encoder/serializer 81C has the R component of the image data supplied thereto as parallel data in an 8-bit unit that is a fixed number of bits. In addition, the encoder/serializer 81C encodes the parallel data thereof, converts it to the serial data, and transmits the converted serial data through the TMDS channel #2.

In addition, the encoder/serializer 81C encodes two bits of parallel data of the control bits CTL2 and CTL3 supplied thereto, converts it to serial data, and transmits the converted serial data through the TMDS channel #2. Further, the encoder/serializer 81C has the auxiliary data supplied thereto as parallel data in a 4-bit unit. In addition, the encoder/serializer 81C encodes the parallel data thereof, converts it to serial data, and transmits the converted serial data through the TMDS channel #2.

The receiver 82 includes three recovery/decoders 82A, 82B and 82C corresponding to each of the three TMDS channels #0, #1 and #2. Each of the recovery/decoders 82A, 82B and 82C receives the image data, the auxiliary data, and the control data transmitted by the differential signals through the TMDS channels #0, #1 and #2. In addition, each of the recovery/decoders 82A, 82B and 82C converts the image data, auxiliary data, and control data from serial data to parallel data, and decodes them to output.

Specifically, the recovery/decoder 82A receives the B component, the vertical synchronous signal and horizontal synchronous signal, and the auxiliary data of the image data transmitted by the differential signal through the TMDS channel #0. In addition, the recovery/decoder 82A converts the B component, the vertical synchronous signal and horizontal synchronous signal, and the auxiliary data of the image data from serial data to parallel data, and decodes them to output.

The recovery/decoder 82B receives the G component, the control bits CTL0 and CTL1, and the auxiliary data of the image data transmitted by the differential signal through the TMDS channel #1. In addition, the recovery/decoder 82B converts the G component, the control bits CTL0 and CTL1, and the auxiliary data of the image data from serial data to parallel data, and decodes them to output.

The recovery/decoder 82C receives the R component, the control bits CTL2 and CTL3, and the auxiliary data of the image data transmitted by the differential signal through the TMDS channel #2. In addition, the recovery/decoder 82C converts the R component, the control bits CTL2 and CTL3, and the auxiliary data of the image data from serial data to parallel data, and decodes them to output.

Figure 46:
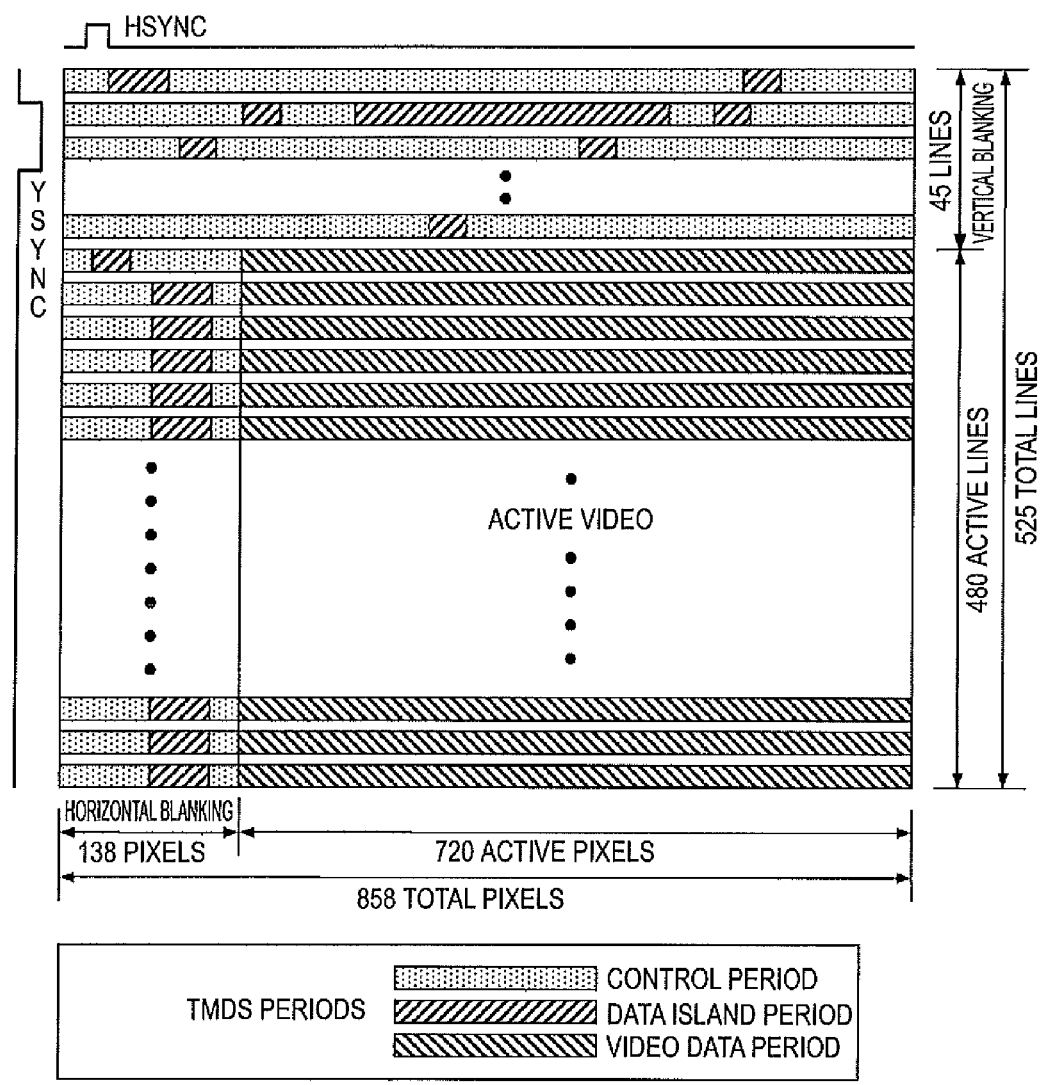
FIG. 46 is a diagram illustrating a structure of TMDS transmission data.

FIG. 46 shows an example of the transmission section (period) in which various types of transmission data is transmitted through the three TMDS channels #0, #1 and #2 of an HDMI. In addition, FIG. 46 shows various types of transmission data sections in a case where in the TDMS channels #0, #1 and #2, a progressive image of 720×480 (horizontal× vertical) pixels is transmitted.

There are three types of periods, a video data section (Video Data period), data island section (Data Island period), and control section (Control period) that exist in the video field (Video Field) where the transmission data is transmitted through the three TMDS channels #0, #1, #2 of HDMI, according to the type of transmission data.

The video field section is a section from a rising edge (active edge) of a certain vertical synchronous signal to a rising edge of the next vertical synchronous signal, and can be divided into a horizontal blanking period (horizontal blanking), vertical blanking period (vertical blanking), and an active video section (Active Video) that is a section obtained by removing the horizontal blanking period and vertical blanking period from the video field section.

The video data section is assigned to the active video section. In this video data section, data of active pixels (Active pixel) of 720 pixels×480 lines that make up one screen worth of non-compressed image data, or the data obtained by being subjected to a compression process is transmitted.

The data island section and the control section are assigned to the horizontal blanking period and vertical blanking period. With the data island section and the control section, the auxiliary data (Auxiliary data) is transmitted.

Specifically, the data island section is assigned to a portion of the horizontal blanking period and vertical blanking period. With the data island section, for example, audio data packets or the like, which is not related to the control, of the auxiliary data, are transmitted.

The control section is assigned to another portion of the horizontal blanking period and vertical blanking period. With the control section, vertical synchronous signals and horizontal synchronous signals, control packets or the like, which is related to the control, of the auxiliary data, are transmitted.

Here, with the current HDMI, a frequency of the pixel clock transmitted with the TMDS clock channel is 165 MHz, for example, and in this case, the transmission rate of the data island section is approximately 500 Mbps.

FIG. 47 shows a pin array of the HDMI terminals 101 and 201. The pin array is an example of type A (type-A).

Two lines that are differential lines in which the TMDS Data #i+ and TMDS Data #i−, which are the differential signals of the TMDS channel #i, are transmitted, are connected to a pin (pin having a pin number of 1, 4, 7) to which the TMDS Data #i+ is assigned and a pin (pin having a pin number of 3, 6, 9) to which the TMDS Data #i− is assigned.

In addition, the CEC line 84 by which the CEC signal, which is the data for control, is transmitted is connected to a pin having a pin number of 13, and a pin having a pin number of 14 is an empty (Reserved) pin. In addition, the line by which the SDA (SerialData) signal such as E-EDID or the like is transmitted is connected to a pin having a pin number of 16, and the line by which the SCL (Serial Clock) signal that is the clock signal used for synchronization at the time of transmitting and receiving SDA signal is transmitted is connected to a pin having a pin number of 15. The above-described DDC 83 includes a line by which the SDA signal is transmitted and a line by which the SCL signal is transmitted.

In addition, as described above, the line 86 used for the source device to detect a connection with the sink device is connected to a pin having a pin number of 19. Also, as described above, the line 87 used for supplying power is connected to a pin having a pin number of 18.

Next, the high speed data line interface 103 of the video camera 100 and the high speed data line interface 203 of the television receiver 200 will be described. In addition, the video camera 100 is described as the source device and the television receiver 200 as the sink device.

Figure 48:
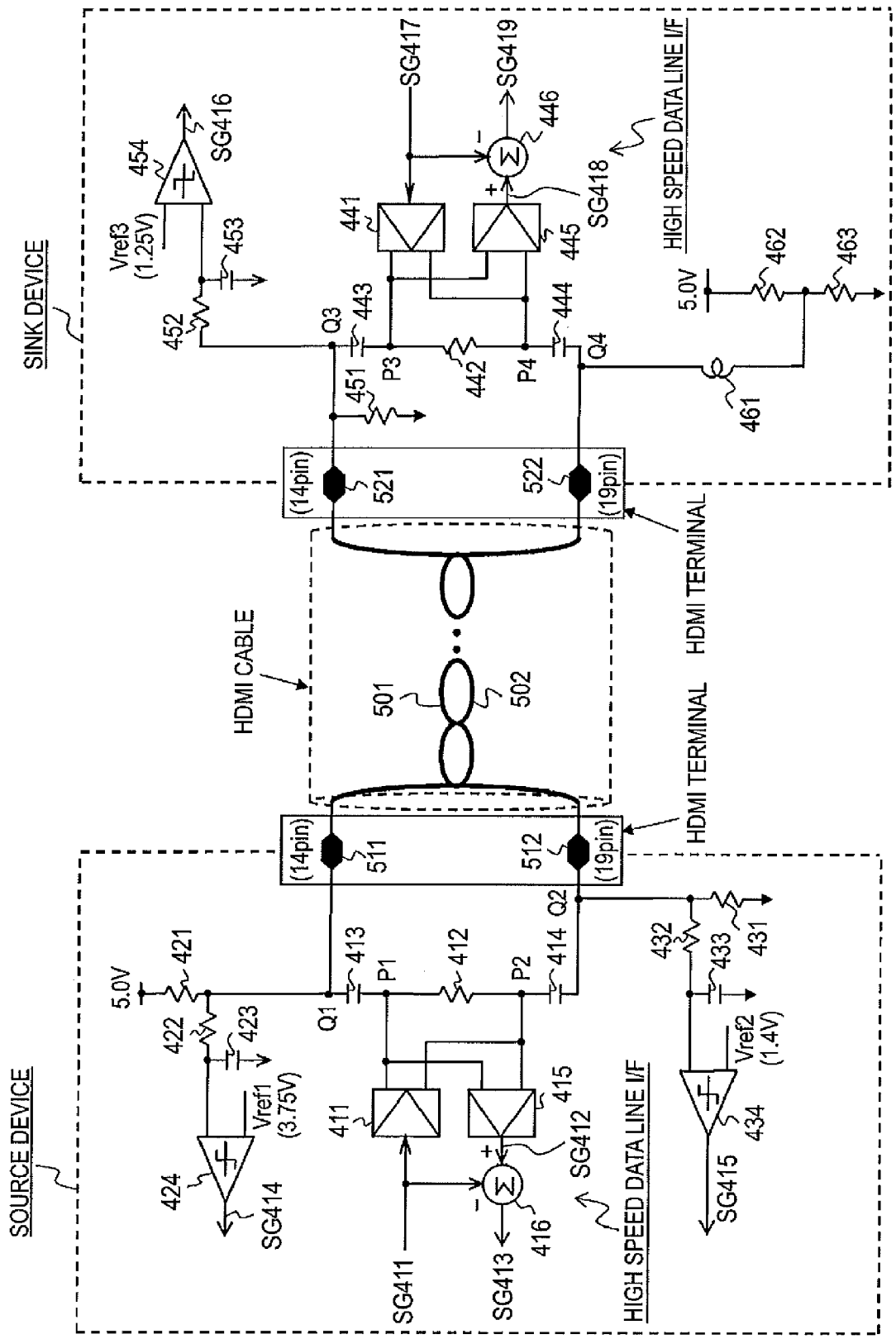
FIG. 48 is a connection diagram illustrating a configuration example of a communication unit that performs LAN communication between the source device and the sink device.

FIG. 48 shows a configuration example of the high speed data line interface of the source device and the sink device. The high speed data line interface makes up a communication unit that performs LAN (Local Area Network) communication. The communication unit performs communication by using a bi-directional communication path including a pair of differential lines of a reserve line (Ether+line) corresponding to an empty (Reserve) pin (pin 14) and the HPD line (Etherline) corresponding to the HPD pin (pin 19), in this embodiment, among the multiple lines making up the HDMI cable.

The source device includes a LAN signal transmitting circuit 411, terminating resistor 412, AC coupling capacitors 413 and 414, a LAN signal receiving circuit 415, a subtraction circuit 416, a pull-up resistor 421, resistor 422 and capacitor 423 making up a low-pass filter, a comparator 424, a pull-down resistor 431, resistor 423 and capacitor 433 making up a low-pass filter, and a comparator 434. Here, the high speed data line interface (high speed data line I/F) includes the LAN signal transmitting circuit 411, the terminating resistor 412, the AC coupling capacitors 413 and 414, the LAN signal receiving circuit 415, and the subtraction circuit 416.

A series circuit of the pull-up resistor 421, the AC coupling capacitor 413, the terminating resistor 412, the AC coupling capacitor 414, and the pull-down resistor 431 is connected between the power line (+5.0 V) and the ground line. A mutual connection point P1 of the AC coupling capacitor 413 and the terminating resistor 412 is connected to a positive output side of the LAN signal transmitting circuit 411, and is connected to a positive input side of the LAN signal receiving circuit 415. In addition, a mutual connection point P2 of the AC coupling capacitor 414 and terminating resistor 412 is connected to a negative output side of the LAN signal transmitting circuit 411, and is connected to a negative input side of the LAN signal receiving circuit 415. A transmission signal (transmission data) SG 411 is supplied to the input side of the LAN signal transmitting circuit 411.

In addition, output signal SG 412 of the LAN signal receiving circuit 415 is supplied to the positive side terminal of the subtraction circuit 416, and the transmission signal (transmission data) SG 411 is supplied to the negative side terminal of the subtraction circuit 416. In the subtraction circuit 416, the transmission signal SG 411 is subtracted from the output signal SG 412 of the LAN signal receiving circuit 415, and a reception signal (reception data) SG 413 is obtained.

In addition, a mutual connection point Q1 of the pull-up resistor 421 and AC coupling capacitor 413 is connected to a ground line via a series circuit of the resistor 422 and capacitor 423. An output signal of the low-pass filter obtained at the mutual connection point of the resistor 422 and capacitor 423 is supplied to one of the input terminals of the comparator 424. In the comparator 424, the output signal of the low-pass filter is compared to a reference voltage Vref1 (+3.75 V) supplied to the other input terminal. An output signal SG 414 of the comparator 424 is supplied to a control unit (CPU) of the source device.

In addition, a mutual connection point Q2 of the AC coupling capacitor 414 and the pull-down resistor 431 is connected to a ground line via the series circuit of the resistor 432 and the capacitor 433. An output signal of the low-pass filter obtained at the mutual connection point of the resistor 432 and capacitor 433 is supplied to one of the input terminals of the comparator 434. In the comparator 434, the output signal of the low pass filter is compared to the reference voltage Vref2 (+1.4 V) supplied to the other input terminal. An output signal SG 415 of the comparator 434 is supplied to the control unit (CPU) of the source device.

The sink device includes a LAN signal transmitting circuit 441, a terminating resistor 442, AC coupling capacitors 443 and 444, a LAN signal receiving circuit 445, a subtraction circuit 446, a pull-down resistor 451, a resistor 452 and a capacitor 453 making up a low-pass filter, a comparator 454, a choke coil 461, a resistor 462, and a resistor 463. Here, the high speed data line interface (high speed data line I/F) includes the LAN signal transmitting circuit 441, the terminating resistor 442, the AC coupling capacitor 443, 444, LAN signal receiving circuit 445, and subtraction circuit 446.

Between the power line (+5.0 V) and the ground line, a series circuit of the resistor 462 and resistor 463 is connected. In addition, between a mutual connection point of the resistor 462 and resistor 463 and the ground line, a series circuit of the choke coil 461, the AC coupling capacitor 444, the terminating resistor 442, the AC coupling capacitor 443, and the pull-down resistor 451 is connected.

A mutual connection point P3 of the AC coupling capacitor 443 and the terminating resistor 442 is connected to a positive output side of the LAN signal transmitting circuit 441, and is connected to a positive input side of the LAN signal receiving circuit 445. In addition, a mutual connection point P4 of the AC coupling capacitor 444 and the terminating resistor 442 is connected to a negative output side of the LAN signal transmitting circuit 441 and is connected to a negative input side of the LAN signal receiving circuit 445. A transmission signal (transmission data) SG 417 is supplied to the input side of the LAN signal transmitting circuit 441.

In addition, an output signal SG 418 of the LAN signal receiving circuit 445 is supplied to a positive side terminal of the subtraction circuit 446, and a transmission signal SG 417 is supplied to a negative side terminal of the subtraction circuit 446. In the subtraction circuit 446, the transmission signal SG 417 is subtracted from the output signal SG 418 of the LAN signal receiving circuit 445, and a reception signal (reception data) SG 419 is obtained.

In addition, a mutual connecting point Q3 of the pull-down resistor 451 and the AC coupling capacitor 443 is connected to a ground line via a series circuit of the resistor 452 and the capacitor 453. An output signal of the low-pass filter obtained at the mutual connection point of the resistor 452 and capacitor 453 is supplied to one of input terminals of the comparator 454. In the comparator 454, the output signal of the low-pass filter is compared to a reference voltage Vref3 (+1.25 V) supplied to the other input terminal. An output signal SG 416 of the comparator 454 is supplied to the control unit (CPU) of the sink device.

A reserve line 501 and an HPD line 502 included in an HDMI cable make up a differential twisted pair. A source side edge 511 of the reserve line 501 is connected to the pin 14 of the HDMI terminal of the source device, and a sink side edge 521 of the reserve line 501 is connected to the pin 14 of the HDMI terminal of the sink device. Also, a source side edge 512 of the HPD line 502 is connected to the pin 19 of the HDMI terminal of the source device, and a sink side edge 522 of the HPD line 502 is connected to the pin 19 of the HDMI terminal of the sink device.

In regard to the source device, the mutual connection point Q1 of the pull-up resistor 421 and the AC coupling capacitor 413 described above is connected to the pin 14 of the HDMI terminal, and also the mutual connection point Q2 of the pull-down resistor 431 and the AC coupling capacitor 414 is connected to the pin 19 of the HDMI terminal. On the other hand, in regard to the sink device, the mutual connection point Q3 of the pull-down resistor 451 and the AC coupling capacitor 443 described above is connected to the pin 14 of the HDMI terminal, and also, the mutual connection point Q4 of the choke coil 461 and the AC coupling capacitor 444 described above is connected to the pin 19 of the HDMI terminal.

Next, an operation of the LAN communication by the high speed data line interface configured as described above will be described.

In regard to the source device, the transmission signal (transmission data) SG 411 is supplied to the input side of the LAN signal transmission circuit 411, and the differential signal (positive output signal, negative output signal) corresponding to the transmission signal SG 411 is output from the LAN signal transmission circuit 411. The differential signal output from the LAN signal transmission circuit 411 is supplied to the connection points P1 and P2, and is transmitted to the sink device through a pair of lines (reserve line 501, HPD line 502) of the HDMI cable.

In addition, in regard to the sink device, the transmission signal (transmission data) SG 417 is supplied to the input side of the LAN signal transmission circuit 441, and the differential signal (positive output signal, negative output signal) corresponding to the transmission signal SG 417 is output from the LAN signal transmission circuit 441. The differential signal output from the LAN signal transmission circuit 441 is supplied to the connection points P3 and P4, and is transmitted to the source device through a pair of lines (reserve line 501, HPD line 502) of the HDMI cable.

In addition, in regard to the source device, the input side of the LAN signal receiving circuit 415 is connected to the connecting points P1 and P2, whereby as an output signal SG 412 of the LAN signal receiving circuit 415, an added signal of the transmission signal corresponding to the differential signal (current signal) output from the LAN signal transmitting circuit 411 and a receiving signal corresponding to the differential signal transmitted from the sink device as described above is obtained. In the subtraction circuit 416, the transmission signal SG 411 is subtracted from the output signal SG 412 of the LAN signal receiving circuit 415. Therefore, the output signal SG 413 of the subtraction circuit 416 corresponds to the transmission signal (transmission data) SG 417 of the sink device.

In addition, in regard to the sink device, the input side of the LAN signal receiving circuit 445 is connected to the connecting points P3 and P4, whereby as an output signal SG 418 of the LAN signal receiving circuit 445, an added signal of the transmission signal corresponding to the differential signal (current signal) output from the LAN signal transmitting circuit 441 and a receiving signal corresponding to the differential signal transmitted from the source device as described above is obtained. In the subtraction circuit 446, the transmission signal SG 417 is subtracted from the output signal SG 418 of the LAN signal receiving circuit 445. Therefore, the output signal SG 419 of the subtraction circuit 446 corresponds to the transmission signal (transmission data) SG 411 of the source device.

As described above, bi-directional LAN communication can be performed between the high speed data line interface of the source device and the high speed data line interface of the sink device.

In addition, in FIG. 48, besides the above-described LAN communication, the HPD line 502 transmits to the source device that the HDMI cable is connected to the sink device with a DC bias level. Specifically, the resistors 462 and 463, and the choke coil 461 within the sink device biases the HPD line 502 to approximately 4V when the HDMI cable is connected to the sink device, via the pin 19 of the HDMI terminal. The source device extracts the DC bias of the HPD line 502 with the low-pass filter including the resistor 432 and the capacitor 433, and compares it to the reference voltage Vref2 (for example, 1.4 V) by the comparing unit 434.

If the HDMI cable is not connected to the sink device, since the pull-down resistor 431 exists, the voltage of the pin 19 of the HDMI terminal of the source device is lower than the reference voltage Vref2, and contrarily, if the HDMI cable is connected to the sink device, the voltage of the pin 19 is higher than the reference voltage Vref2. Accordingly, the output signal SG 415 of the comparator 434 is a high level when the HDMI cable is connected to a sink device, and a low level otherwise. Therefore, the control unit (CPU) of the source devices can recognize whether or not the HDMI cable is connected to the sink device, based on the output signal SG 415 of the comparator 434.

Also, in FIG. 48, devices connected to both ends of the HDMI cable have a function of mutually recognizing, with the DC bias potential of the reserve line 501, whether each of the devices is device capable of performing LAN communication (hereinafter, referred to as "e-HDMI compatible device") or is device not capable of performing LAN communication (hereafter, referred to as "e-HDMI non-compatible device").

As described above, the source device pulls-up (+5 V) the reserve line 501 with the resistor 421, and the sink device pulls-down the reserve line 501 with the resistor 451. The resistors 421 and 451 do not exist in e-HDMI non-compatible device.

As described above, the source device compares the DC potential of the reserve line 501 that passed through the low-pass filter including the resistor 422 and capacitor 423, with the reference voltage Vref1, by using the comparator 454. When there is a pull-down resistor 451 at the e-HDMI compatible device, the voltage of the reserve line 501 at the sink device becomes 2.5 V. However, when there is no pull-down resistor 451 at the e-HDMI non-compatible device, the voltage of the reserve line 501 at the sink device becomes 5 V from the existence of the pull-up resistor 421.

Therefore, by the reference voltage Vref1 being 3.75 V, for example, the output signal SG 414 of the comparator 424 has a low level when the sink device is e-HDMI compatible device, and otherwise has a high level. Thus, the control unit (CPU) of the source device can recognize whether the sink device is e-HDMI compatible device or not, based on the output signal SG 414 of the comparing unit 424.

Similarly, the sink device compares the DC potential of the reserve line 501 that passed through the low-pass filter including the resistor 452 and the capacitor 453, with the reference voltage Vref3, by using the comparator 454. When there is a pull-up resistor 421 at the e-HDMI compatible device, the voltage of the reserve line 501 at the source device becomes 2.5 V. However, when there is no pull-up resistor 421 at the eHDM e-HDMI non-compatible device, the voltage of the reserve line 501 at the source device becomes 0 V from the existence of the pull-down resistor 451.

Therefore, by the reference voltage Vref3 being 1.25 V, for example, the output signal SG 416 of the comparator 454 has a high level when the source device is e-HDMI compatible device, and otherwise has a low level. Therefore, the control unit (CPU) of the sink device can recognize whether the source device is e-HDMI compatible device or not, based on the output signal SG 416 of the comparator 454.

According to the configuration example shown in FIG. 48, in regard to an interface that performs a video and an audio data transmission, an exchange and authentication of connecting device information, a data communication and a LAN communication of device control data with one HDMI cable, the LAN communication is performed with bi-directional communication via a pair of differential transmission paths, and the connection state of the interface is notified by at least one of the DC bias potentials of the transmission paths, such that a spatial separation can be performed and thereby the SCL line and SDA line are physically not used for LAN communication. As a result, a circuit can be formed for the LAN communication regardless of the defined electrical specification related to the DDC, and a stable and reliable LAN communication can be realized at low cost.

In addition, the pull-up resistor 421 shown in FIG. 48 may be provided within the HDMI cable instead of within the source device. In such a case, each of the terminals of the pull-up resistor 421 are connected to each of a reserve line 501, and a line (signal line) connected to the power (power potential) among the lines provided within the HDMI cable.

In addition, the pull-down resistor 451 and the resistor 463 shown in FIG. 48 may be provided within the HDMI cable instead of within the sink device. In such a case, each of the terminals of the pull-down resistor 451 is connected to a reserve line 501, and a line (ground line) connected to the ground (reference potential) among the lines provided within the HDMI cable. In addition, each of the terminals of the resistor 463 is connected to the HPD line 502, and a line (ground line) connected to the ground (reference potential) among the lines provided within the HDMI cable.

As described above, in regard to the AV system 50 shown in FIG. 31, the video camera 100 (see FIG. 32) selectively transmits a non-compressed video signal or a compressed video signal obtained by subjecting the non-compressed video signal to compression process by a compression method with which the television receiver 200 is compatible, and the video camera 100 can successfully transmit the video signal with a desired bit rate within the transmission bit rates of the transmission path.

In addition, in regard to the AV system 50 shown in FIG. 31, the television receiver 200 (see FIG. 42) supplies the information of a compression method that is compatible with itself to the video camera 100, and can control the decompression process, the signal selecting process, or the like, based on the compression information or the like supplied from the video camera 100, thereby successfully obtaining a reception video signal regardless of whether the transmitted video signal is a non-compressed video signal or a compressed video signal.

In addition, the AV system 50 of FIG. 31 is shown to use an HDMI transmission path. However, it may be similarly configured also in case of using a transmission path of a non-compressed video signal other than the HDMI, for example, a DVI (Digital Visual Interface), a DP (Display Port) interface, a wireless transmission, and a gigabit Ethernet•optical fiber transmission path that is expected to be spread from now on.

In a case of a DVI, similar to the above-described HDMI, there is defined a standard for storing a format (resolution, bit depth, frame rate or the like) corresponding to a video signal in a region called an E-EDID provided to the reception device. Accordingly, as is the case with the HDMI, in the case of the DVI, when transmitting the video signal to the reception device, the transmission device can read out the above-described corresponding format information from the E-EDID of the reception device by using a DDC (Display Data Channel) and can determine the format of the transmission video signal.

In a case of the DVI, similar to the HDMI, the video signal is transmitted in one direction from the source device to the sink device, by using the TMDS channel 0 to the TMDS channel 2 (see FIG. 44). A theoretical upper limit transmission bit rate of the DVI transmission path is 3.96 Gbps.

Figure 49:
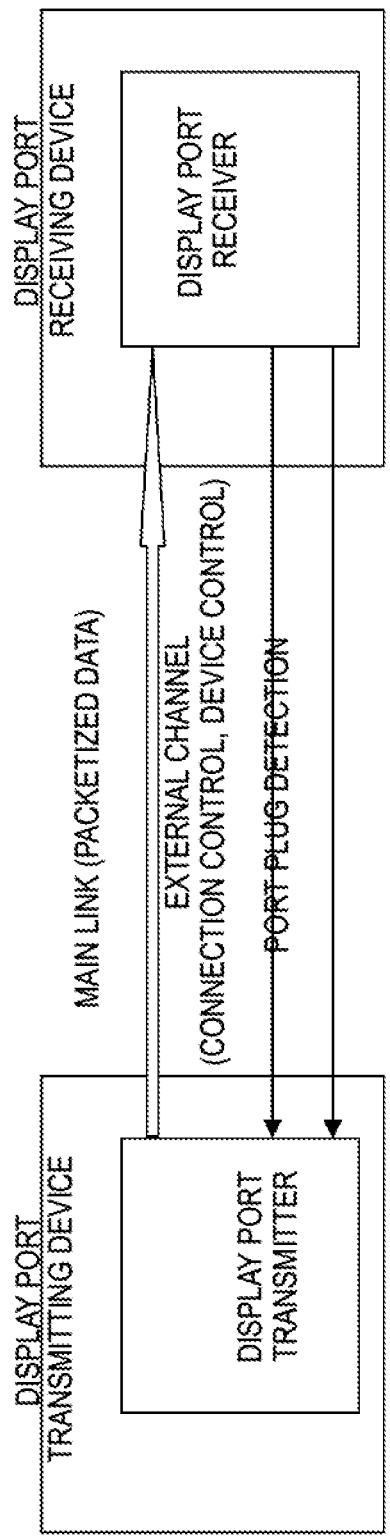
FIG. 49 is a block diagram illustrating a configuration example of a DP system.

FIG. 49 shows a configuration example of the DP system using a DP interface. In the DP system, a display port transmitting device and a display port receiving device are connected with a DP interface. The display port transmitting device includes a display port transmitter, and the display port receiving device includes a display port receiver.

A main link is configured with one, two, or four double-terminated differential signal pairs (pair lanes), does not have a dedicated clock signal, and instead a clock is embedded in an 8B/10B encoded data stream. In the DP interface, two transmission speeds are defined. One has a bandwidth of 2.16 Gbps for each pair lane. The other has a bandwidth of 1.296 Gbps for each pair lane. Accordingly, the theoretical upper limit transmission bit rate of the transmission path of the DP interface is 2.16 Gbps per one port, and 8.64 Gbps for the maximum four ports.

In the DP interface, the transmission speed and the pixel frequency are independent unlike HDMI, and the existence and amount of appended data such as pixel depth and resolution, frame frequency, and audio data and DRM information within the transmission stream can be freely adjusted.

In addition, in the DP interface, separately from the main link, there is a half-duplex bi-directional external (auxiliary) channel with a bandwidth of 1M bits/second and a maximum delay of 500 ms, information exchange related to the functions between the transmission device and the reception device with the bi-directional communication is performed.

In related to the DP interface, for example, by the above-described external (auxiliary) channel, information of the compression method that is compatible can be supplied from the reception device to the transmission device, and also compression information can be supplied from the transmission device to the reception device. In addition, in the case of the DP interface, although it is not shown, information of the compression method (decompression method) with which the reception device is compatible is stored in the EDID, similar to the HDMI or DVI. In addition, in the DP interface, hot plug detection is provided to detect that the connection destination is changed.

Figure 50:
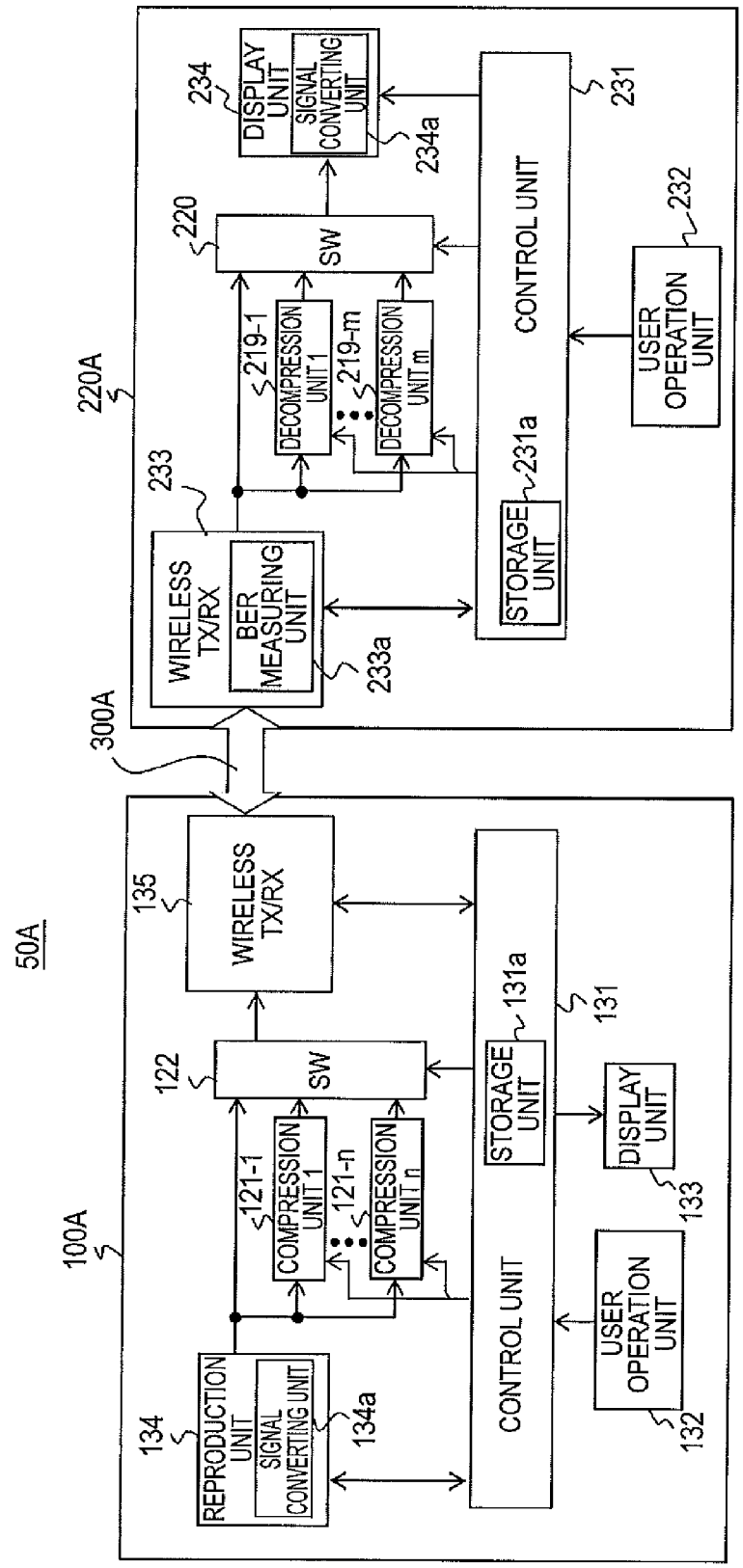
FIG. 50 is a block diagram illustrating a configuration example of a wireless system.

FIG. 50 shows a configuration example of the wireless system 50A. In FIG. 50, the portions corresponding to FIG. 32 and FIG. 42 are designated by the same reference numerals, and the detailed description thereof will be appropriately omitted. The wireless system 50A is configured by a configuration in which a transmission device 100A and reception device 200A are connected with a wireless transmission path 300A.

The transmission device 100A includes a control unit 131, a user operation unit 132, a display unit 133, a reproduction unit 134, n number of data compression units 121-1 to 121-n, a switch unit 122, and a wireless transmission and reception unit 135.

The control unit 131 controls an operation of each unit of the transmission device 100A. The user operation unit 132 and display unit 133 make up a user interface, and are connected to the control unit 131. The user operation unit 132 includes keys, buttons and dials disposed in a casing (not shown) of the transmission device 100A, a touch panel disposed on a display surface of the display unit 133, a transmission and reception unit of a remote controller, or the like. The display unit 133 is configured by an LCD (Liquid Crystal Display) or the like.

The reproduction unit 134 reproduces predetermined video content from, for example, a recording medium such as an optical disk, HDD, memory card, or the like, and outputs a non-compressed video signal. The reproduction unit 134 makes up a video signal output unit. The wireless transmission and reception unit 135 receives information of a corresponding format (resolution, bit depth, frame rate, or the like) of the video signal from the reception device 200A, via the wireless transmission path 300A, and supplies this format information to the control unit 131. The control unit 131 stores and holds the format information herein in the storage unit 131*a*. The reproduction unit 134 converts and outputs the format (resolution, bit depth, frame rate, or the like) of the non-compressed video signal to be output based on control by the control unit 131 by the signal converting unit 134*a* so as to be handled with the reception device 200A, that is, so as to be displayable with the reception device 200A. The wireless transmission and reception unit 135 makes up a video format information receiving unit.

The data compression units 121-1 to 121-n compress the non-compressed video signal output from the reproduction unit 134 with a predetermined compression ratio, respectively, and output the compressed video signal. The data compression units 121-1 to 121-n make up the video signal compression unit. Each of the data compression units 121-1 to 121-n performs data compression process with a compression method different from each other. For example, as a compression method, "RLE (Run Length Encoding)", "Wavelet", "SBM (SuperBit Mapping)", "LLVC (Low Latency Video Codec)", "ZIP", or the like may be considered. In addition, the compression ratio necessary for the data compression units 121-1 to 121-n may be small, and a compression method with a small compression ratio that performs an inter-line compression process or an inter-frame (field) compression process is sufficient, and from the viewpoint of suppressing image quality deterioration, a reversible compression method is desired. For example, RLE and ZIP are reversible compression methods.

The switch unit 122 selectively takes out one of the non-compressed video signal output from the reproduction unit 134 and the compressed video signal output from the data compression units 121-1 to 121-n, and supplies it to the wireless transmission and reception unit 135 as a video signal to be transmitted. The switch unit 122 makes up a video signal selecting unit.

Here, the operations of the switch unit 122 and the data compression units 121-1 to 121-n are controlled as describe below by the control unit 131. In this case, it is assumed that the bit rate of the non-compressed (baseband) video signal output from the reproduction unit 134 is BR1, and the transmission bit rate of the wireless transmission path 300A is BR2. The bit rate BR1 can be obtained with a computation expression of, for example, (resolution)×(frame rate)×(three colors worth of bit depth).

In this embodiment, the transmission bit rate BR2 of the wireless transmission path 300A is set by the control unit 131, based on the bit error rate information on the reception device 200A side supplied from the reception device 200A via the wireless transmission path 300A. The control unit 131 sequentially changes the bit rate BR2, based on the bit error rate information on the reception device 200A side, so that the bit rate becomes the highest one in bit rates in which the bit error rate on the reception device 200A side becomes a constant value or less.

Specifically, the control unit 131 makes the value of the bit rate BR2 small in a case where the bit error rate is greater than a constant value, and makes the value of the bit rate BR2 large in a case where the bit error rate is smaller than a constant value, and shifts the bit error rate at the reception device 200A side in the neighborhood of the constant value.

As described above, the wireless transmission and reception unit 135 receives bit error rate information supplied from the reception device 200A via the wireless transmission path 300A, and supplies it to the control unit 131. The control unit 131 stores the bit error rate information in the storage unit 131a. The wireless transmission and reception unit 135 makes up the bit error rate information receiving unit.

In a case where the bit rate BR1 does not exceed the bit rate BR2, the switch unit 122 takes out the non-compressed video signal output from the reproduction unit 134, and supplies it to the wireless transmission and reception unit 135 as a video signal to be transmitted. On the other hand, in a case where the bit rate BR1 exceeds the bit rate BR2, the switch unit 122 takes out the compression video signal obtained by subjecting the non-compressed video signal output from the reproduction unit 134 to a data compression process with one of the data compression units 121-1 to 121-n, and supplies it to the wireless transmission and reception unit 135 as a video signal to be transmitted.

Here, the control unit 131 makes a reference to information, which is transmitted from the reception device 200A via the wireless transmission path 300A and indicates the compression method with which the reception device 200A is compatible, and determines which data compression unit of the data compression units 121-1 to 121-n to select. Specifically, the control unit 131 selects a data compression unit that satisfies a condition where a data compression process is performed by using a compression method with which the reception device 200A is compatible, and the data compression process is performed so that the bit rate of the compressed video signal generated by the data compression process does not exceed the above-described bit rate BR2 (transmission bit rate of the wireless transmission path 300A). In this case, in the data compression unit wherein the compression ratio can be changed, there are cases wherein the above-described bit rate conditions can be satisfied by compression ratio change control.

In addition, in a case where two or more of data compression units satisfying the above-described condition are present, and a data compression unit that can perform data compression with a reversible compression method is present, the control unit 131 preferentially selects that data compression unit. As described above, since the data compression unit, which performs a data compression with a reversible compression method, can be preferentially selected, image deterioration caused by the data compression process can be suppressed.

In addition, as described above, in a case where the bit rate BR1 exceeds the bit rate BR2, basically, the compressed video signal obtained by data compression process with one of the data compression units 121-1 to 121-n is set as a video signal to be transmitted, but in a case where the data compression unit, which performs the data compression with a compression method with which the reception device 200A is compatible, is not present in the data compression units 121-1 to 121-n, the control unit 131 performs a control described below.

Specifically, the control unit 131 allows the signal converting unit 134a provided to the reproduction unit 134 to make small one or a plurality of items among the resolution, the bit depth, and the frame rate of the non-compressed video signal output from the reproduction unit 134, so that the bit rate BR1 of the non-compression video signal does not exceed the transmission bit rate BR2 of the wireless path 300A. The control unit 131 takes out the non-compressed video signal output from the reproduction unit 134 by the switch unit 122, and supplies it to the wireless transmission and reception unit 135 as a video signal to be transmitted.

As described above, the wireless transmission and reception unit 135 receives information, which is supplied from the reception device 200A via the wireless transmission path 300A, of the compression method with which the reception device 200A is compatible, and supplies it to the control unit 131. The control unit 131 stores the compression method information in the storage unit 131a. The wireless transmission and reception unit 135 makes up the compression method information receiving unit.

The control unit 131 transmits the control information of the switch unit 122 and data compression unit 121-1 to 121-n, and the format information (information of resolution or the like) of the non-compressed video signal output from the reproduction unit 134 described above, to the reception device 200A via the wireless transmission path 300A. The control information (hereinafter, referred to as "compression information") of the switch unit 122 and data compression unit 121-1 to 121-n includes information indicating whether the transmission video signal is a non-compressed video signal or a compressed video signal, and information of a compression method, a compression ratio, or the like, when the transmission video signal is a compressed video signal. The control unit 131 makes up the compression information transmitting unit along with the wireless transmission and reception unit 135.

The control unit 131 can transmit the above-described compression information to the reception device 200A by using, for example, AVI InfoFrame packet, similar to the AV system 50 shown in FIG. 31 described above (see FIG. 40 and FIG. 41).

The wireless transmission and reception unit 135 transmits the video signal supplied from the switch unit 122 to the reception device 200A via the wireless transmission path 300A with predetermined communication. In this sense, the wireless transmission and reception unit 135 makes up the video signal transmitting unit.

The reception device 200A includes a control unit 231, a user operation unit 232, a wireless transmission and reception unit 233, m number of data decompression units 219-1 to 219-m, a switch unit 220, and a display unit 234.

The control unit 231 controls the operation of each unit of the reception device 200A. The user operation unit 232 makes up the user interface, and is connected to the control unit 231. The user operation unit 232 includes keys, buttons and dials disposed in a casing (not shown) of the reception device 200A, a remote controller, or the like.

The wireless transmission and reception unit 233 receives the video signal transmitted from the transmission device 100A via the wireless transmission path 300A with predetermined communication. The wireless transmission and reception unit 233 makes up the video signal receiving unit. The wireless transmission and reception unit 233 supplies the received video signal to the switch unit 220 and the data decompression units 219-1 to 219-m.

When the video signal received by the wireless transmission and reception unit 233 is a compressed video signal and the data decompression units 219-1 to 219-m themselves are compatible with the compression method thereof, the data decomposition units perform a data decompression process to the video signal and output a non-compressed video signal. The data decompression units 219-1 to 219-m make up a video signal decompression unit. The switch unit 220 selectively takes out the video signal received by the wireless transmission and reception unit 233 or the non-compressed video signal obtained by the data decompression units 219-1 to 219-m, and supplies it to the display unit 234. The switch unit 220 makes up the video signal selecting unit.

Here, the operation of the data decompression units 219-1 to 219-m and the switch unit 220 are controlled by the control unit 231 as described below. Specifically, the control unit 231 performs control based on the compression information and video signal format information supplied from the transmission device 100A via the wireless transmission path 300A, as described above. This information is received by the wireless transmission and reception unit 233, and is supplied to the control unit 231. The control unit 231 stores this information in the storage unit 231a.

The compression information includes information indicating whether the video signal received by the wireless transmission and reception unit 233 is a non-compressed video signal or a compressed video signal, and information of a compression method, a compression ratio, or the like, when the video signal is a compressed video signal. The wireless transmission and reception unit 233 makes up the compression information receiving unit.

The control unit 231 controls the operation of the data decompression units 219-1 to 219-m and the switch unit 220, based on the above-described compression information or the like. Specifically, when the video signal received by the wireless transmission and reception unit 233 is a non-compressed video signal, the control unit 231 takes out the non-compressed video signal by the switch unit 220, and supplies it to the display unit 234 as a reception video signal.

On the other hand, when the video signal received at the wireless transmission and reception unit 233 is a compressed video signal, the control unit 231 subjects the video signal to a data decompression process with the data decompression unit corresponding to the compression method thereof, and takes out the non-compressed video signal obtained as a result thereof by the switch unit 220, and supplies it to the display unit 234.

In addition, the display unit 234 includes a signal converting unit 234a. Even when the video signal received by the wireless transmission and reception unit 233 is a non-compressed video signal as described above, when the resolution or the like of the non-compressed video signal is made to be small by the signal converting unit 134a provided to the reproduction unit 134 of the transmission device 100A from the relation with the transmission bit rate of the wireless transmission path 300A, the signal converting unit 234a returns the resolution or the like to a state that can be handled by the reception device 200A, that is, a state that can be displayed by the reception device 200A, based on the information of the resolution or the like of the non-compressed video signal transmitted from the transmission device 100A as described above.

The display unit 234 displays the image with the video signal output from the switch unit 220. The display unit 234 is configured by, for example, an LCD (Liquid Crystal Display), an organic EL (ElectroLuminescence), a PDP (Plasma Display Panel), a CRT (Cathode Ray Tube), or the like.

In addition, as described in the description of the transmission device 100A, information indicating the compression method (decompression method) with which the reception device 200A is compatible is transmitted from the reception device 200A to the transmission device 100A via the wireless transmission path 300A. The compression method information is stored in the storage unit 231a of the control unit 231, for example. When the compression method information is transmitted from the reception device 200A to the transmission device 100A, the compression method information read out from the storage unit 231a is transmitted to the transmission device 100A via the wireless transmission path 300A by the wireless transmission and reception unit 233. In this sense, the wireless transmission and reception unit 233 makes up the compression method information transmitting unit.

Also, the wireless transmission and reception unit 233 includes a bit error rate measuring unit 233a. The bit error rate measuring unit 233a periodically, for example, measures the bit error rate of the video signal transmitted from the transmission device 100A. The wireless transmission and reception unit 233 transmits the bit error rate information obtained by the bit error rate measuring unit 233a to the transmission device 100A via the wireless transmission path 300A. In the transmission device 100A, the transmission bit rate BR2 of the wireless transmission path 300A is set, based on the bit error rate information herein, and as described above, control of the data compression unit 121-1 to 121-n and the switch unit 122 can be performed. The wireless transmission and reception unit 233 makes up the bit error rate information transmitting unit.

An operation example of the wireless system 50A in FIG. 50 configured above will be described. For example, when the user performs a transmission operation of the video signal, a non-compressed video signal of the predetermined video content selected by the user is output from the reproduction unit 134. The format (resolution or the like) of the non-compressed video signal is converted into, for example, a format that can be handled by the reception device 200A, that is, a format that can be displayed with the reception device 200A, by the signal converting unit 134a.

The video signal output from the reproduction unit 134 is supplied to the wireless transmission and reception unit 135 through the switch unit 122 without change, or the video signal output from the reproduction unit 134 is supplied to the wireless transmission and reception unit 135 through the switch unit 122 after being subjected to a data compression process with one of the data compression units 121-1 to 121-n.

In this case, in a case where it is assumed that the bit rate of the non-compression video signal output from the reproduction unit 134 is BR1 and the transmission bit rate of the wireless transmission path 300A is BR2, when $BR1 \leq BR2$ is satisfied, the non-compressed video signal output from the reproduction unit 134 is supplied to the wireless transmission and reception unit 135 as a video signal to be transmitted.

On the other hand, when BR1≤BR2 is not satisfied, the non-compressed video signal output from the reproduction unit 134 is subjected to data compression process with one of the data compression units 121-1 to 121-n, and the output compressed video signal is supplied to the wireless transmission and reception unit 135 as a video signal to be transmitted.

In addition, even when BR1≤BR2 is not satisfied, if there is no data compression unit performing a data compression process with a compression method with which the reception device 200A is compatible among data compression units 121-1 to 121-n, the resolution or the like of the non-compressed video signal output from the reproduction unit 134 is made to be small so as to satisfy BR1≤BR2, and the non-compressed video signal thereof is supplied to the wireless transmission and reception unit 135 as a video signal to be transmitted.

In the wireless transmission and reception unit 135, the video signal supplied from the switch unit 122 is transmitted to the reception device 200A via the wireless transmission path 300A with predetermined communication. In this case, the bit rate of the transmission video signal is suppressed within the transmission bit rate of the wireless transmission path 300A, as described above. Accordingly, the transmission device 100A can successfully transmit the video signal with a desired bit rate within the transmission bit rates of the wireless transmission path 300A to the reception device 200A.

In addition, accompanying the transmission of the video signal described above, the compression information and the format information of the transmission video signal is transmitted through the wireless transmission path 300A from the transmission device 100A to the reception device 200A.

In the reception device 200A, the video signal transmitted from the wireless transmission and reception unit 135 of the transmission device 100A via the wireless transmission path 300A is received by predetermined communication with the wireless transmission and reception unit 233. The video signal received by the wireless transmission and reception unit 233 is supplied to the switch unit 220 and the data decompression units 219-1 to 219-m.

The operation of the switch unit 220 and the data decompression units 219-1 to 219-m is controlled based on the compression information and the format information transmitted from the transmission device 100A, as described above.

Specifically, when the video signal received by the wireless transmission and reception unit 233 is a non-compressed video signal, the non-compressed video signal is supplied to the display unit 234 through the switch unit 220. When the video signal received by the wireless transmission and reception unit 233 is a compressed video signal, a data compression process is performed by the data decompression unit corresponding to the compression method thereof, and the non-compressed video signal obtained as a result thereof is supplied to the display unit 234 through the switch unit 220.

In addition, when the resolution or the like of the non-compressed video signal supplied to the display unit 234 is made to be small on the transmission device 100A side from the relation with the transmission bit rate of the wireless transmission path 300A, the resolution or the like is returned to a state that can be handled by the reception device 200A, that is, a state that can be displayed with the reception device 200A, based on the format information supplied from the transmission device 100A as described above.

Therefore, regardless of whether the video signal received by the wireless transmission and reception unit 233 is a non-compressed video signal or a compressed video signal, a good reception video signal is supplied to the display unit 234. An image by the video signal supplied from the switch unit 220 as described above is displayed on the display unit 234.

In addition, as described above, in regard to the transmission device 100A, the data compression process is performed with a compression method with which the reception device 200A is compatible, based on the compression method information from the reception device 200A, whereby the compressed video signal received by the wireless transmission and reception unit 233 can always be decompressed with one of the data decompression units 219-1 to 219-m.

In addition, in the wireless transmission and reception unit 233 of the reception device 200A, the bit error rate of the video signal transmitted from the transmission device 100A is, for example, measured periodically, by the bit error rate measuring unit 233a. The measured bit error rate information is supplied from the wireless transmission and reception unit 233 to the transmission device 100A side via the wireless transmission path 300A.

In the transmission device 100A, the transmission bit rate BR2 of the wireless transmission path 300A is set by the control unit 131 based on bit error rate information on the reception device 200A side supplied via the wireless transmission path 300A from the reception device 200A. Specifically, in the control unit 131, the bit rate BR2 is sequentially updated so that the bit rate becomes the highest one in bit rates in which the bit error rate on the reception device 200A side becomes a constant value or less. Accordingly, the bit error rate at the reception device 200A side can be shifted in the neighborhood of the constant value, and even in a case where the transmission allowable bit rate (the transmission bit rate in which the bit error rate becomes a constant value) of the wireless transmission path 300A is unstable and fluctuant, the video signal can be successfully transmitted from the transmission device 100A to the reception device 200A.

Figure 51:
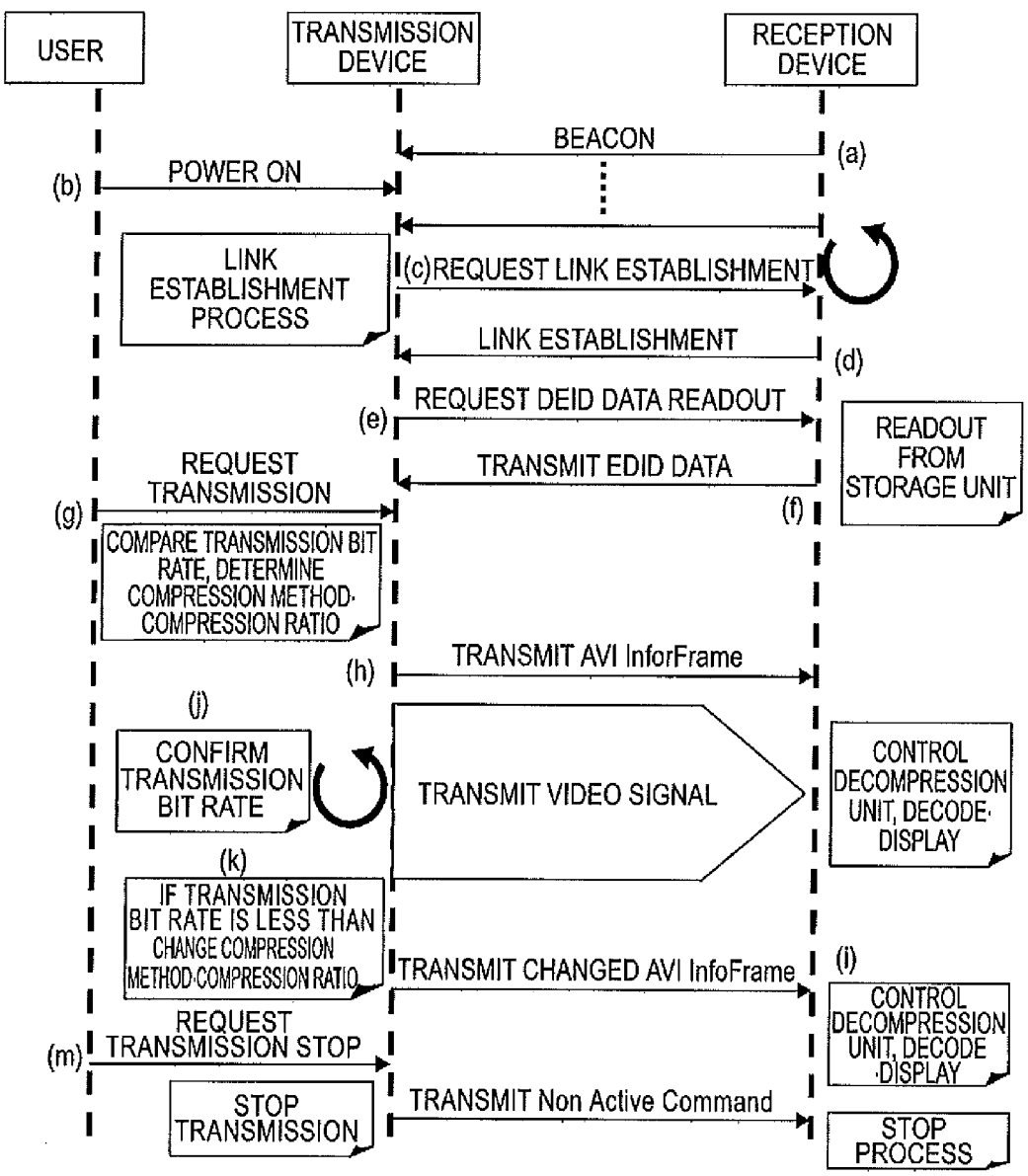
FIG. 51 is a diagram illustrating a control sequence example in a case where a video signal is transmitted from the transmission device to the reception device via a wireless transmission path.

FIG. 51 shows a control sequence in the case of transmitting a video signal from the transmission device 100A to the reception device 200A, via the wireless transmission path 300A.

(a) The reception device consistently outputs a beacon periodically, and confirms whether a transmission device exists within the wireless network. (b) A transmission device of which the power is turned on by the user or which is already in a standby state, (c) makes a request for participation in the wireless network and a link establishment by replying an acknowledgement with respect to the beacon. (d) The reception device recognizes the transmission device, and replies with a link establishment acknowledgement.

(e) The transmission device makes a request for a transmission of the EDID data including the compression method (decompression method) information to the reception device. (f) When receiving the request, the reception device reads out predetermined data from the storage unit of the reception device, and transmits this to the transmission device. The transmission device recognizes the compression method with which the reception device is compatible from the transmitted EDID data, and determines the compatible compression method of the transmission device.

(g) When transmitting the video signal selected by the user, the transmission device compares the transmission bit rate of the wireless transmission path and the necessary transmission bit rate of the transmission video signal, and if the necessary transmission bit rate is equal to or lower than the transmission bit rate of the transmission path, the video signal is transmitted while remaining non-compressed. On the other hand, in a case where the necessary bit rate exceeds the transmission bit rate of the wireless transmission path, the appropriate method is selected from within the compression method determined as described above or the compression ratio is determined according to necessity, and (h) sets the information thereof in a predetermined region of the AVI InfoFrame packet and transmits it to the reception device, and starts the transmission of the video signal.

(i) The reception device extracts information of a compression method, a compression ratio or the like from the received AVI InfoFrame packet, and if the video signal is in a non-compressed state, passes the signal to the display unit without change. On the other hand, if the video signal is transmitted in a compressed state, the information of the compression method, the compression ratio, or the like is used to control the decompression unit, and decode. In a wireless transmission, since the transmission bit rate is unstable depending on the transmission path conditions, and frequently changes, (j) the transmission device periodically confirms the transmission bit rate state of the wireless transmission path by using the bit error rate information or the like from the reception device.

(k) In a case where a transmission bit rate of the wireless transmission path is lower than that necessary for the video signal that is currently transmitting, the transmission device changes the compression ratio or changes the compression method to control the transmission bit rate necessary for the transmission video signal to be equal to or lower than the transmission bit rate of the wireless transmission path, and transmits the AVI InfoFrame packet of which the compression method and compression ratio is changed to the reception device. (m) When a transmission stop is instructed by a user operation, the transmission device stops the transmission of the video signal to the reception device.

As described above, with the wireless system 50A shown in FIG. 50, the transmission device 100A can selectively transmit the non-compressed video signal or the compressed video signal obtained by subjecting the non-compressed video signal to a compression process with a compression method with which the reception device 200A is compatible, and can successfully transmit a video signal with a desired bit rate within the transmission bit rates of the wireless transmission path 300A.

In addition, in regard to the wireless system 50A shown in FIG. 50, the reception device 200A supplies the information of the compression method that is compatible with itself to the transmission device 100A, and controls the decompression process, the signal selecting process, or the like, based on the compression information or the like supplied from the transmission device 100A, whereby a good reception video signal can be obtained, regardless of whether the transmitted video signal is a non-compressed video signal or a compressed video signal.

Figures 52, 53:
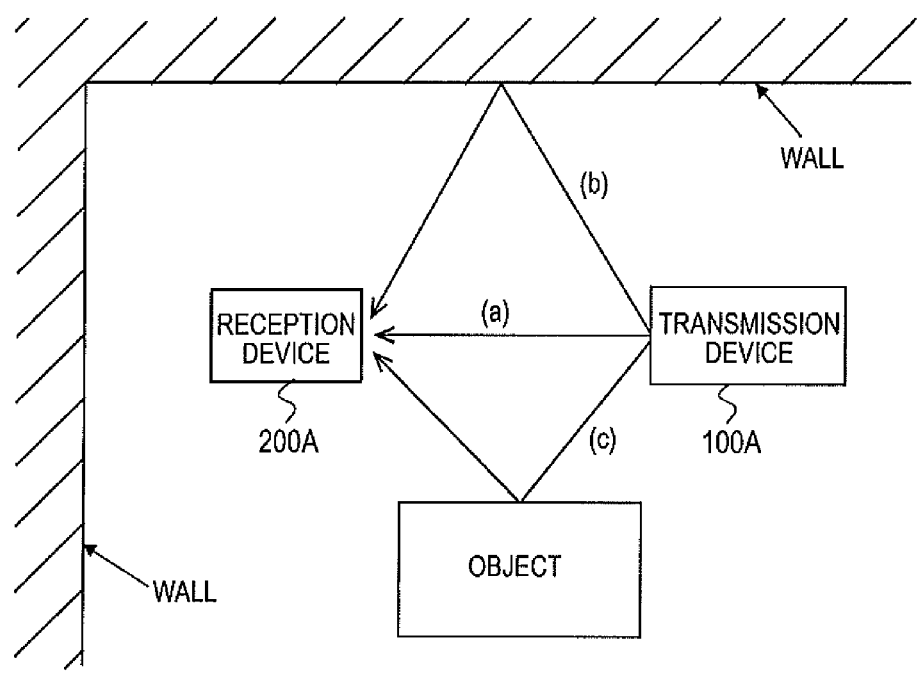
FIG. 52 is a diagram illustrating a situation where a plurality of channels may be taken as a transmission channel from the transmission device to the reception device.
FIG. 53 is a diagram illustrating a table example where a correlation between a channel capable of being used at the time of transmitting a video signal from the transmission device to the reception device and a transmission bit rate in a wireless transmission path of the channel is shown.

In addition, in regard to the wireless system 50A shown in FIG. 50, for example, in a case where the wireless transmission path 300A is at a 60 GHz band (milli-wave band), in the case of considering the transmission of the video signal indoors, the transmission waves reflect from walls and objects, whereby by changing the direction of the antenna (not shown) of the wireless transmission and reception unit 135 of the transmission device 100A, that is, the transmission direction, as shown in FIG. 52, multiple channels (in the example in the diagram, three channels of (a) to (c)) can be taken as transmission channels from the transmission device 100A to the reception device 200A.

In such a situation, the transmission device 100A changes the transmission direction, in advance, to multiple directions, and transmits the video signal of the various types of bit rates in each direction, and receives the bit error rate information from the reception device 200A, whereby a table shown in FIG. 53 can be formed, and this table can be stored in the storage unit 131a of the control unit 131.

The table in FIG. 53 shows the correlation between a channel capable of being used at the time of transmitting the video signal from the transmission device 100A to the reception device 200A and a transmission bit rate in the wireless transmission path 300A of the channel (transmission bit rate wherein transmission is possible with a bit error rate of a constant value or less). In addition, here, TRa>TRb>TRc is assumed.

In the situation shown in FIG. 52, in a state where transmission of a video signal is being performed with the channel (a) from the transmission device 100A to the reception device 200A, in a case where an obstacle such as a person comes into the position of crossing the channel (a), the transmission device 100A makes a reference to the table in FIG. 53, and goes to a state to perform transmission with the channel (b) having a next large transmission bit rate. At this time, the control unit 131 of the transmission device 100A changes the transmission bit rate BR2 of the wireless transmission path 300A from TRa to TRb, and controls the operation of the data compression units 121-1 to 121-n and the switch unit 122.

In addition, after becoming a state where transmission of the video signal is performed with the channel (b) from the transmission device 100A to the reception device 200A as described above, further, in a case where an obstacle such as a person or the like comes into the position of crossing the channel (b), the transmission device 100A makes a reference to the table in FIG. 53, and goes to a state to perform transmission with the channel (c) having a next large transmission bit rate. At this time, the control unit 131 of the transmission device 100A changes the transmission bit rate BR2 of the wireless transmission path 300A further from TRb to TRc, and controls the operation of the data compression units 121-1 to 121-n and the switch unit 122.

As described above, in a case where the transmission channel from the transmission device 100A to the reception device 200A is changed, the transmission bit rate BR2 of the wireless transmission path 300A is changed based on the table, and the operation of the data compression units 121-1 to 121-n and the switch unit 122 is controlled, such that even when the transmission channel is changed, the video signal can be successfully transmitted from the transmission device 100A to the reception device 200A.

In addition, the video signal transmitting device is the video camera 100 in the AV system 50 shown in FIG. 31 and the transmission device 100A in the wireless system 50A shown in FIG. 50. Also, the video signal receiving device is the television receiver 200 in the AV system 50 shown in FIG. 31 and the reception device 200A in the wireless system 50A shown in FIG. 50. However, the video signal transmitting device and the video signal receiving device are not limited thereto, and combinations of other device may be used.

In addition, the portions of the data compression units 121-1 to 121-n and the data decompression units 219-1 to 219-m can be realized by either hardware or software. In the case of a codec with a small calculation burden, the realization with a software process is also valid. With hardware, an inherent process only can be performed, but with software, a process by a plurality of compression methods can be changed easily.

[Configuration Example of AV system of Second Embodiment]

Figure 54:
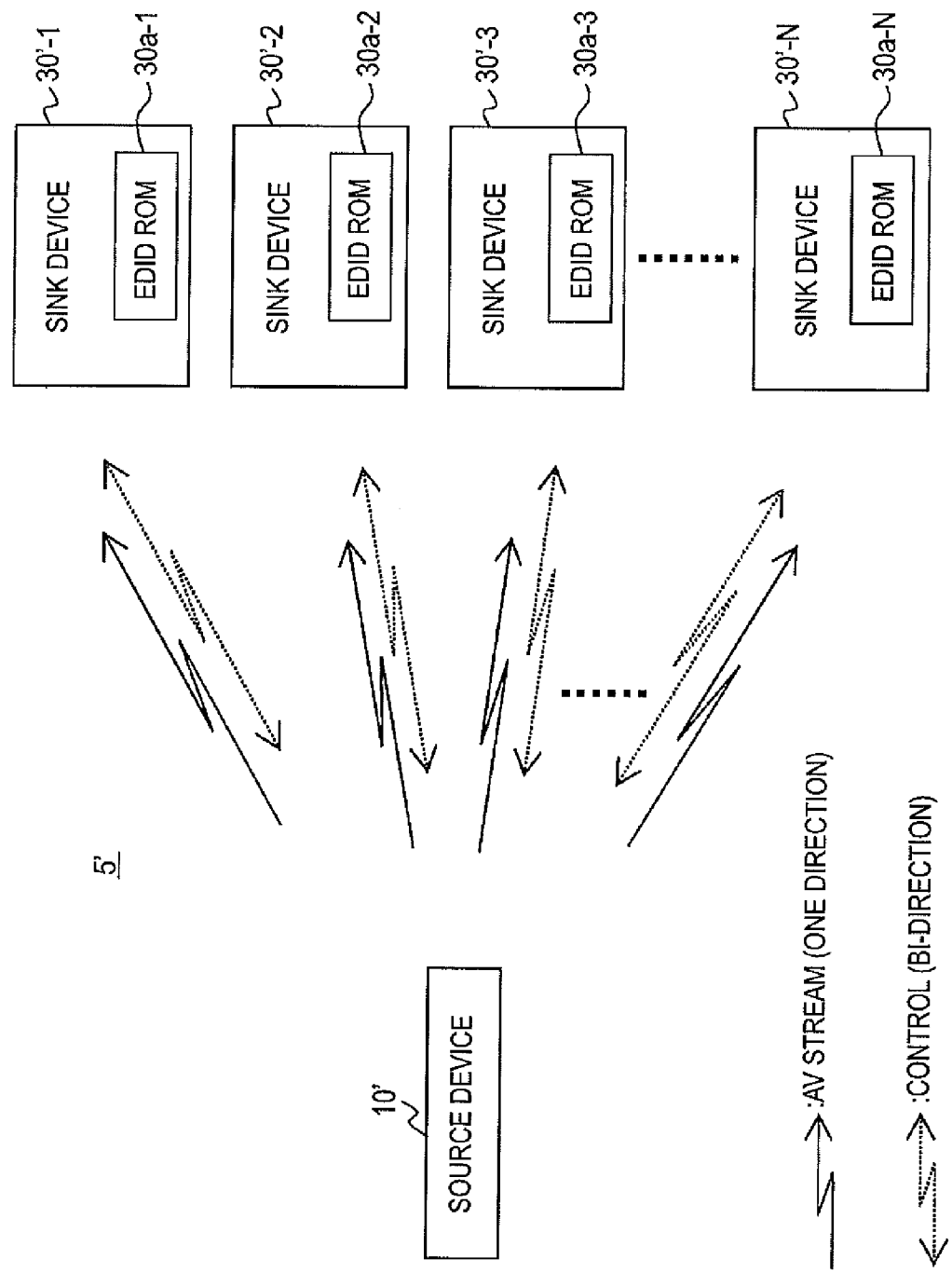
FIG. 54 is a block diagram illustrating a configuration example of an AV system as a second embodiment of the invention.

FIG. 54 shows an AV system 5' as a second embodiment. The AV system 5' includes a source device 10' such as a disc recorder, and sink devices 30'-1 to 30'-N such as N number of television receivers. Here, the source device 10' makes up a transmission device and the sink devices 30'-1 to 30'-N make up reception devices.

The source device 10' has a function of broadcasting AV streams as content data to the sink devices 30'-1 to 30'-N via a transmission medium (transmission path). In addition, the source device 10' has a function of transmitting information to the sink devices 30'-1 to 30'-N via the transmission medium. In addition, the source device 10' has a function of receiving information transmitted from the sink devices 30'-1 to 30'-N via the transmission medium. Here, as the transmission medium, a wired or wireless one may be used.

The sink devices 30'-1 to 30'-N have a function of receiving the AV streams broadcast from the source device 10' as described above and reproducing the same. In addition, the sink devices 30'-1 to 30'-N have a function of receiving information transmitted from the source device 10' via the transmission medium. In addition, the sink devices 30'-1 to 30'-N have a function of transmitting information to the source device 10' via the transmission medium.

Each of the sink devices 30'-1 to 30'-N includes each of EDID ROMs (Read Only Memory) 30a-1 to 30a-N that store EDID (Extended Display Identification Data) that is information related to its own performance (configuration/capability). The EDID stored in the EDID ROMs 30a-1 to 30a-N includes information of a video format and an audio format that are compatible with each of the sink devices 30'-1 to 30'-N.

The source device 10' reads out the EDID from the EDID ROMs 30a-1 to 30a-N of the sink devices 30'-1 to 30'-N, respectively, by using the above-described information transmitting and receiving function. Then, the source device 10' determines a transmission format (video format and audio format) of the AV stream based on information of a video format and an audio format in the EDID. In this case, the source device 10' determines the transmission data format to be compatible with all of the sink devices 30'-1 to 30'-N. In addition, details of determining method of the transmission data format in the source device 10' will be described later.

An operation at the time of broadcasting the AV stream as the content data from the source device 10' to the sink devices 30'-1 to 30'-N in the AV system 5' shown in FIG. 54 will be described.

The source device 10' performs the determination of the transmission data format of the AV stream. In this case, in the source device 10', the readout of the EDID from the EDID ROMs 30a-1 to 30a-N of the sink devices 30'-1 to 30'-N is performed, respectively, by using an information transmitting and receiving function. In addition, the source device 10' periodically acquires bit error rate information from each of the sink devices 30'-1 to 30'-N by using the information transmitting and receiving function. In addition, the source device 10' acquires information of a video compression method with which the sink devices 30'-1 to 30'-N are compatible by using the information transmitting and receiving function.

The source device 10' determines transmission formats of a video and an audio in the AV streams to be compatible with all of the sink devices 30'-1 to 30'-N, based on information of a video format and an audio format in the EDID In addition, the source device 10' sets a transmission bit rate of a transmission path to each of the sink devices 30'-1 to 30'-N based on the bit error rate information from each of the sink devices 30'-1 to 30'-N. In the source device 10', the AV stream based on the determined transmission format is broadcast without change or after being subjected to a data compression process, to the sink devices 30'-1 to 30'-N, according to the transmission bit rate of a transmission path to each of the sink devices 30'-1 to 30'-N.

In a case of performing a data compression process, a data compression method with which all of the sink devices 30'-1 to 30'-N are compatible is used. In this case, when a plurality of data compression methods with which all of the sink devices 30'-1 to 30'-N are compatible is present, a compression method having a high priority ordering is determined based on the priority ordering of a video compression method.

The sink devices 30'-1 to 30'-N receive the AV stream broadcast from the source device 10' as described above. The video and audio transmission format in the AV stream is compatible with all of the sink devices 30'-1 to 30'-N as described above. In addition, in a case where the AV stream is subjected to the data compression process, the data compression method is set to be compatible with all of the sink devices 30'-1 to 30'-N as described above. Therefore, in the sink devices 30'-1 to 30'-N, the received AV stream is reproduced.

In the AV system 5' of FIG. 54, although detailed description is omitted, for example, a single band or a dual band is used similar to the AV system 5 shown in FIG. 1, and it is possible to perform a wireless transmission of the AV stream and the information (see FIGS. 2 and 3).

[Configuration Example of Source Device and Sink Device]

A configuration example of the source device 10' and the sink device 30' (30'-1 to 30'-N) will be described.

Figure 55:
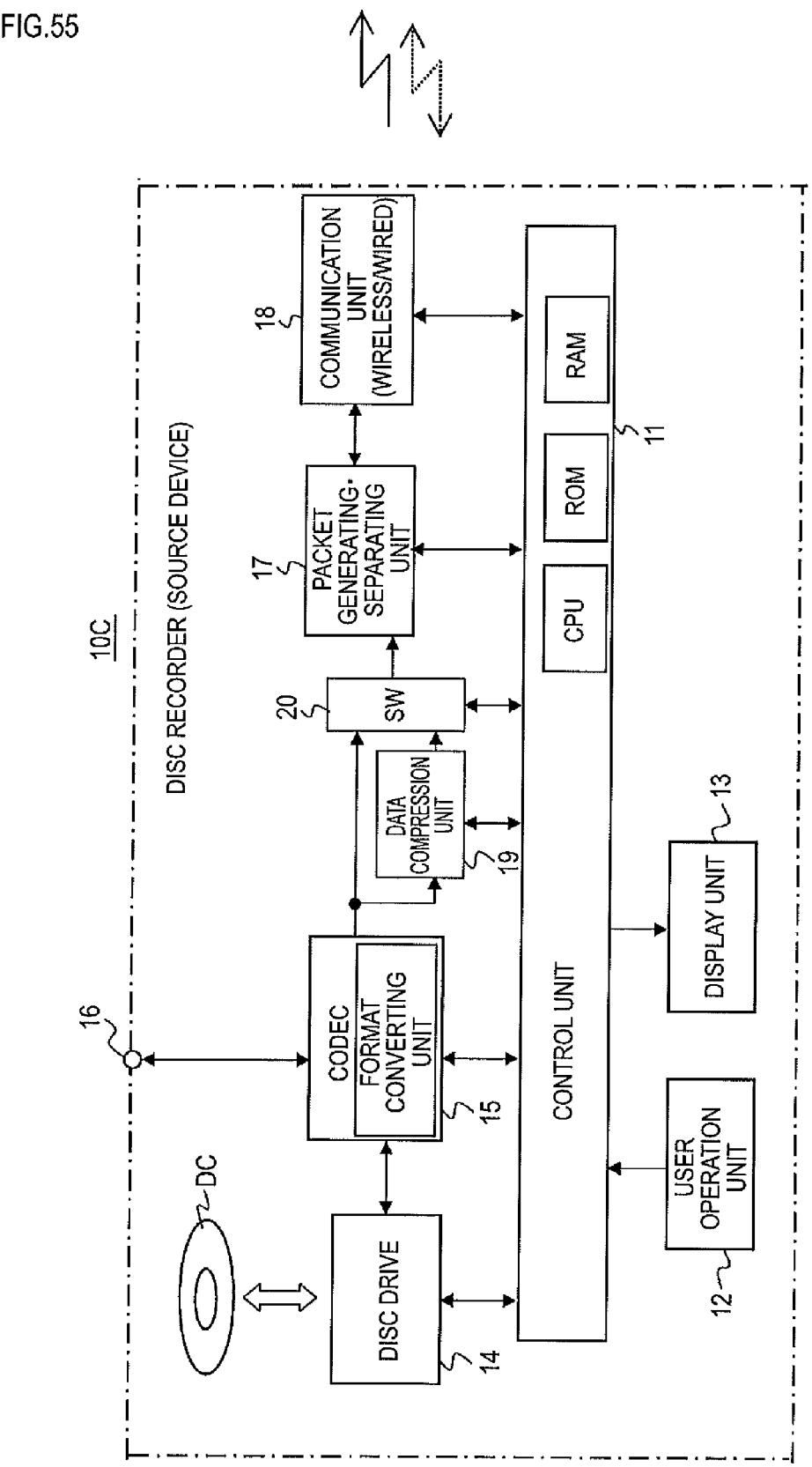
FIG. 55 is a block diagram illustrating a configuration example of a disc recorder as the source device.

A configuration example of the source device 10' will be described. FIG. 55 shows a configuration example of a disc recorder 10C as the source device 10'. In FIG. 55, like reference numerals will be given to parts corresponding to FIG. 4, and detailed description thereof will be appropriately omitted.

The disc recorder 10C includes a control unit 11, a user operation unit 12, a display unit 13, a disc drive 14, a codec 15, a terminal 16 for the connection with an external device, a packet generating•separating unit 17, and a communication unit (wireless/wired) 18. The disc recorder 10C further includes a data compression unit 19 and a switch unit 20.

The data compression unit 19 compresses non-compressed video data output from the codec 15 with a predetermined compression ratio, and output the compressed video data. The data compression unit 19 is compatible with a plurality of compression methods, and performs the data compression process with a predetermined compression method that is determined, under the control of the control unit 11. For example, the compression method includes "RLE (Run Length Encoding)", "Wavelet", "SBM (SuperBit Mapping)", "LLVC (Low Latency Video Codec)", "ZIP", or the like.

The switch unit 20, in regard to the video data, selectively takes out one of the non-compressed video data output from the codec 15 and the compressed video data output from the data compression unit 19, and supplies it to the packet generating•separating unit 17, under the control of the control unit 11. In addition, in regard to the audio data, the switch unit 20 supplies non-compressed audio data output from the codec 15 to the packet generating•separating unit 17 without change.

Although detailed description is omitted, other configuration of the disc recorder 10C of FIG. 55 is similar to the configuration of the disc recorder 10A shown in FIG. 4.

Figure 56:
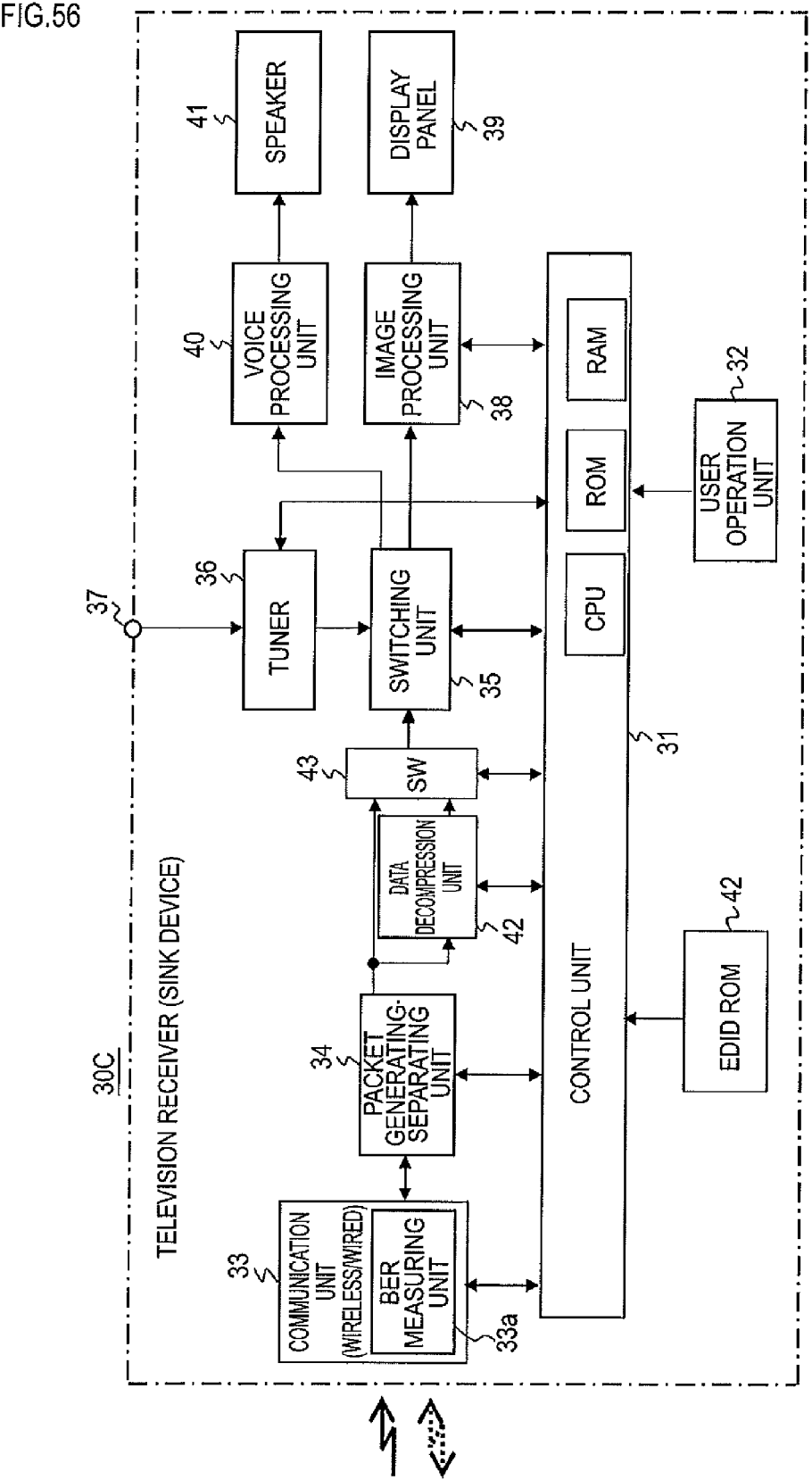
FIG. 56 is a block diagram illustrating a configuration example of a television receiver (television monitor) as the sink device.

Next, a configuration example of the sink device 30' (sink devices 30'-1 to 30'-N) will be described. FIG. 56 shows a configuration example of a television receiver 30C as the sink device 30. In FIG. 56, like reference numerals will be given to parts corresponding to FIG. 5, and detailed description thereof will be omitted.

The television receiver 30C includes a control unit 31, a user operation unit 32, and an EDID ROM 42. In addition, the television receiver 30C includes a communication unit (wireless/wired) 33, a packet generating•separating unit 34, a switching unit 35, a tuner 36, an antenna terminal 37, an image processing unit 38, a display panel 39, a sound processing unit 40, and a speaker 41. In addition, the television receiver 30C includes a data decompression unit 42 and a switch unit 43.

The communication unit 33 includes a bit error rate measuring unit 33a. The bit error rate measuring unit 33a periodically measures a bit error rate of the video data transmitted from the source device 10' (disc recorder 10C). The communication unit 33 transmits the bit error rate information measured by the bit error rate measuring unit 33a to the source device 10' when requested from the source device 10' or newly measured the bit error rate information.

The data decompression unit 42, under the control of the control unit 31, performs, to the compressed video data, a data decompression process corresponding to the data compression method of the compressed video data, when the video data obtained by the packet generating•separating unit 34 is compressed video data, and output the non-compressed video data. The switch unit 43, under the control of the control unit 31, selectively takes out the video data obtained by the packet generating•separating unit 34 or the video data obtained by the data decompression unit 42, and supplies it to the switching unit 35.

In this case, when the video data obtained by the packet generating•separating unit 34 is non-compressed video data, the switch unit 43 takes out the video data, and when the video data obtained by the packet generating•separating unit 34 is compressed video data, the switch unit 43 takes out the video data obtained by the data decompression unit 42.

Although description is omitted, other configuration of the television receiver 30C of FIG. 56 are similar to the configuration of the television receiver 30C shown in FIG. 5.

[Method of Determining Transmission Data Format and Method of Determining Data Compression Necessity]

Detailed description with respect to a method of determining a transmission data format in the source device 10' is omitted, but it is similar to the method of determining the transmission data format in the source device 10 of the AV system 5 of FIG. 1.

The source device 10' determines data compression necessity of the video data based on the transmission bit rate information of the transmission path (transmission medium). In this embodiment, when determining the data compression necessity, the source device 10' makes a reference to a transmission bit rate management table, which is created in advance, of the sink device for each direction.

The source device 10' periodically changes the transmission direction into a plurality of directions and broadcasts the video data with various bit rates to each of the sink devices 30'-1 to 30'-N in each direction. For example, the source device 10' makes a request to each of the sink devices 30'-1 to 30'-N to receive bit error rate information and creates (updates) a transmission bit rate management table of the sink device for each direction. In this case, the source device 10' determines the transmission bit rate based on the bit error rate, so that the bit rate becomes the highest one in bit rates in which the bit error rate becomes a constant value or less.

FIG. 57 shows an example of the management table. This example is an example of a case where the number of sink devices is three, each having three transmission directions.

In the management table, with respect to the sink device 1, a transmission bit rate in a transmission direction (a) is set to, $TR1a=8.0$ Gbps, a transmission bit rate in a transmission direction (b) is set to $TR1b=7.3$ Gbps, and a transmission bit rate in a transmission direction (c) is set to $TR1c=3.5$ Gbps. In addition, with respect to the sink device 2, a transmission bit rate in a transmission direction (a) is set to $TR2a=6.8$ Gbps, a transmission bit rate in a transmission direction (b) is set to $TR2b=7.0$ Gbps, and a transmission bit rate in a transmission direction (c) is set to $TR2c=3.6$ Gbps. In addition, with respect to the sink device 3, a transmission bit rate in a transmission direction (a) is set to $TR3a=5.2$ Gbps, a transmission bit rate in a transmission direction (b) is set to $TR3b=6.8$ Gbps, and a transmission bit rate in a transmission direction (c) is set to $TR3c=3.7$ Gbps.

In addition, in the management table, a common list of the transmission bit rate is determined for each direction. The common list is the lowest value among the transmission bit rates set with respect to the sink devices. Therefore, the common list is determined to be 5.2 Gbps with respect to the direction (a), 6.8 Gbps with respect to the direction (b), and 3.5 Gbps with respect to the direction (c).

When determining the data compression necessity, the source device 10', first, determines to adopt a transmission direction (transmission channel) wherein the transmission bit rate is maximum in the common list of the above-described management table. In addition, when broadcasting from the source device 10' to the plurality of sink devices 30'-1 to 30'-N, a transmission direction wherein the transmission bit rate thereof is maximum is adopted.

Next, the source device 10' sets the transmission bit rate of the common list in the adopted transmission direction to BR2, sets the bit rate of the non-compressed video data of the determined transmission video format to BR1, and determines the data compression necessity according to a magnitude relation thereof. Specifically, when BR1≤BR2 is satisfied, the source device 10' determines not to perform the data compression. In this case, the non-compressed video data of the determined transmission video format is broadcast from the source device 10' to the plurality of sink devices 30'-1 to 30'-N.

In addition, when BR>BR2 is satisfied, the source device 10' determines to perform the data compression. In this case, the source device 10' determines a compression method based on a video compression method common list created in advance. FIG. 58 shows a creation example of the video compression method common list. This example is an example of a case where the number of the sink device is three.

In this example, the sink device 1 supports RE, ZIP, Wavelet, SBM, and LLVC, the sink device 2 supports RE, ZIP, SBM, and LLVC, and the sink device 3 supports RE, Wavelet, SBM, and LLVC. Therefore, RE, SBM and LLVC are determined as the common list.

The source device 10' determines a compression method to be adopted from the video compression method on the common list. In this case, a compression method having the uppermost priority ordering is adopted among compression methods capable of accomplishing the transmission bit rate BR2. In this case, non-compressed video data of the determined transmission video format is subjected to a data compression process with the adopted compression method and is broadcast from the source device 10' to the plurality of sink devices 30'-1 to 30'-N.

Figure 59:
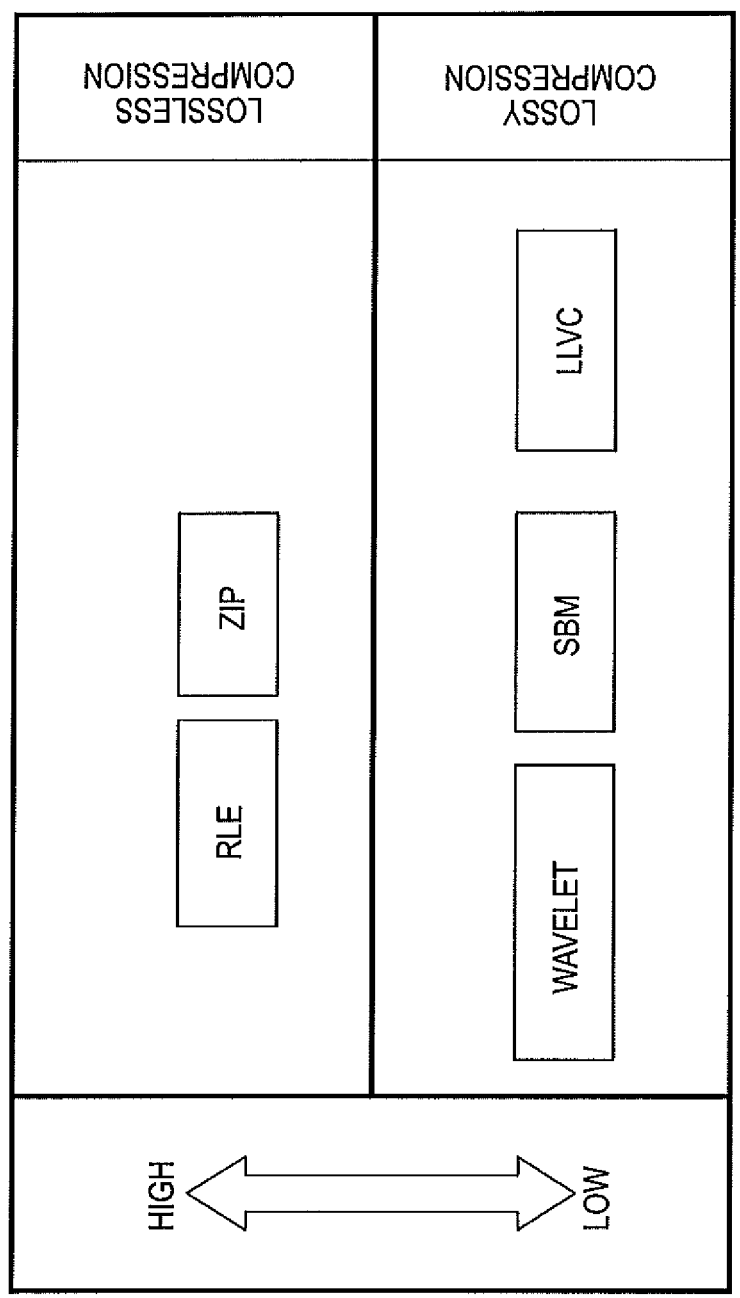
FIG. 59 is a diagram illustrating an example of a priority ordering of the video compression method.
Figure 60:
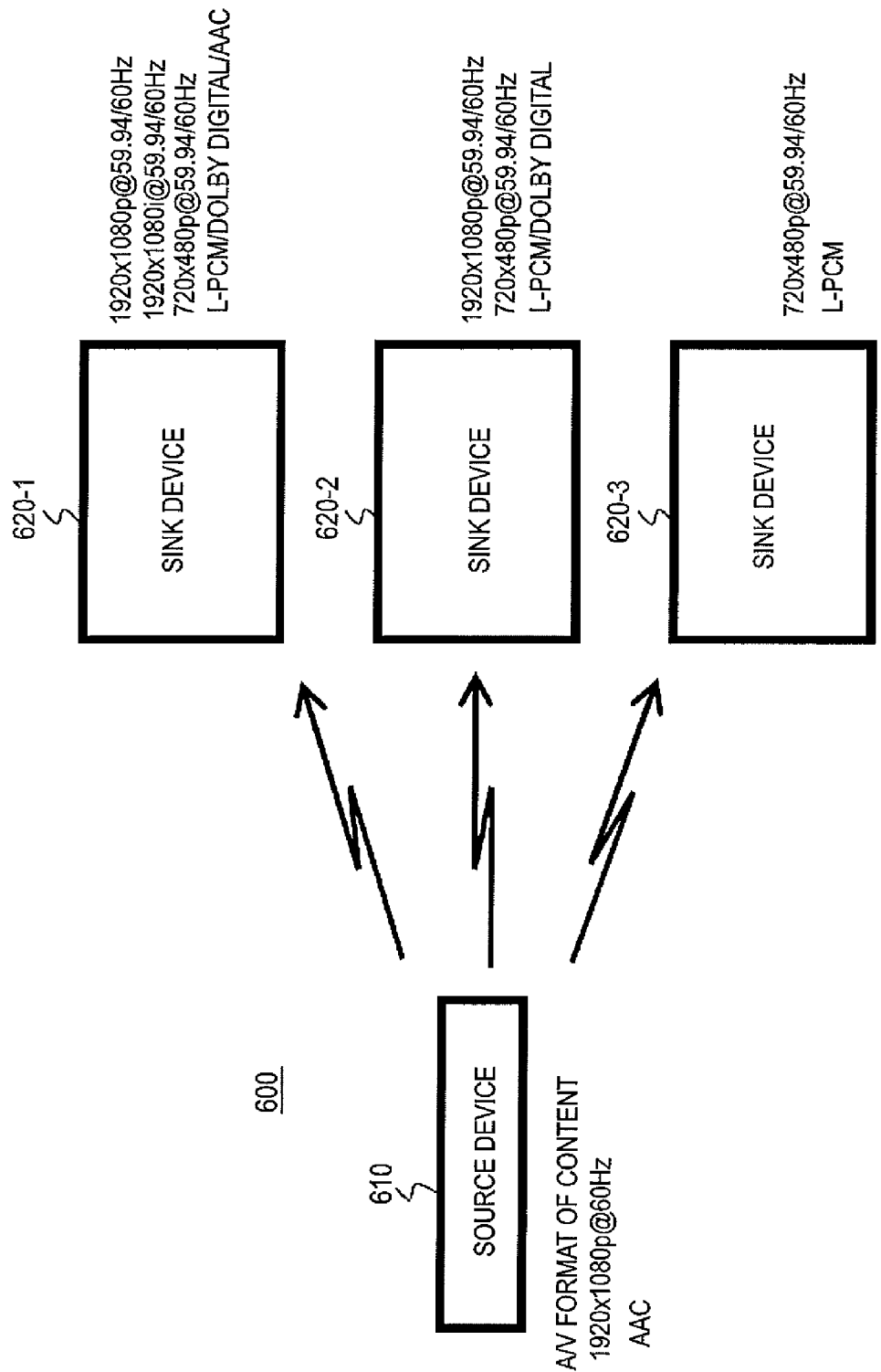
FIG. 60 is a diagram illustrating a configuration example of an AV system including one source device and three sink devices.

FIG. 59 shows an example of a priority ordering of the video compression method. In a method of giving a priority ordering, a reversible compression method (lossless type) is made to have an upper priority ordering and a nonreversible method (lossy type) is made to have a lower priority ordering. Other cases are implementation dependent.

In addition, in a case where the common video compression method is not present in common list, the source device 10' makes small, for example, one or a plurality of items among resolution, bit depth, and frame rate of video data that is a transmission object, and adjusts the bit rate BR 1 of the non-compressed video data to be equal to or lower than the transmission bit rate BR2 and transmits the video data.

As described above, in regard to the AV system 5' shown in FIG. 54, it is possible to obtain the same effect as the AV system 5 shown in FIG. 1. In addition, in the AV system 5' shown in FIG. 54, the source device 10' subjects the non-compressed video data of the determined transmission video format to a data compression process, if necessary, according to the transmission bit rate of the transmission path (transmission medium) and transmits it, whereby the source device 10' can successfully perform a broadcast transmission to the plurality of sink devices 30'-1 to 30'-N regardless of a transmission path state.

INDUSTRIAL APPLICABILITY

The present invention can successfully perform a broadcast transmission to a plurality of reception devices, for example, it can be applied to an AV system or the like that broadcasts content data from a transmission device such as a video camera, a DVD recorder, and an HDD recorder to a reception device such as a television receiver via a wired or wireless transmission path.

REFERENCE SIGNS LIST 5, 5A, 5B, 5' . . . AV system
10, 10' . . . Source device
10A, 10C . . . Disc recorder
11 . . . Control unit
12 . . . User operation unit
13 . . . Display unit
14 . . . Disc drive
15 . . . Codec
17 . . . Packet generating•separating unit
18 . . . Communication unit (wireless/wired)
19 . . . Data compression unit
20 . . . Switch unit
30-1 to 30-N, 30'-1 to 30'-N . . . Sink device
30A, 30C . . . Television receiver
30B . . . AV amplifier
31 . . . Control unit
32 . . . User operation unit
33 . . . Communication unit (wireless/wired)
34 . . . Packet generating•separating unit
35 . . . Switching unit
36 . . . Tuner
38 . . . Image processing unit
39 . . . Display panel
40 . . . Sound processing unit
41 . . . Speaker
42 . . . Data decompression unit
43 . . . Switch unit
51 . . . Control unit
52 . . . User operation unit
53 . . . Communication unit (wireless/wired)
54 . . . Packet generating•separating unit
55 . . . DSP
56 . . . Sound amplification circuit

The invention claimed is:

1. A transmission device comprising:
a communication unit that broadcasts content data to a plurality of reception devices and performs an information transmission to and an information reception from the plurality of reception devices; and
a format determining unit that determines a transmission data format of the content data that is a transmission object to be broadcast by the communication unit, based on information, which is acquired from the plurality of reception devices via the communication unit, of a data format with which each of the plurality of reception devices are compatible,
wherein the format determining unit creates a common list that is a list of the data format commonly compatible with the plurality of reception devices, based on the information, which is acquired from the plurality of reception devices, of the data format with which the plurality of reception devices is compatible, respectively,
when the data format of the content data that is the transmission object is present in the common list, the format determining unit determines the data format as the transmission data format, and
when the data format of the content data that is the transmission object is not present in the common list, the format determining unit determines a data format of a mandatory standard as the transmission data format,
in which the common list includes at least one of (i) a number of compatible video data formats that are commonly compatible with the plurality of reception devices or (ii) a number of compatible audio data formats that are commonly compatible with the plurality of reception devices,
in which the data format represents at least one of (i) a video data format or (ii) an audio data format, that each of the plurality of reception devices is compatible with during operation, and
when the content data is video data, the common list for a video format created by the format determining unit represents (i) a common color format type or types, (ii) a common video format code type or types, and (iii) a common deep color mode type or types, each type within the common color format and the common video format code and the common deep color mode types being arranged in a respective predetermined priority order, so that when a respective video format having a respective priority higher than that of the video data that is the transmission object is present in the common list, the format determining unit determines that the respective video format with the respective higher priority is a transmission video format.

2. The transmission device according to claim 1,
wherein, in a case where the content data is audio data, when creating the common list, the format determining unit sets an audio format type, and a maximum number of channels, a sampling frequency, and a quantization bit number to be common items.

3. The transmission device according to claim 2,
wherein, in regard to the maximum number of channels in each audio format, the format determining unit creates the common list based on information, which is acquired from each of the reception devices not having a down-mix function among the plurality of reception devices, of the maximum number of channels with which the reception devices are compatible.

4. The transmission device according to claim 1, wherein, in a case where the plurality of reception devices includes plural sets of a television monitor and AV amplifier combination, the format determining unit determines the transmission data format of audio data that is broadcast by the communication unit, based on information, which is acquired from the plurality of AV amplifiers, of the audio data format with which the plurality of AV amplifiers are compatible.

5. The transmission device according to claim 1, wherein the communication unit sequentially transmits downlink blocks with a non-transmission period interposed therebetween to the plurality of reception devices by using a single band and receives uplink blocks from the plurality of reception devices in the non-transmission period by using the single band, and the content data and the information to be transmitted to the reception devices are included in the downlink blocks, and the information from the reception device is included in the uplink blocks.

6. The transmission device according to claim 1, wherein the communication unit sequentially transmits downlink blocks to the plurality of reception devices by using a first band and receives uplink blocks from the plurality of reception devices by using a second band, and the content data and the information to be transmitted to the reception devices are included in the downlink blocks, and the information from the reception device is included in the uplink blocks.

7. The transmission device according to claim 1, further comprising:

a data compression unit that performs a data compression process with respect to non-compressed content data of the transmission data format determined by the format determining unit, wherein, when a transmission bit rate, which corresponds to a transmission path to each of the plurality of reception devices, is equal to or greater than a bit rate of the non-compressed content data, the communication unit broadcasts the non-compressed content data to the plurality of reception devices, and when the transmission bit rate, which corresponds to the transmission path to each of the plurality of reception devices, is smaller than the bit rate of the non-compressed content data, the communication unit broadcasts compressed content data, which is obtained by subjecting non-compressed content data to a data compression process with the data compression unit, to the plurality of reception devices.

8. The transmission device according to claim 7, wherein the data compression unit performs the data compression process with respect to the non-compressed content data with a data compression method with which the plurality of reception devices are commonly compatible, based on compression method information acquired from each of the plurality of reception devices.

9. A method of determining a transmission data format in a transmission device that broadcasts content data to a plurality of reception devices and performs an information transmission to and an information reception from the plurality of reception devices, the method comprising:

an information acquisition step of acquiring information of a data format, with which the plurality of reception devices are compatible, from the plurality of reception devices; and a format determination step of determining the transmission data format of the content data that is broadcast to the plurality of reception devices based on the data format information acquired at the information acquiring step, wherein, in the format determination step, a common list that is a list of the data format commonly compatible with the plurality of reception devices is created, based on the information, which is acquired from the plurality of reception devices, of the data format with which each of the plurality of reception devices is compatible, respectively, when the data format of the content data that is the transmission object is present in the common list, the data format is determined as the transmission data format, and when the data format of the content data that is the transmission object is not present in the common list, a data format of a mandatory standard is determined as the transmission data format, in which the common list includes at least one of (i) a number of compatible video data formats that are commonly compatible with the plurality of reception devices or (ii) a number of compatible audio data formats that are commonly compatible with the plurality of reception devices, in which the data format represents at least one of (i) a video data format or (ii) an audio data format, that each of the plurality of reception devices is compatible with during operation, and when the content data is video data, the common list for a video format created by the format determination step represents (i) a common color format type or types, (ii) a common video format code type or types, and (iii) a common deep color mode type or types, each type within the common color format and the common video format code and the common deep color mode types being arranged in a respective predetermined priority order, so that when a respective video format having a respective priority higher than that of the video data that is the transmission object is present in the common list, the format determination step determines that the respective video format with the respective higher priority is a transmission video format.

* * * * *